US012726271B2

(12) United States Patent
Kotake et al.

(10) Patent No.: US 12,726,271 B2
(45) Date of Patent: Sep. 1, 2026

(54) OPTICAL SPACE COMMUNICATION MANAGEMENT DEVICE, OPTICAL SPACE COMMUNICATION SYSTEM, AND OPTICAL SPACE COMMUNICATION MANAGEMENT METHOD

(71) Applicant: NATIONAL INSTITUTE OF INFORMATION AND COMMUNICATIONS TECHNOLOGY, Koganei (JP)

(72) Inventors: Hideaki Kotake, Tokyo (JP); Yuma Abe, Tokyo (JP); Morio Toyoshima, Tokyo (JP); Tetsuharu Fuse, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 268 days.

(21) Appl. No.: 18/283,436

(22) PCT Filed: Mar. 23, 2022

(86) PCT No.: PCT/JP2022/013385
§ 371 (c)(1),
(2) Date: Sep. 21, 2023

(87) PCT Pub. No.: WO2022/202875
PCT Pub. Date: Sep. 29, 2022

(65) Prior Publication Data

US 2024/0162984 A1 May 16, 2024

(30) Foreign Application Priority Data

Mar. 24, 2021 (JP) ................................ 2021-050702

(51) Int. Cl.
*H04B 10/112* (2013.01)
*H04B 10/079* (2013.01)
(Continued)

(52) U.S. Cl.
CPC ......... *H04B 10/118* (2013.01); *H04B 10/079* (2013.01); *H04B 10/112* (2013.01); *H04B 10/1123* (2013.01); *H04J 14/0307* (2023.08)

(58) Field of Classification Search
CPC ........ H04B 10/11–1129; H04B 10/118; H04B 10/079; H04B 10/112; H04B 10/1123; H04J 14/0307
(Continued)

(56) References Cited

U.S. PATENT DOCUMENTS 10,225,011 B1 * 3/2019 Schubert ............ H04B 10/1121
2014/0099122 A1 * 4/2014 DeVaul .................. H04B 10/11 398/124
(Continued)

FOREIGN PATENT DOCUMENTS

JP 2018121280 A 8/2018

OTHER PUBLICATIONS

International Search Report (ISR) (and an English language translation thereof) dated Jun. 14, 2022, issued in International Application No. PCT/JP2022/013385.
(Continued)

*Primary Examiner* — Li Liu
(74) *Attorney, Agent, or Firm* — Holtz, Holtz & Volek PC

(57) ABSTRACT

Link control is performed to optical space communication devices, which are installed in a non-terrestrial node group and an optical ground station, and optical space communication is performed using one or more links, based on link path information and a link parameter for transmitting and receiving communication service data based on service
(Continued)

requests and link monitoring information received from the non-terrestrial node group. A link monitoring unit measures the link monitoring information, a position calculation unit calculates position information of the non-terrestrial node group, and a link parameter calculation unit calculates the link path information and the link parameter based on the position information, the service requests, and the link monitoring information. A link control unit performs link control to the optical space communication devices, and a link information communication unit communicates with the non-terrestrial node group.

18 Claims, 30 Drawing Sheets

(51) Int. Cl.
*H04B 10/118* (2013.01)
*H04J 14/02* (2006.01)

(58) Field of Classification Search
USPC ...................................... 398/118–126, 25, 96
See application file for complete search history.

(56) References Cited

U.S. PATENT DOCUMENTS

2015/0270897 A1* 9/2015 Sackman ............. H04B 10/118 398/125
2016/0156405 A1* 6/2016 Teller ................. H04B 7/18502 455/11.1
2017/0237485 A1* 8/2017 Wood ................... H04B 10/516 398/104
2021/0391920 A1* 12/2021 Calder ................ H04L 27/2649

OTHER PUBLICATIONS

Written Opinion dated Jun. 14, 2022, issued in International Application No. PCT/JP2022/013385.
Araki, et al., “Present status, Future and Technical Issues of Space Optical Communications”, IEICE Technical Report, vol. 118, No. 201, pp. 15-23, 2018.
Jinno, et al., “Virtualization in Optical Networks from Network Level to Hardware Level”, Journal of Optical Communication Networking, vol. 5, No. 10, pp. A46-A56, Aug. 8, 2013.
Toyoshima, et al., “Environmental-data gathering system for Satellite-to-Ground Stations Optical Communications”, IEICE Technical Report, vol. 113, No. 436, pp. 1-4, 2014.
Wei, et al., “Hybrid Satellite-Terrestrial Communication Networks for the Maritime Internet of Things: Key Technologies, Opportunities, and Challenges”, IEEE Internet of Things Journal. vol. 8., Issue 11, pp. 8910-8934, Jun. 1, 2021.
Extended European Search Report (EESR) dated Feb. 17, 2025, issued in counterpart European Application No. 22775657.4.

* cited by examiner

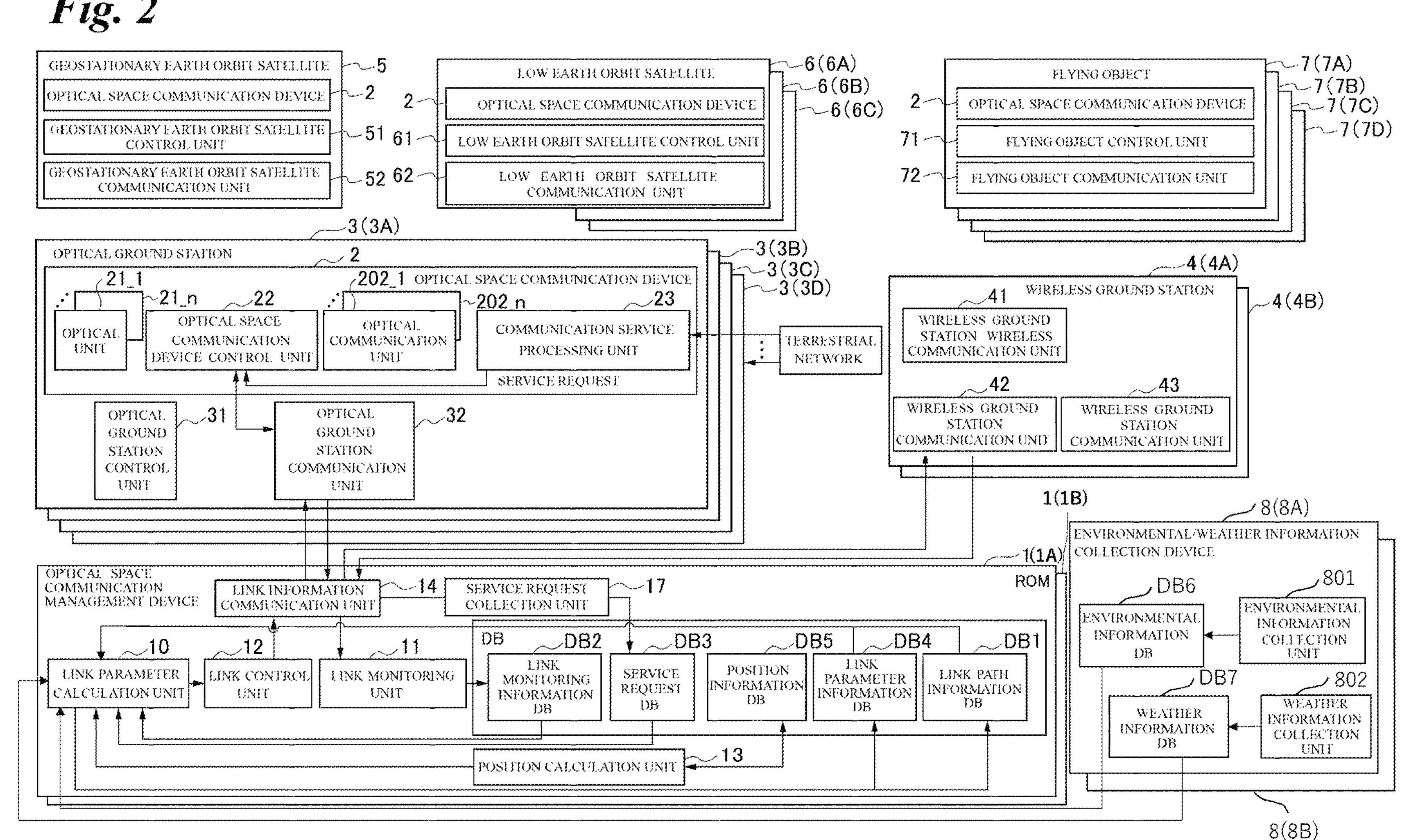
Fig. 2
GEOSTATIONARY EARTH ORBIT SATELLITE
5
OPTICAL SPACE COMMUNICATION DEVICE
2
GEOSTATIONARY EARTH ORBIT SATELLITE CONTROL UNIT
51
GEOSTATIONARY EARTH ORBIT SATELLITE COMMUNICATION UNIT
52
LOW EARTH ORBIT SATELLITE
6(6A)
6(6B)
6(6C)
OPTICAL SPACE COMMUNICATION DEVICE
61
LOW EARTH ORBIT SATELLITE CONTROL UNIT
62
LOW EARTH ORBIT SATELLITE COMMUNICATION UNIT
FLYING OBJECT
7(7A)
7(7B)
7(7C)
7(7D)
OPTICAL SPACE COMMUNICATION DEVICE
71
FLYING OBJECT CONTROL UNIT
72
FLYING OBJECT COMMUNICATION UNIT
3(3A)
3(3B)
3(3C)
3(3D)
OPTICAL GROUND STATION
OPTICAL SPACE COMMUNICATION DEVICE
21_1
21_n
OPTICAL UNIT
22
OPTICAL SPACE COMMUNICATION DEVICE CONTROL UNIT
202_1
202_n
OPTICAL COMMUNICATION UNIT
23
COMMUNICATION SERVICE PROCESSING UNIT
SERVICE REQUEST
31
OPTICAL GROUND STATION CONTROL UNIT
32
OPTICAL GROUND STATION COMMUNICATION UNIT
TERRESTRIAL NETWORK
4(4A)
4(4B)
WIRELESS GROUND STATION
41
WIRELESS GROUND STATION WIRELESS COMMUNICATION UNIT
42
WIRELESS GROUND STATION COMMUNICATION UNIT
43
WIRELESS GROUND STATION COMMUNICATION UNIT
1(1B)
1(1A)
OPTICAL SPACE COMMUNICATION MANAGEMENT DEVICE
14
LINK INFORMATION COMMUNICATION UNIT
17
SERVICE REQUEST COLLECTION UNIT
ROM
DB
10
LINK PARAMETER CALCULATION UNIT
12
LINK CONTROL UNIT
11
LINK MONITORING UNIT
DB2
LINK MONITORING INFORMATION DB
DB3
SERVICE REQUEST DB
DB5
POSITION INFORMATION DB
DB4
LINK PARAMETER INFORMATION DB
DB1
LINK PATH INFORMATION DB
13
POSITION CALCULATION UNIT
8(8A)
8(8B)
ENVIRONMENTAL/WEATHER INFORMATION COLLECTION DEVICE
DB6
ENVIRONMENTAL INFORMATION DB
801
ENVIRONMENTAL INFORMATION COLLECTION UNIT
DB7
WEATHER INFORMATION DB
802
WEATHER INFORMATION COLLECTION UNIT 2
OPTICAL SPACE COMMUNICATION DEVICE
205
OPTICAL SPACE COMMUNICATION DEVICE CONTROL UNIT
201
COMMUNICATION SERVICE PROCESSING UNIT
202_1
OPTICAL COMMUNICATION UNIT
202_n
OPTICAL COMMUNICATION UNIT
21_1
OPTICAL UNIT
21_n
OPTICAL UNIT

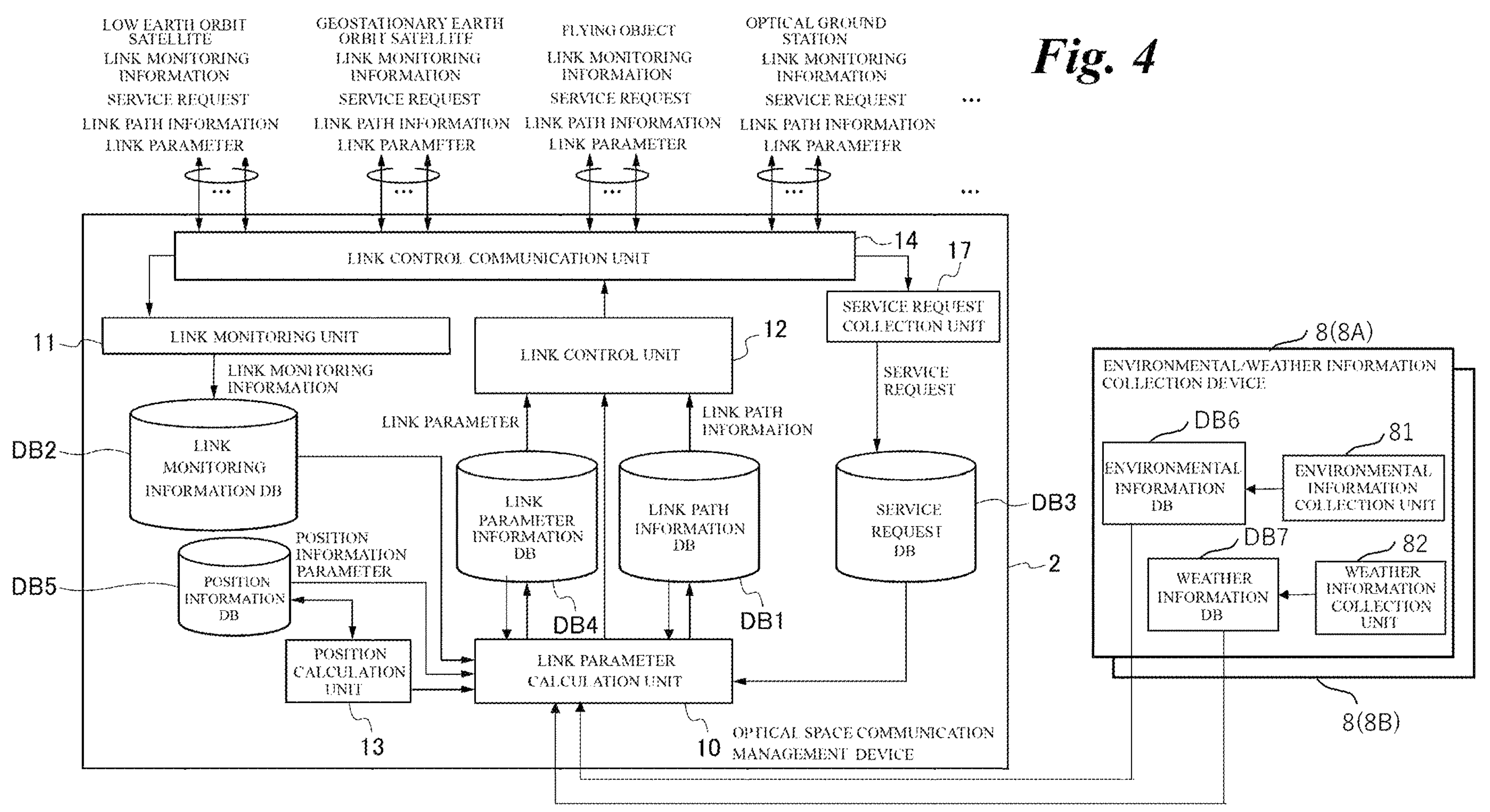
Fig. 4
LOW EARTH ORBIT SATELLITE
LINK MONITORING INFORMATION
SERVICE REQUEST
LINK PATH INFORMATION
LINK PARAMETER
GEOSTATIONARY EARTH ORBIT SATELLITE
LINK MONITORING INFORMATION
SERVICE REQUEST
LINK PATH INFORMATION
LINK PARAMETER
FLYING OBJECT
LINK MONITORING INFORMATION
SERVICE REQUEST
LINK PATH INFORMATION
LINK PARAMETER
OPTICAL GROUND STATION
LINK MONITORING INFORMATION
SERVICE REQUEST
LINK PATH INFORMATION
LINK PARAMETER
LINK CONTROL COMMUNICATION UNIT
14
17
SERVICE REQUEST COLLECTION UNIT
11
LINK MONITORING UNIT
LINK CONTROL UNIT
12
LINK MONITORING INFORMATION
SERVICE REQUEST
LINK PARAMETER
LINK PATH INFORMATION
DB2
LINK MONITORING INFORMATION DB
LINK PARAMETER INFORMATION DB
LINK PATH INFORMATION DB
SERVICE REQUEST DB
DB3
POSITION INFORMATION PARAMETER
DB5
POSITION INFORMATION DB
DB4
DB1
2
POSITION CALCULATION UNIT
LINK PARAMETER CALCULATION UNIT
13
10
OPTICAL SPACE COMMUNICATION MANAGEMENT DEVICE
8(8A)
ENVIRONMENTAL/WEATHER INFORMATION COLLECTION DEVICE
DB6
81
ENVIRONMENTAL INFORMATION DB
ENVIRONMENTAL INFORMATION COLLECTION UNIT
DB7
82
WEATHER INFORMATION DB
WEATHER INFORMATION COLLECTION UNIT
8(8B)

81
OPTICAL TRANSMITTER
TRANSMITTING-SIDE DIGITAL SIGNAL PROCESSING UNIT
84
85
I-PHASE DIGITAL-ANALOG CONVERSION UNIT
TRANSMISSION LIGHT SOURCE
86
Q-PHASE DIGITAL-ANALOG CONVERSION UNIT
87
121
88
I-PHASE OPTICAL MODULATOR
LIGHT BRANCHING UNIT
89
Q-PHASE OPTICAL MODULATOR
90
131
π/2 PHASE SHIFTING UNIT
91
LIGHT SYNTHESIS UNIT
IQ OPTICAL MODULATOR

TRANSMITTING-SIDE DIGITAL SIGNAL PROCESSING UNIT
84
841
842
843
COMMUNICATION SERVICE DATA
ERROR CORRECTION CODING UNIT
MULTILEVEL MODULATION UNIT
RESAMPLING UNIT
I-PHASE DIGITAL SIGNAL
Q-PHASE DIGITAL SIGNAL

84
TRANSMITTING-SIDE DIGITAL SIGNAL PROCESSING UNIT
COMMUNICATION SERVICE DATA
841
ERROR CORRECTION CODING UNIT
842
MULTILEVEL MODULATION UNIT
844
NYQUIST FILTER UNIT
845
MODULATOR NON-LINKER COMPENSATION UNIT
843
RESAMPLING UNIT
I-PHASE DIGITAL SIGNAL
Q-PHASE DIGITAL SIGNAL

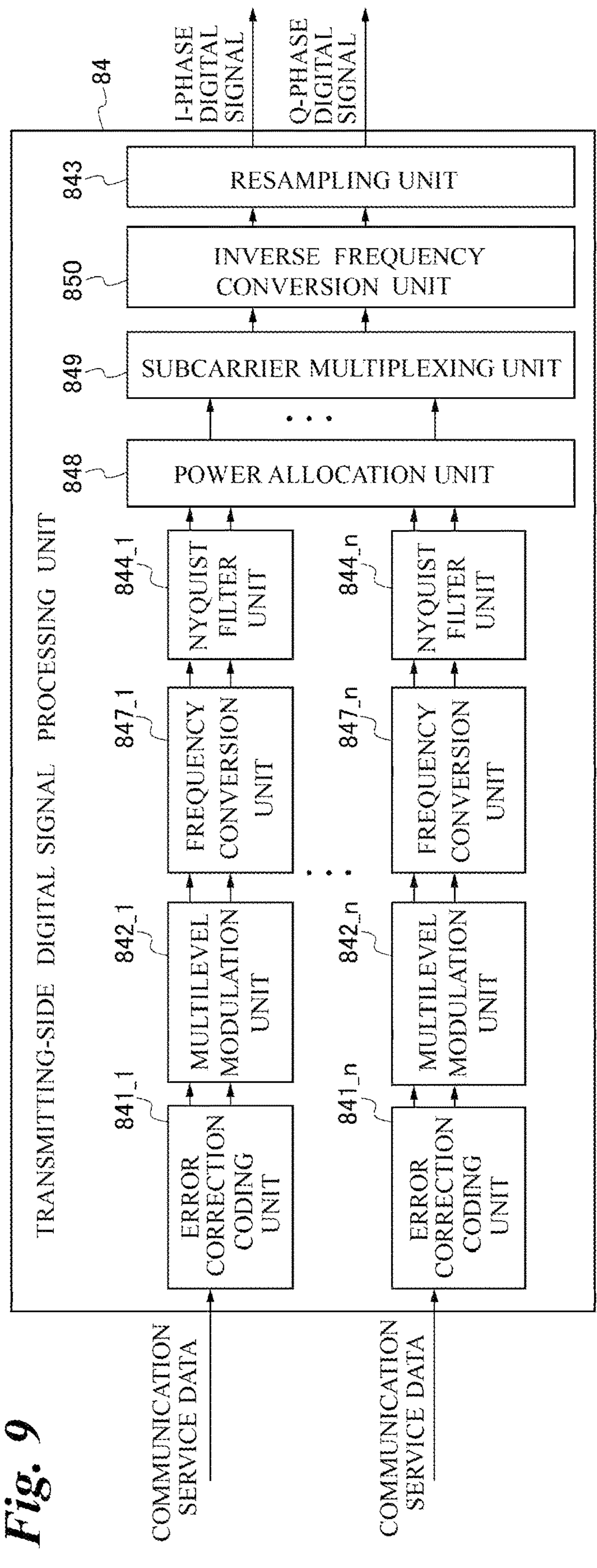
Fig. 9
84
TRANSMITTING-SIDE DIGITAL SIGNAL PROCESSING UNIT
I-PHASE DIGITAL SIGNAL
Q-PHASE DIGITAL SIGNAL
843
RESAMPLING UNIT
850
INVERSE FREQUENCY CONVERSION UNIT
849
SUBCARRIER MULTIPLEXING UNIT
848
POWER ALLOCATION UNIT
844_1
NYQUIST FILTER UNIT
844_n
NYQUIST FILTER UNIT
847_1
FREQUENCY CONVERSION UNIT
847_n
FREQUENCY CONVERSION UNIT
842_1
MULTILEVEL MODULATION UNIT
842_n
MULTILEVEL MODULATION UNIT
841_1
ERROR CORRECTION CODING UNIT
841_n
ERROR CORRECTION CODING UNIT
COMMUNICATION SERVICE DATA
COMMUNICATION SERVICE DATA

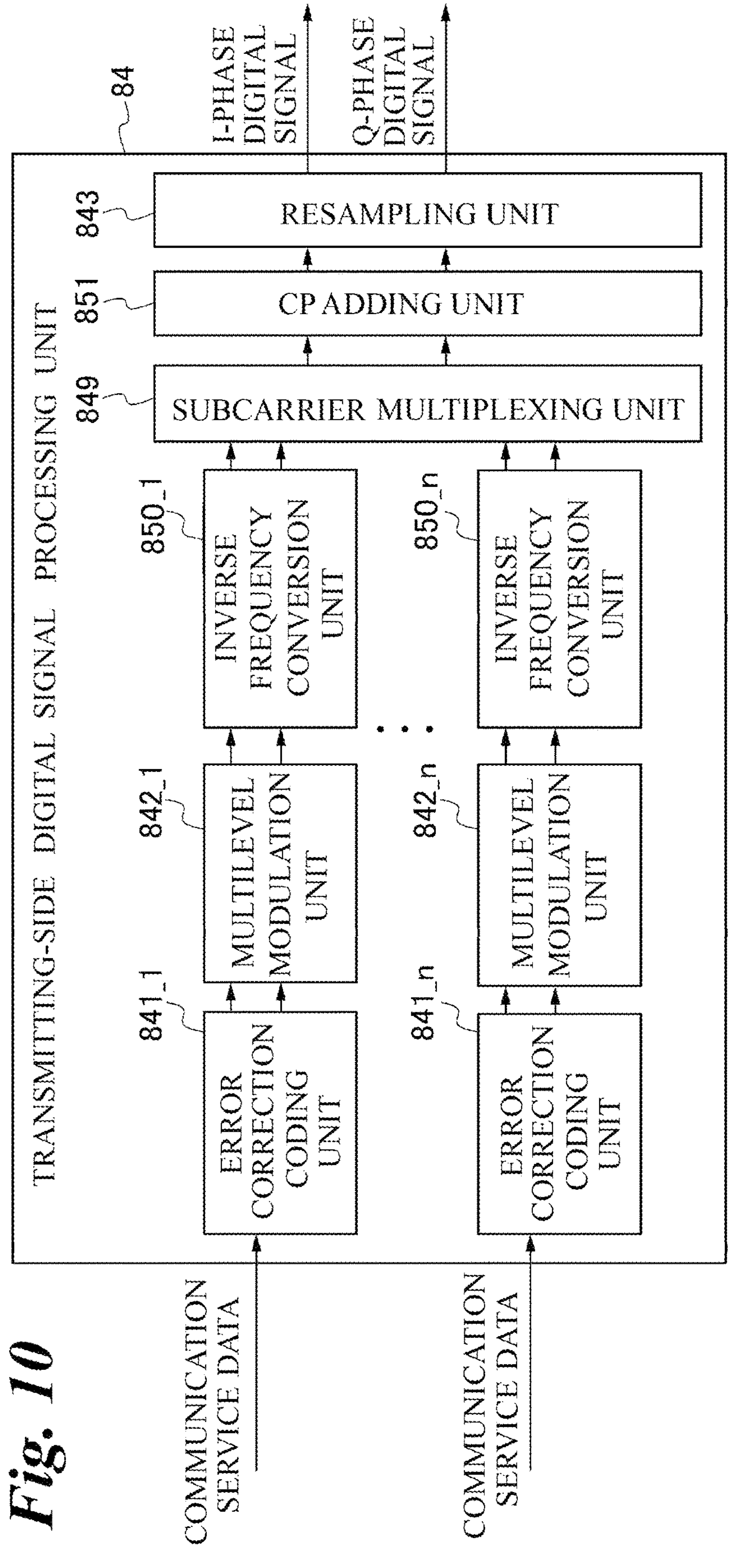
Fig. 10
84
TRANSMITTING-SIDE DIGITAL SIGNAL PROCESSING UNIT
I-PHASE DIGITAL SIGNAL
Q-PHASE DIGITAL SIGNAL
843
RESAMPLING UNIT
851
CP ADDING UNIT
849
SUBCARRIER MULTIPLEXING UNIT
850_1
INVERSE FREQUENCY CONVERSION UNIT
850_n
INVERSE FREQUENCY CONVERSION UNIT
842_1
MULTILEVEL MODULATION UNIT
842_n
MULTILEVEL MODULATION UNIT
841_1
ERROR CORRECTION CODING UNIT
841_n
ERROR CORRECTION CODING UNIT
COMMUNICATION SERVICE DATA
COMMUNICATION SERVICE DATA 93
RECEIVING-SIDE DIGITAL SIGNAL PROCESSING UNIT
COMMUNICATION SERVICE DATA
938
ERROR CORRECTION DECODING UNIT
937
MULTILEVEL DEMODULATION UNIT
936
PHASE ESTIMATION UNIT
935
FREQUENCY ESTIMATION UNIT
934
ADAPTIVE EQUALIZATION UNIT
932
CLOCK EXTRACTION UNIT
931
RESAMPLING UNIT
I-PHASE DIGITAL SIGNAL
Q-PHASE DIGITAL SIGNAL 93
RECEIVING-SIDE DIGITAL SIGNAL PROCESSING UNIT
COMMUNICATION SERVICE DATA
938
ERROR CORRECTION DECODING UNIT
937
MULTILEVEL DEMODULATION UNIT
936
PHASE ESTIMATION UNIT
935
FREQUENCY ESTIMATION UNIT
934
ADAPTIVE EQUALIZATION UNIT
933
MATCHED FILTER UNIT
932
CLOCK EXTRACTION UNIT
931
RESAMPLING UNIT
I-PHASE DIGITAL SIGNAL
Q-PHASE DIGITAL SIGNAL

Figure 18:
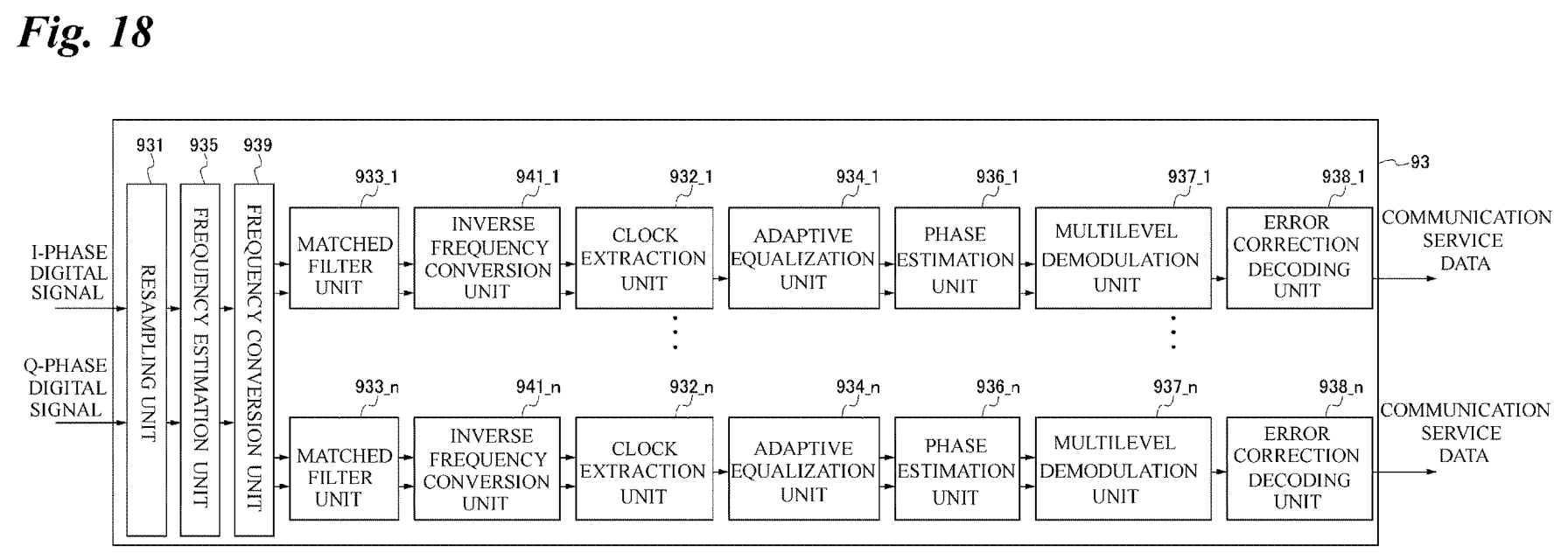

I-PHASE DIGITAL SIGNAL
Q-PHASE DIGITAL SIGNAL

931 RESAMPLING UNIT
935 FREQUENCY ESTIMATION UNIT
939 FREQUENCY CONVERSION UNIT

933_1 MATCHED FILTER UNIT
941_1 INVERSE FREQUENCY CONVERSION UNIT
932_1 CLOCK EXTRACTION UNIT
934_1 ADAPTIVE EQUALIZATION UNIT
936_1 PHASE ESTIMATION UNIT
937_1 MULTILEVEL DEMODULATION UNIT
938_1 ERROR CORRECTION DECODING UNIT
COMMUNICATION SERVICE DATA

. . .

933_n MATCHED FILTER UNIT
941_n INVERSE FREQUENCY CONVERSION UNIT
932_n CLOCK EXTRACTION UNIT
934_n ADAPTIVE EQUALIZATION UNIT
936_n PHASE ESTIMATION UNIT
937_n MULTILEVEL DEMODULATION UNIT
938_n ERROR CORRECTION DECODING UNIT
COMMUNICATION SERVICE DATA

Figure 20:
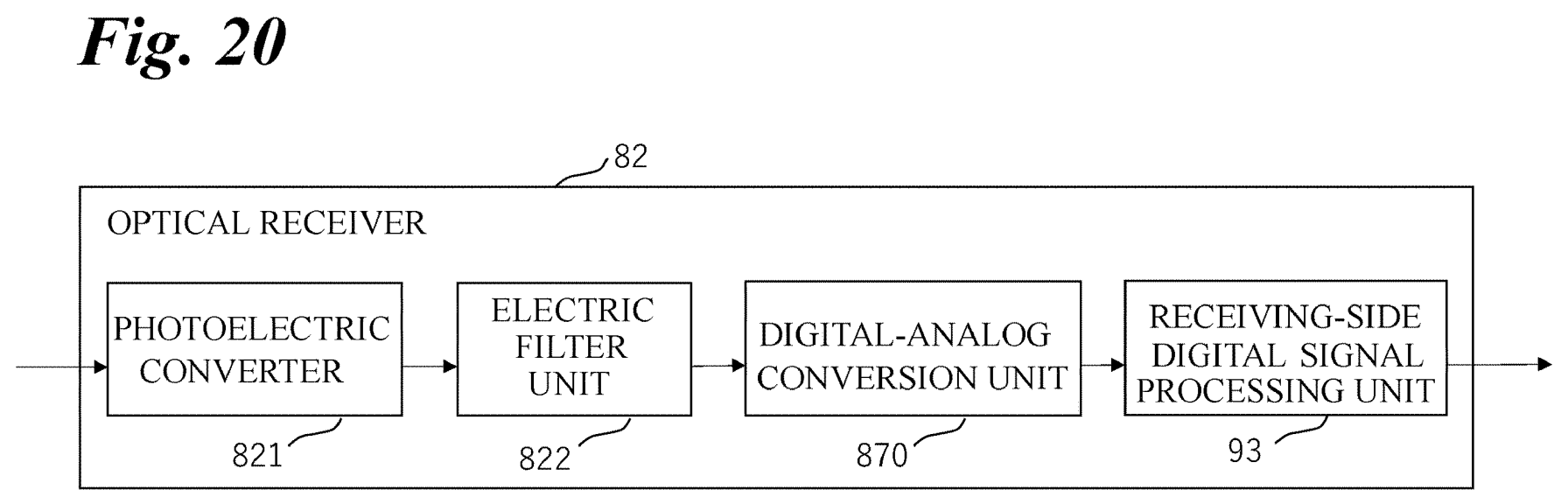

OPTICAL RECEIVER

PHOTOELECTRIC CONVERTER

821

ELECTRIC FILTER UNIT

822

DIGITAL-ANALOG CONVERSION UNIT

870

RECEIVING-SIDE DIGITAL SIGNAL PROCESSING UNIT

Figure 22:
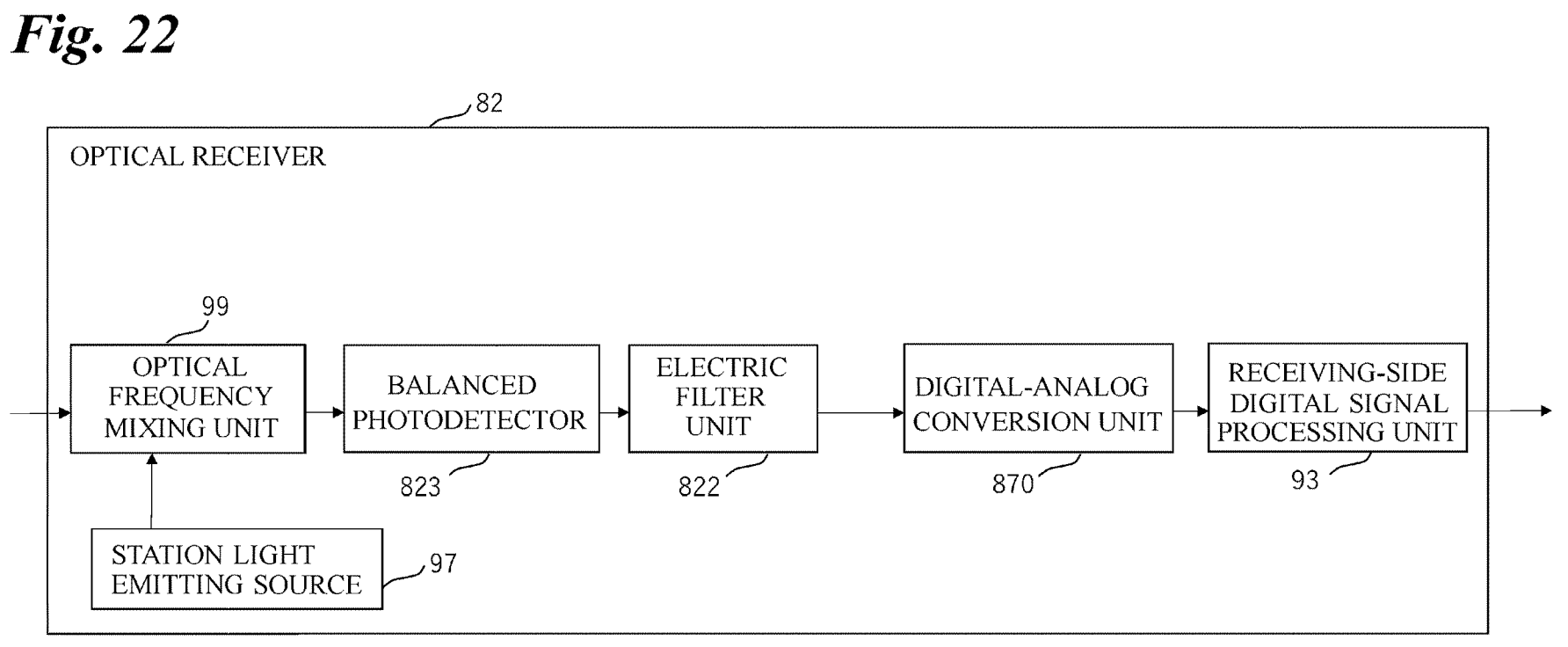

OPTICAL RECEIVER
82

OPTICAL FREQUENCY MIXING UNIT
99

STATION LIGHT EMITTING SOURCE
97

BALANCED PHOTODETECTOR
823

ELECTRIC FILTER UNIT
822

DIGITAL-ANALOG CONVERSION UNIT
870

RECEIVING-SIDE DIGITAL SIGNAL PROCESSING UNIT
93

93
RECEIVING-SIDE DIGITAL SIGNAL PROCESSING UNIT
DIGITAL SIGNAL
938
ERROR CORRECTION DECODING UNIT
940
PHASE DEMODULATION UNIT
932
CLOCK EXTRACTION UNIT
846
DIGITAL FILTER UNIT
931
RESAMPLING UNIT
COMMUNICATION SERVICE DATA

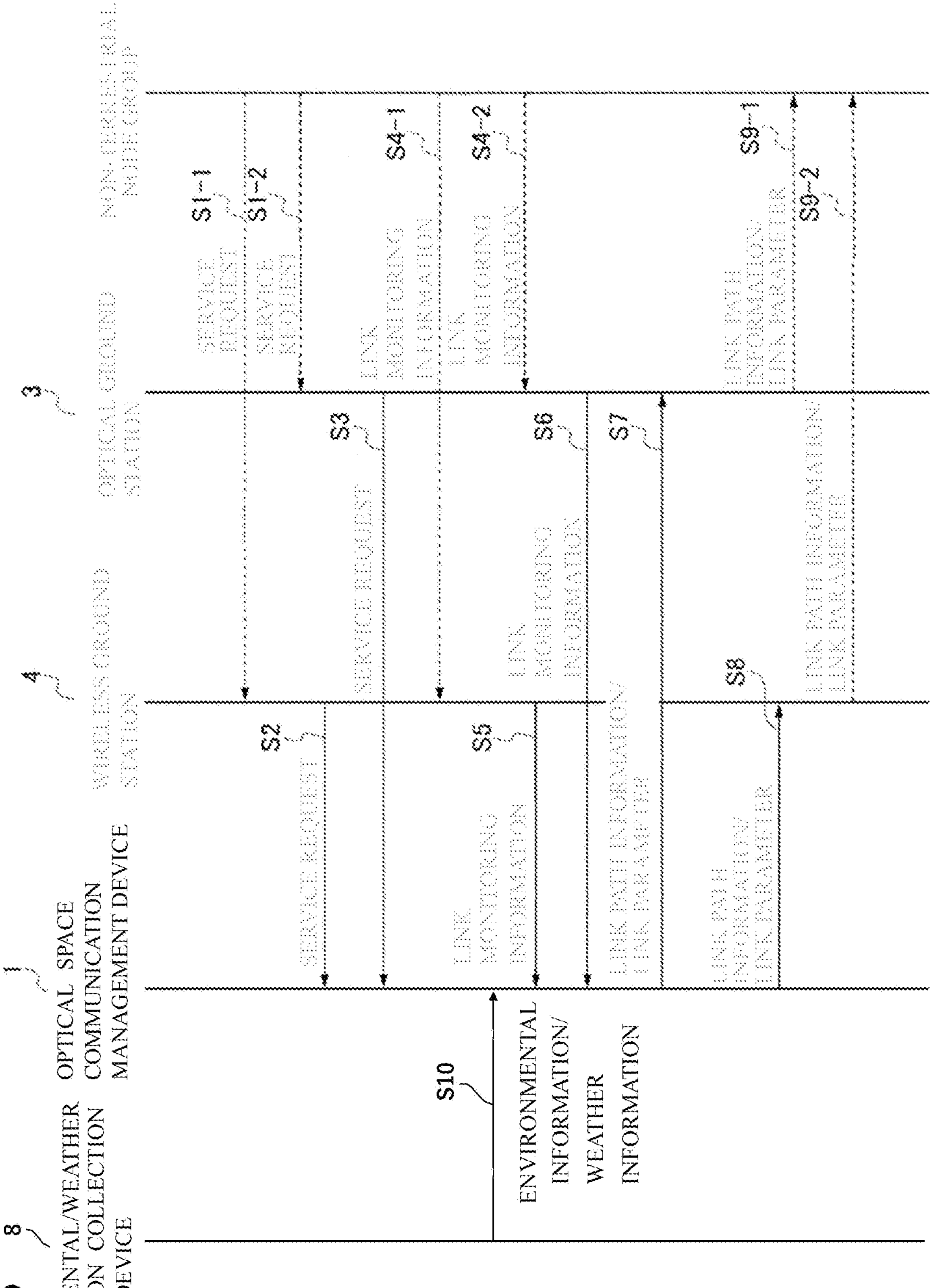
Fig. 25
8
ENVIRONMENTAL/WEATHER INFORMATION COLLECTION DEVICE
1
OPTICAL SPACE COMMUNICATION MANAGEMENT DEVICE
4
WIRELESS GROUND STATION
3
OPTICAL GROUND STATION
NON-TERRESTRIAL NODE GROUP
S1-1
SERVICE REQUEST
S1-2
SERVICE REQUEST
S2
SERVICE REQUEST
S3
SERVICE REQUEST
S4-1
LINK MONITORING INFORMATION
S4-2
LINK MONITORING INFORMATION
S5
LINK MONITORING INFORMATION
S6
LINK MONITORING INFORMATION
S7
LINK PATH INFORMATION/ LINK PARAMETER
S8
LINK PATH INFORMATION/ LINK PARAMETER
S9-1
LINK PATH INFORMATION/ LINK PARAMETER
S9-2
LINK PATH INFORMATION/ LINK PARAMETER
S10
ENVIRONMENTAL INFORMATION/ WEATHER INFORMATION

LINK PATH INFORMATION TABLE TB1

| LINK ID | TRANSMITTING-SIDE OPTICAL SPACE COMMUNICATION DEVICE ID | TRANSMITTING-SIDE OPTICAL SPACE COMMUNICATION DEVICE TYPE | RECEIVING-SIDE OPTICAL SPACE COMMUNICATION DEVICE ID | RECEIVING-SIDE OPTICAL SPACE COMMUNICATION DEVICE TYPE | PROPAGATION DELAY | OPTICAL SIGNAL ID |
|---|---|---|---|---|---|---|
| ... | ... | ... | ... | ... | ... | ... |
| ... | ... | ... | ... | ... | ... | ... |
| ... | ... | ... | ... | ... | ... | ... |

OPTICAL SIGNAL PATH INFORMATION TABLE TB2

| OPTICAL SIGNAL ID | TRANSMITTING-SIDE OPTICAL SPACE COMMUNICATION DEVICE ID | RECEIVING-SIDE OPTICAL SPACE COMMUNICATION DEVICE ID | RELAY OPTICAL SPACE COMMUNICATION DEVICE ID |
|---|---|---|---|
| ... | ... | ... | ... |
| ... | ... | ... | ... |
| ... | ... | ... | ... |

DB2

FREQUENCY VARIATION INFORMATION TABLE TB3

| LINK ID | TIME INFORMATION | TRANSMITTING-SIDE FREQUENCY VARIATION RATE | TRANSMITTING-SIDE FREQUENCY VARIATION START VALUE | TRANSMITTING-SIDE FREQUENCY VARIATION AMOUNT |
|---|---|---|---|---|
| ... | ... | ... | ... | ... |
| ... | ... | ... | ... | ... |

POWER VARIATION INFORMATION TABLE TB4

| LINK ID | TIME INFORMATION | SCINTILLATION INDEX | OPTICAL SIGNAL-TO-NOISE RATIO | SIGNAL-TO-NOISE RATIO |
|---|---|---|---|---|
| ... | ... | ... | ... | ... |
| ... | ... | ... | ... | ... |

PHASE VARIATION INFORMATION TABLE TB5

| LINK ID | TIME INFORMATION | PHASE VARIANCE |
|---|---|---|
| ... | ... | ... |
| ... | ... | ... |

DB3

SERVICE REQUEST TABLE TB6

| SERVICE ID | SERVICE TYPE | TRANSMITTING-SIDE OPTICAL SPACE COMMUNICATION DEVICE ID | RECEIVING-SIDE OPTICAL SPACE COMMUNICATION DEVICE ID | DESIRED COMMUNICATION RATE | ACCEPTABLE DELAY TIME | ACCEPTABLE BIT ERROR RATE | ENCRYPTION REQUEST OR NOT |
|---|---|---|---|---|---|---|---|
| ... | ... | ... | ... | ... | ... | ... | ... |
| ... | ... | ... | ... | ... | ... | ... | ... |
| ... | ... | ... | ... | ... | ... | ... | ... |

DB4

OPTICAL SIGNAL PARAMETER TABLE TB7-1

| OPTICAL SIGNAL ID | SERVICE ID | TRANSMISSION WAVELENGTH | COMMUNICATION RATE | SYMBOL RATE | MODULATION SCHEME | MULTIPLE-VALUE COUNT | ERROR CORRECTION CODE TYPE | CODE RATE | REPETITION COUNT | ENCRYPTION OR NOT | POLARIZATION-MULTIPLEXING OR NOT |
|---|---|---|---|---|---|---|---|---|---|---|---|
| ... | ... | ... | ... | ... | ... | ... | ... | ... | ... | ... | ... |
| ... | ... | ... | ... | ... | ... | ... | ... | ... | ... | ... | ... |
| ... | ... | ... | ... | ... | ... | ... | ... | ... | ... | ... | ... |

OPTICAL TRANSMISSION SYSTEM PARAMETER TABLE TB8-1

| TRANSMISSION OPTICAL SPACE COMMUNICATION DEVICE ID | TRANSMISSION OPTICAL OUTPUT | TRANSMISSION WAVELENGTH | OPTICAL SIGNAL ID | OPTICAL SIGNAL POWER RATIO | BEAM DIVERGENCE ANGLE |
|---|---|---|---|---|---|
| ... | ... | ... | ... | ... | ... |
| ... | ... | ... | ... | ... | ... |
| ... | ... | ... | ... | ... | ... |

OPTICAL SIGNAL PARAMETER TABLE TB7-2

| OPTICAL SIGNAL ID | SUBCARRIER SIGNAL ID | SERVICE ID | TRANSMISSION WAVELENGTH | FREQUENCY ALLOCATION INFORMATION OF SUBCARRIER SIGNAL | COMMUNICATION RATE | SYMBOL RATE | MODULATION SCHEME | MULTIPLE-VALUE COUNT | ERROR CORRECTION CODE TYPE | CODE RATE | REPETITION COUNT | ENCRYPTION OR NOT | SUBCARRIER SIGNAL POWER RATIO | POLARIZATION-MULTIPLEXING OR NOT |
|---|---|---|---|---|---|---|---|---|---|---|---|---|---|---|
| ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... |
| ... | ... | ... | ... | ... | ... | ... | ... | ... | ... | ... | ... | ... | ... | ... |

OPTICAL TRANSMISSION SYSTEM PARAMETER TABLE TB8-2

| TRANSMISSION OPTICAL SPACE COMMUNICATION DEVICE ID | TRANSMISSION OPTICAL OUTPUT | TRANSMISSION WAVELENGTH | OPTICAL SIGNAL ID | OPTICAL SIGNAL POWER RATIO | SUBCARRIER SIGNAL ID | BEAM DIVERGENCE ANGLE |
|---|---|---|---|---|---|---|
| ... | ... | ... | ... | ... | ... | ... |
| ... | ... | ... | ... | ... | ... | ... |
| ... | ... | ... | ... | ... | ... | ... |

SATELLITE ORBIT PARAMETER TABLE TB9

| SATELLITE ID | ORBIT INCLINATION ANGLE (°) | RIGHT ASCENSION OF ASCENDING NODE (°) | ECCENTRICITY | MEAN ARGUMENT OF PERIAPSIS(°) | MEAN ANOMALY (°) | MEAN MOTION (ROTATION COUNT/DAY) | COUNT OF ORBITING IN EPOCH(TIMES) |
|---|---|---|---|---|---|---|---|
| ... | ... | ... | ... | ... | ... | ... | ... |
| ... | ... | ... | ... | ... | ... | ... | ... |
| ... | ... | ... | ... | ... | ... | ... | ... |

FLYING OBJECT MOVE PARAMETER TABLE TB10

| FLYING OBJECT ID | LONGITUDE (°) | LATITUDE (°) | HORIZONTAL SPEED (m/s) | ASCENDING SPEED (m/s) | ALTITUDE (m) | MOVING DIRECTION VECTOR |
|---|---|---|---|---|---|---|
| ... | ... | ... | ... | ... | ... | ... |
| ... | ... | ... | ... | ... | ... | ... |
| ... | ... | ... | ... | ... | ... | ... |

SATELLITE/FLYING OBJECT POSITION INFORMATION TABLE TB11

| SATELLITE/ FLYING OBJECT ID | TYPE | TIME | X-COORDINATE POSITION | Y-COORDINATE POSITION | Z-COORDINATE POSITION | MOVING SPEED (m/s) | MOVING DIRECTION VECTOR |
|---|---|---|---|---|---|---|---|
| ... | ... | ... | ... | ... | ... | ... | ... |
| ... | ... | ... | ... | ... | ... | ... | ... |
| ... | ... | ... | ... | ... | ... | ... | ... |

OPTICAL SPACE COMMUNICATION DEVICE INFORMATION TABLE TB12

| SATELLITE/ FLYING OBJECT ID | OPTICAL SPACE COMMUNICATION DEVICE ID | OPTICAL SPACE COMMUNICATION DEVICE TYPE |
|---|---|---|
| ... | ... | ... |
| ... | ... | ... |
| ... | ... | ... |

5
6A
6B
6C
7A
7B
7C
7D
3A
3B
3C
3D
111
112
113
114

OPTICAL SPACE COMMUNICATION MANAGEMENT DEVICE, OPTICAL SPACE COMMUNICATION SYSTEM, AND OPTICAL SPACE COMMUNICATION MANAGEMENT METHOD

TECHNICAL FIELD

The present invention relates to an optical space communication management device, an optical space communication system, and an optical space communication management method.

BACKGROUND ART

Recently, satellite optical communication networks with various link configuration, for example, between a Geostationary Earth Orbit Satellite and a Low Earth Orbit Satellite, between the ground and a geostationary earth orbit satellite/low earth orbit satellite, and between a low earth orbit satellite and a low earth orbit satellite, are beginning to appear. Additionally, optical modulation signals with various modulation schemes and communication rates are beginning to appear. Therefore, it is estimated that, in assumed future satellite optical communication networks, various link configuration and optical modulation signals are mixed, the number of the satellites increases, and therefore, the system operation on the ground side is complicated. In association with, it is considered that the Operational Expense (OPEX) including responses to communication needs, link quality, failure, and the like rapidly increases.

Under this circumstance, demands for automated and unmanned system operations are expected to increase in the future. In terrestrial trunk optical communication networks, there is a concept of adaptive optical communication network in which automated and unmanned system operations are achievable. For example, a technique on an elastic optical communication network (hereinafter, this may be referred to as EON: Elastic Optical Network) described in Non-patent Document 1 has been disclosed. By applying the concept of the adaptive optical communication network to the satellite optical communication network, the automated satellite optical communication network can be achieved.

Non-patent Document 1: M. Jinno et al., "Virtualization in optical networks from network level to hardware level", Journal of Optical Communication Networking, Vol. 5, No. 10, pp. A46-A56, 2012.

DISCLOSURE OF THE INVENTION

Problems to be Solved by the Invention

In the trunk optical communication network on the ground, in the conventional method as described in Non-patent Document 1, the control is performed for each layer of the communication network, such as an intercity communication network, an inner-city communication network, and communication networks for corporate and personal network. The intercity communication network may be referred to as a core communication network, the inner-city communication network may be referred to as metro, and the communication networks for corporate and personal networks may be referred to as access communication networks. In the control performed for each individual layer, since the control is performed independently for each of the individual communication networks, the control effectively using the individual communication networks is not performed. Also in the satellite optical communication networks, as described above in BACKGROUND ART, the respective networks of the various layers are beginning to be independently operated. Further, in a plurality of satellite communication providers, individual satellite optical communication networks are beginning to be independently operated.

Meanwhile, in addition to large capacity communication services so far, a wide variety of communication services including low latency services such as a telemedicine and an automatic driving, equipment connection services such as an IoT data communication, confidential communication services such as a security and a private secrecy, and the like are beginning to appear. In the satellite communications, not only satellite broadcasting, but also the large capacity communication service and a satellite image distribution service using an earth observation satellite are beginning to expand. Therefore, it is necessary to deal with new service requests, such as a time delay, a degree of reliability, and degree of security, in addition to the communication capacity requested so far assuming that the satellite optical communication network will spread in the suburbs. However, some service requests possibly fail to be dealt with due to the properties of the individual link configuration.

It is an object of one aspect of an embodiment of the present invention to provide an optical space communication management device that performs a control responding to requests for various kinds of communication services not for each of individual link configuration or for each of satellite optical communication networks of individual satellite communication providers, but effectively using various link configuration and satellite optical communication networks of a plurality of satellite communication providers, and transmits an optical modulation signal via an appropriate communication network.

Solutions to the Problems

An optical space communication management device according to the present invention is an optical space communication management device that performs a link control to optical space communication devices based on link path information and a link parameter. The optical space communication devices are installed in at least one of a satellite and a flying object of a non-terrestrial node group, and an optical ground station. The optical space communication devices perform an optical space communication using one or a plurality of links. The link path information and the link parameter are for transmitting and receiving communication service data based on service requests of the plurality of links and link monitoring information of the plurality of links. The service requests and the link monitoring information are received from at least one of the satellite and the flying object of the non-terrestrial node group, and the optical ground station. The optical space communication management device includes: a link monitoring unit that measures the link monitoring information of the plurality of links between the optical space communication devices between which the communication service data is transmitted and received; a service request collection unit that collects the service requests; a position calculation unit that calculates position information of at least one of the satellite and the flying object; a link parameter calculation unit that calculates the link path information and the link parameter based on the position information calculated by the position calculation unit, the service requests collected by the service request collection unit, and the link monitoring information measured by the link monitoring unit; a link control unit that performs the link control to the optical space communication devices based on the link path information and the link parameter calculated by the link parameter calculation unit; and a link information communication unit that communicates the service request, the link monitoring information, the link path information, and the link parameter with at least one of the satellite and the flying object of the non-terrestrial node group, and the optical ground station.

An optical space communication system according to the present invention is an optical communication system including: optical space communication devices installed in at least one of a satellite and a flying object of a non-terrestrial node group, and an optical ground station, the optical space communication devices performing an optical space communication using one or a plurality of links; and an optical space communication management device that performs a link control based on link path information and a link parameter, the link path information and the link parameter being for transmitting and receiving communication service data based on service requests of the plurality of links and link monitoring information of the plurality of links, the service requests and the link monitoring information being received from at least one of the satellite and the flying object of the non-terrestrial node group, and the optical ground station. The optical space communication management device includes: a link monitoring unit that measures the link monitoring information of the plurality of links between the optical space communication devices between which the communication service data is transmitted and received; a service request collection unit that collects the service requests; a position calculation unit that calculates position information of at least one of the satellite and the flying object; a link parameter calculation unit that calculates the link parameter based on the position information calculated by the position calculation unit, the service requests collected by the service request collection unit, and the link monitoring information measured by the link monitoring unit; a link control unit that performs the link control to the optical space communication devices based on the link path information and the link parameter calculated by the link parameter calculation unit; and a link information communication unit that communicates the service request, the link monitoring information, the link path information, and the link parameter with at least one of the satellite and the flying object of the non-terrestrial node group and the optical ground station. The optical space communication devices are controlled by the link control based on the link path information and the link parameter from the optical space communication management device, and transmit and receive an optical modulation signal including the communication service data.

An optical space communication management method according to the present invention is an optical space communication management method in an optical space communication management device that performs a link control to optical space communication devices based on link path information and a link parameter. The optical space communication devices are installed in at least one of a satellite and a flying object of a non-terrestrial node group, and an optical ground station. The optical space communication devices perform an optical space communication using one or a plurality of links. The link path information and the link parameter are for transmitting and receiving communication service data based on service requests of the plurality of links and link monitoring information of the plurality of links. The service requests and the link monitoring information are received from at least one of the satellite and the flying object of the non-terrestrial node group, and the optical ground station. The optical space communication management method includes: a first step of measuring the link monitoring information of the plurality of links between the optical space communication devices between which the communication service data is transmitted and received; a second step of collecting the service requests; a third step of calculating position information of at least one of the satellite and the flying object; a fourth step of calculating the link path information and the link parameter based on the position information calculated by the third step, the service requests collected by the second step, and the link monitoring information measured by the first step; a fifth step of performing the link control to the optical space communication devices based on the link path information and the link parameter calculated by the fourth step; and a sixth step of communicating the service request, the link monitoring information, the link path information, and the link parameter link information with at least one of the satellite and the flying object of the non-terrestrial node group, and the optical ground station.

Effects of the Invention

According to the present invention, one aspect of the embodiment of the present invention can achieve the optical space communication management device that performs a control responding to requests for various kinds of communication services not for each of individual link configuration or for each of satellite optical communication networks of individual satellite communication providers, but effectively using various link configuration and satellite optical communication networks of a plurality of satellite communication providers, and transmits an optical modulation signal via a satellite optical communication network of an appropriate link.

BRIEF DESCRIPTION OF THE DRAWINGS

FIG. 2 is a block diagram illustrating an exemplary configuration of the optical space communication system of the embodiment.

FIG. 4 is a drawing illustrating an example of a detailed block configuration of an optical space communication management device.

FIG. 9 is a drawing illustrating an exemplary configuration of the transmitting-side digital signal processing unit that employs a Nyquist frequency division multiplexing scheme.

FIG. 10 is a drawing illustrating an example of a specific configuration of the transmitting-side digital signal processing unit when an orthogonal frequency division multiplexing scheme and the digital coherent optical communication system are employed.

FIG. 18 is a drawing illustrating an exemplary configuration of the receiving-side digital signal processing unit that employs the Nyquist frequency division multiplexing scheme.

FIG. 20 is a drawing illustrating an example of a detailed block configuration of an optical receiver that employs the optical intensity modulation scheme.

FIG. 22 is a drawing illustrating an example of a detailed block configuration of a first configuration of an optical receiver that employs the optical phase modulation scheme.

FIG. 25 is a drawing illustrating an exemplary sequence for describing an optical space communication management function of the embodiment.

FIG. 26 is a drawing illustrating examples of a link monitoring information database and the like of the embodiment.

FIG. 27 is a drawing illustrating an example of a position information database of the embodiment.

DESCRIPTION OF PREFERRED EMBODIMENTS

The following describes one aspect of the embodiment of the present invention in detail with reference to the drawings.

The embodiment is especially targeted to an optical space communication between satellites including a plurality of link configuration, such as, especially, between a geostationary earth orbit satellite and a low earth orbit satellite, between two low earth orbit satellites, and between equipment installed on the ground and a geostationary earth orbit satellite or a low earth orbit satellite.

Embodiment

Figure 1:
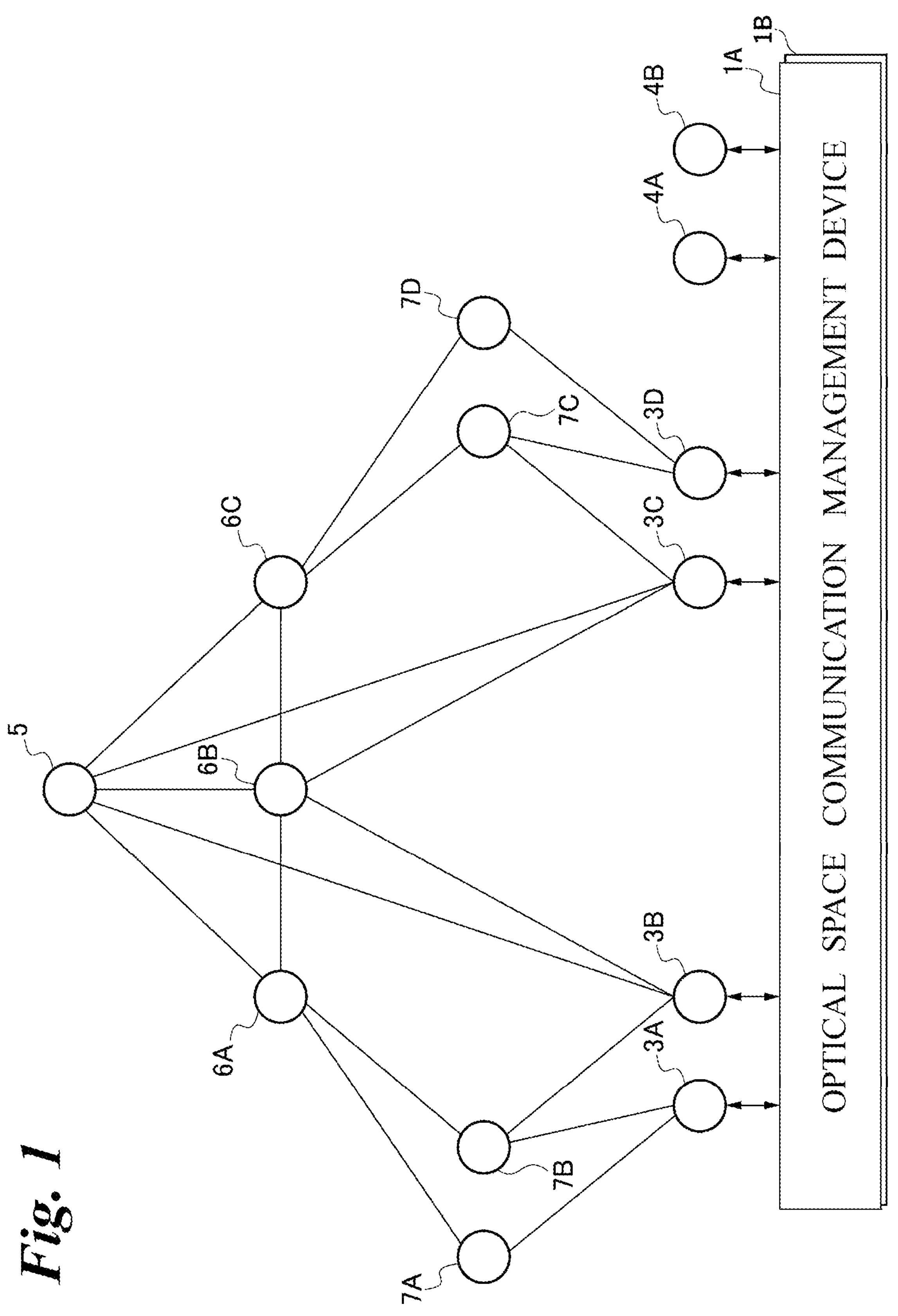
FIG. 1 is a schematic diagram illustrating an exemplary configuration of an optical space communication system of the embodiment.

FIG. 1 illustrates an exemplary configuration of an optical space communication system of the embodiment. The optical space communication system to which the present invention is applied includes a non-terrestrial node group, optical ground stations 3A to 3D, and wireless ground stations 4A, 4B. The non-terrestrial node group includes a geostationary orbit satellite 5 on geostationary orbits, low earth orbit satellites 6A to 6C on a low earth orbit, and further, flying objects 7A to 7D flying in the air. The optical ground stations 3A to 3D and the wireless ground stations 4A, 4B are installed on the ground. The geostationary orbit satellite 5, the low earth orbit satellites 6A to 6C, the flying objects 7A to 7D, the optical ground stations 3A to 3D, and the wireless ground stations 4A, 4B are each link-controlled by an optical space communication management device 1 (1A, 1B).

FIG. 2 is a block diagram illustrating an exemplary configuration of the optical space communication system to which the present invention is applied. As illustrated in FIG. 2, the optical space communication system includes one or a plurality of optical space communication devices 2 and the optical space communication management device 1. The one or a plurality of optical space communication devices 2 are installed in at least one of the geostationary orbit satellite 5, the low earth orbit satellite 6, and the flying object 7 as the non-terrestrial node group and the optical ground station 3. The optical space communication management device 1 performs the link control based on link path information and a link parameter for transmitting and receiving communication service data based on a service request and link monitoring information received from the geostationary orbit satellite 5, the low earth orbit satellite 6, and the flying object 7 in the non-terrestrial node group and the optical ground station 3. A pair of the optical space communication devices 2 transmit and receive the communication service data via a link of an optical space communication, and the wireless ground station 4 transmits and receives link information on the communication service data via a wireless control link such as a radio wave. The optical space communication management device 1 may further perform a link control based on environmental information and weather information received from an environmental/weather information collection device 8. The link information includes the service requests, the link monitoring information, the link path information, and the link parameters of a plurality of respective links relating to the geostationary orbit satellite 5, the low earth orbit satellite 6, and the flying object 7 of the non-terrestrial node group and the optical ground station 3.

For example, the geostationary orbit satellite 5 is a satellite on a geostationary orbit, and includes one or a plurality of optical space communication devices 2, a geostationary orbit satellite control unit 51 that controls the geostationary orbit satellite 5, and a geostationary orbit satellite communication unit 52. For example, the low earth orbit satellite 6 (6A to 6C) is a satellite on a low earth orbit, and includes one or a plurality of optical space communication devices 2, a low earth orbit satellite control unit 61 that controls the low earth orbit satellite 6, and a low earth orbit satellite communication unit 62.

For example, the flying object 7 (7A to 7D) is an aircraft, a drone, a high altitude pseudolite (HAPS: High Altitude Platform Station), a helicopter, an unmanned aircraft (UAV: Unmanned Aerial Vehicle), or the like, and includes one or a plurality of optical space communication devices 2, a flying object control unit 71 that controls the flying object 7, and a flying object communication unit 72. The geostationary orbit satellite control unit 51, the low earth orbit satellite control unit 61, and the flying object control unit 71 are, for example, electronic circuits or the like configured of electronic devices or the like installable as on-board devices, such as an FPGA (Field Programmable Gated Array) or a CPU (Central Processing Unit).

The geostationary orbit satellite control unit 51 controls an attitude and the like on the orbit of the geostationary orbit satellite 5. The low earth orbit satellite control unit 61 controls an attitude and the like on the orbit of the low earth orbit satellite 6. The flying object control unit 71 controls an attitude and the like during flying of the flying object 7.

A group including at least one or more of one or a plurality of geostationary orbit satellites 5, one or a plurality of low earth orbit satellites 6, and one or a plurality of flying objects 7 may be referred to as a non-terrestrial node group, and the optical communication system of the embodiment can be said to include the optical space communication devices 2 included in the respective non-terrestrial node groups.

The optical ground station 3 (3A to 3D) is an apparatus installed on the ground, and different from the non-terrestrial node group, directly connected to the optical space communication management device 1 via a control link, such as a wired or wireless LAN (Local Area Network), a terrestrial mobile link, and an RF feeder link. The optical ground station 3 (3A to 3D) includes the optical space communication device 2, an optical ground station control unit 31, and an optical ground station communication unit 32. The optical ground station control unit 31 controls directional angles (Azimuth Angle, Elevation Angle) necessary for performing the optical space communication on the optical ground station 3. The optical ground station communication unit 32 communicates link information with the optical space communication management device 1. The link information includes the service requests, the link monitoring information, the link path information, and the link parameters of a plurality of respective links relating to the geostationary orbit satellite 5, the low earth orbit satellite 6, and the flying object 7 of the non-terrestrial node group and the optical ground station 3. The optical ground station 3 (3A to 3D) may be installed not only on the ground, but also on a ship at sea, and may be installed on an astronomical body, a planet, or the like.

The environmental information collection device 8 (8A, 8B) includes an environmental information collection unit 801, a weather information collection unit 802, an environmental information database DB6, and a weather information database DB7. The environmental information collection unit 801 collects environmental information regarding the environments in which the optical ground station 3 and the flying object 7 are located. The weather information collection unit 802 collects weather information of regions in which the optical ground station 3 and the flying object 7 are located. The environmental information database DB6 that stores the environmental information collected by the environmental information collection unit 801. The weather information database DB7 stores the weather information collected by the weather information collection unit 802. The environmental information collection device 8 (8A, 8B) communicates the collected environmental information and weather information to the optical space communication management device 1. The environmental information collection unit 801 may be installed on the ground or a ship at sea, may be installed on an astronomical body, a planet, or the like, and may be installed on a flying object, such as an unmanned aircraft, or on a satellite or the like in cosmic space. The weather information collection unit 802 may collect the weather information from a cloud, Internet, and the like, and may be configured to determine the weather information from the environmental information obtained by the environmental information collection unit 801. The environmental information includes environments, for example, a temperature, a humidity, a wind speed, a wind direction, a cloud cover, a cloud height, a rainfall, an air pressure, an illuminance, an all-sky camera image, and the like. The environmental information may include the weather information. The environmental information includes information obtained by environmental sensors, for example, an all-sky camera, a nephometer, a ceilometer, a thermometer, a hygrometer, a barometer, an illuminometer, an anemometer, a wind vane, a rain gauge, and the like. The weather information includes weathers from the past to the present, such as a clear weather, a rainy weather, a cloudy weather, of the respective regions, weather predictions of the respective regions, and the like. The environmental information database DB6 and the weather information database DB7 are stored in a storage device, such as a ROM (Read Only Memory) and a hard disk.

The optical space communication management device 1 includes a link monitoring unit 11, a link control unit 12, a link parameter calculation unit 10, a link information communication unit 14, a position calculation unit 13, and a service request collection unit 17. The link monitoring unit 11 measures link monitoring information of a plurality of links between the optical space communication devices 2 transmitting and receiving the communication service data. The link control unit 12 performs a link control to the optical space communication device 2 based on the link path information and the link parameter. The link parameter calculation unit 10 calculates the link path information and the link parameter based on the service request and the link monitoring information for performing the link control. The link information communication unit 14 communicates the link information with the optical ground station 3 and the wireless ground station 4. The position calculation unit 13 calculates a position of at least one of the geostationary orbit satellite 5, the low earth orbit satellite 6 and the flying object 7. The service request collection unit 17 is connected to the link information communication unit 14. The link information includes the service requests, the link monitoring information, the link path information, and the link parameters of a plurality of respective links relating to the geostationary orbit satellite 5, the low earth orbit satellite 6, and the flying object 7 of the non-terrestrial node group and the optical ground station 3. The optical space communication management device 1 (1A, 1B) may be installed not only on the ground, but also on a ship at sea, and may be installed on an astronomical body, a planet, or the like.

The link information communication unit 14 receives the service request and the link monitoring information from the geostationary orbit satellite 5, the low earth orbit satellite 6, and the flying object 7 of the non-terrestrial node group and the optical ground station 3 via the optical ground station communication unit 32 of the optical ground station 3 and a wireless ground station communication unit 42 described below of the wireless ground station 4. The link information communication unit 14 transmits the received link monitoring information to the link monitoring unit 11. The service request received by the link information communication unit 14 is collected by the service request collection unit 17. The service request collection unit 17 stores the collected service request to a service request information database DB3. The link monitoring unit 11 stores the link monitoring information in a link monitoring information database DB2 described below. The position calculation unit 13 transmits position information calculated based on orbit information stored in a position information database DB5 described below to the link parameter calculation unit 10. The link parameter calculation unit 10 refers to information stored in a link path information database DB1, information stored in a link parameter information database DB4, the information stored in the service request information database DB3 and the link monitoring information database DB2, and the position information transmitted from the position calculation unit 13, calculates the link path information and the link parameter, and then transmits the link path information and the link parameter to the link control unit 12. The link parameter calculation unit 10 may calculate the linklink path information and the link parameter by further referring to the environmental information stored in the environmental information database DB6 and the weather information stored in the weather information database DB7. The link control unit 12 transmits the link path information and the link parameter to the link information communication unit 14, performs the link control to the optical space communication device 2 included in the non-terrestrial node group via a wireless ground station wireless communication unit 41 of the wireless ground station 4 described below, and performs the link control to the optical space communication device 2 included in the optical ground station 3 via the optical ground station communication unit 32. The link control unit 12 stores the link path information and the link parameter in the link path information database DB1 and the link parameter information database DB4. The link path information database DB1, the link monitoring information database DB2, the service request information database DB3, the link parameter information database DB4, and the position information database DB5 are stored in a storage device, such as a ROM (Read Only Memory) and a hard disk. The link parameter calculation unit 10, the link monitoring unit 11, the link control unit 12, the link information communication unit, and the position calculation unit 13 may be electronic circuits or the like configured of electronic devices or the like installable as on-board devices, such as an FPGA (Field Programmable Gated Array) or a CPU (Central Processing Unit), and may be servers or PCs capable of using AI (Artificial Intelligence), performing a machine learning, or the like. The link parameter calculation unit 10, the link monitoring unit 11, the link control unit 12, the link information communication unit, and the position calculation unit 13 may be collectively configured as an SDN (Software Defined Network) controller.

The link control unit 12 of the optical space communication management device 1 transmits the link path information and the link parameter to the optical ground station communication unit 32 of the optical ground station 3 via the link information communication unit 14. The link control unit 12 of the optical space communication management device 1 transmits the link path information and the link parameter to the wireless ground station communication unit 42 described below of the wireless ground station 4 via the link information communication unit 14.

The wireless ground station 4 (4A, 4B) is an apparatus that communicates the link information of the respective links for transmitting and receiving the communication service data with the plurality of optical space communication devices 2 via control links for satellite communication of a radio wave as described above or the like. The wireless ground station 4 (4A, 4B) includes the wireless ground station wireless communication unit 41, the wireless ground station communication unit 42, and a wireless ground station control unit 43. The wireless ground station communication unit 42 may be configured of an electronic circuit or the like configured of electronic devices or the like installable as on-board devices, such as an FPGA (Field Programmable Gated Array) or a CPU (Central Processing Unit), and may be a communication device for wired data transmission and reception compatible with Ethernet used for terrestrial networks, or a communication device for wireless data transmission and reception. The wireless ground station wireless communication unit 41 may be configured of an electronic circuit or the like configured of electronic devices or the like installable as on-board devices, such as an FPGA (Field Programmable Gated Array) or a CPU (Central Processing Unit), and includes a communication device for transmitting and receiving data by a radio wave for satellite communication, an antenna for satellite communication, and the like. The link information includes the service requests, the link monitoring information, the link path information, and the link parameters of a plurality of respective links relating to the geostationary orbit satellite 5, the low earth orbit satellite 6, and the flying object 7 of the non-terrestrial node group and the optical ground station 3. The wireless ground station 4 (4A, 4B) may be installed not only on the ground, but also on a ship at sea, and may be installed on an astronomical body, a planet, or the like.

The wireless ground station wireless communication unit 41 communicates the link information with the geostationary orbit satellite communication unit 52 of the geostationary orbit satellite 5, the low earth orbit satellite communication unit 62 of the low earth orbit satellite 6, or the flying object communication unit 72 of the flying object 7. The wireless ground station control unit 43 controls directional angles (Azimuth, Elevation) necessary for performing the optical space communication on the wireless ground station 4. The wireless ground station communication unit 42 communicates the link information with the link information communication unit 14 of the optical space communication management device 1. The link information includes the service requests, the link monitoring information, the link path information, and the link parameters of a plurality of respective links relating to the geostationary orbit satellite 5, the low earth orbit satellite 6, and the flying object 7 of the non-terrestrial node group and the optical ground station 3.

For example, the wireless ground station 4 is connected to the optical space communication management device 1 by a control link, such as a wired or wireless LAN (Local Area Network), a terrestrial mobile link, and an RF feeder link.

The optical space communication device 2 is controlled based on the link control from the optical space communication management device 1, performs processes, and includes optical units 21_1, . . . 21_*n*, an optical space communication device control unit 22, a communication service processing unit 23, and optical communication units 202_1, . . . 202_*n*. The optical space communication device control unit 22 and the communication service processing unit 23 are configured of electronic circuits or the like configured of electronic devices or the like installable as on-board devices, such as an FPGA (Field Programmable Gated Array) or a CPU (Central Processing Unit), and the optical unit 21 includes an optical antenna, such as a lens, an optical element, such as a mirror, an optical sensor, and an optical filter, and the like.

The optical unit 21 shapes or collects a light beam transmitted from the satellite, the flying object, or the like by the optical antenna, and further performs capturing, tracking, and directional control of the light beam corresponding to the satellite, the flying object, or the like.

When the optical space communication device 2 is included in the optical ground station 3, the optical space communication device control unit 22 obtains the link path information and the link parameter from the link control unit 12 of the optical space communication management device 1 via the optical ground station communication unit 32 and the link information communication unit 14 of the optical space communication management device 1, and accepts the link control. The optical space communication device control unit 22 that has obtained the link path information and the link parameter controls the parameters and the path information of the optical units 21_1, . . . 21_*n*, the optical communication units 202_1, . . . 202_*n*, and the communication service processing unit 23 of the optical space communication device 2.

When the optical space communication device 2 is included in the optical ground station 3, the optical space communication device control unit 22 transmits the service request and the link monitoring information of the link via the optical ground station 3 to the optical ground station communication unit 32 and the link information communication unit 14 of the optical space communication management device 1. The link information communication unit 14 transmits the link monitoring information to the link monitoring unit 11 of the optical space communication management device 1, and stores the service request of the link via the optical ground station 3 to the service request DB. When the optical space communication device 2 is included in the non-terrestrial node group, the optical space communication device control unit 22 transmits the service request and the link monitoring information to the optical space communication management device 1 via the geostationary orbit satellite communication unit 52 of the geostationary orbit satellite 5, the low earth orbit satellite communication unit 62 of the low earth orbit satellite 6, or the flying object communication unit 72 of the flying object 7, the wireless ground station wireless communication unit 41 of the wireless ground station 4, and the wireless ground station communication unit 42 of the wireless ground station 4.

When the optical space communication device 2 is included in the optical ground station 3, the optical space communication device control unit 22 receives the link path information and the link parameter of the link via the optical ground station 3 from the link control unit 12 of the optical space communication management device 1 via the optical ground station communication unit 32 and the link information communication unit 14 of the optical space communication management device 1. When the optical space communication device 2 is included in the non-terrestrial node group, the optical space communication device control unit 22 receives the link path information and the link parameter from the link control unit 12 of the optical space communication management device 1 via the geostationary orbit satellite communication unit 52 of the geostationary orbit satellite 5, the low earth orbit satellite communication unit 62 of the low earth orbit satellite 6, or the flying object communication unit 72 of the flying object 7, the wireless ground station wireless communication unit 41 of the wireless ground station 4, and the wireless ground station communication unit 42 of the wireless ground station 4.

The communication service processing unit 23 performs a process of the communication service data transmitted and received by the link, setting of the routing, allocation of communication bands, and setting of whether to perform encryption or not. When the optical space communication device 2 is included in the optical ground station 3, the communication service processing unit 23 transmits the service request to the optical space communication device control unit 22 based on the communication service data from a terrestrial network including a mobile communication network, an optical backbone communication network, and the like provided by business companies connected to a cloud or the like. When the optical space communication device 2 is included in the optical ground station 3, and the optical ground station 3 is installed on a ship or the like, the communication service processing unit 23 transmits the service request to the optical space communication device control unit 22 based on communication service data generated from a user on the ship or a marine resource exploration image or the like obtained by a user device installed on the ship. When the optical space communication device 2 is included in the optical ground station 3, and the optical ground station 3 is installed on a planet, an astronomical body, or the like, the communication service processing unit 23 transmits the service request to the optical space communication device control unit 22 based on communication service data generated from a user staying in the proximity of the planet or the astronomical body, or a planet image, an astronomical body image, or the like obtained by a user device installed in the proximity of the planet or the astronomical body. The optical space communication device control unit 22 transmits the service request to the optical space communication management device 1 via a control link, such as a wired or wireless LAN.

When the optical space communication devices 2 are included in the geostationary orbit satellite 5, the low earth orbit satellite 6, and the flying object 7 of the non-terrestrial node group, the optical space communication device control unit 22 may transmit the service request and the link monitoring information of one or a plurality of links from the geostationary orbit satellite 5, the low earth orbit satellite 6, and the flying object 7 of the non-terrestrial node group to the optical ground station 3 or the geostationary orbit satellite 5, the low earth orbit satellite 6, and the flying object 7 of another non-terrestrial node group via the communication service processing unit 23 while including the service request and the link monitoring information of the one or a plurality of links in a packet, a pilot signal, or the like together with the communication service data.

When the optical space communication device 2 is included in the optical ground station 3, the optical space communication device control unit 22 may receive the service request and the link monitoring information of one or a plurality of links from the geostationary orbit satellite 5, the low earth orbit satellite 6, and the flying object 7 of the non-terrestrial node group via the communication service processing unit 23 while including the service request and the link monitoring information of the one or a plurality of links in a packet, a pilot signal, or the like together with the communication service data. The optical space communication device control unit 22 transmits the received service request and link monitoring information to the optical space communication management device 1 via the optical ground station communication unit 32.

When the optical space communication device 2 is included in the optical ground station 3, the optical space communication device control unit 22 may transmit the link path information and the link parameter of one or a plurality of links to the geostationary orbit satellite 5, the low earth orbit satellite 6, and the flying object 7 of the non-terrestrial node group via the communication service processing unit 23 while including the link path information and the link parameter of the one or a plurality of links in a packet, a pilot signal, or the like together with the communication service data. The optical space communication device control unit 22 receives the link path information and the link parameter from the optical space communication management device 1 via the optical ground station communication unit 32.

When the optical space communication devices 2 are included in the geostationary orbit satellite 5, the low earth orbit satellite 6, and the flying object 7 of the non-terrestrial node group, the optical space communication device control unit 22 may receive the link path information and the link parameter of one or a plurality of links from the geostationary orbit satellite 5, the low earth orbit satellite 6, and the flying object 7 of the non-terrestrial node group by the optical ground station 3 or the geostationary orbit satellite 5, the low earth orbit satellite 6, and the flying object 7 of the non-terrestrial node group via the communication service processing unit 23 while including the link path information and the link parameter of the one or a plurality of links in a packet, a pilot signal, or the like together with the communication service data.

When the optical space communication device 2 is included in the geostationary orbit satellite 5, the low earth orbit satellite 6, and the flying object 7 of the non-terrestrial node group, the communication service processing unit 23 transmits the service request to the optical space communication device control unit 22 based on user data, such as an earth observation image, obtained by a user device (not illustrated), such as an optical sensor and a synthetic aperture radar (SAR: Synthetic Aperture Radar), included in the non-terrestrial node group, the communication service data from a terrestrial network including a mobile communication network, an optical backbone communication network, and the like provided by business companies connected to a cloud or the like, or the communication service data generated from a user on the flying object 7 or the like. The optical space communication device control unit 22 transmits the transmitted service request to the optical space communication management device 1 via the geostationary orbit satellite communication unit 52 of the geostationary orbit satellite 5, the low earth orbit satellite communication unit 62 of the low earth orbit satellite 6, or the flying object communication unit 72 of the flying object 7, the wireless ground station wireless communication unit 41 of the wireless ground station 4, and the wireless ground station communication unit 42 of the wireless ground station 4.

The geostationary orbit satellite 5, the low earth orbit satellite 6 (6A to 6C), and the flying object 7 (7A to 7D) may include an RF communication device (not illustrated) configured to aggregate the communication service data from a user connected to a terrestrial network and the communication service data from an aircraft, a drone, a high altitude pseudolite, a helicopter, an unmanned aircraft, or the like as the flying object 7. The communication service data aggregated by the RF communication device (not illustrated) may be transmitted to the communication service processing unit 23, and processed by the communication service processing unit 23.

Based on the link control from the optical space communication device control unit 22, the optical communication units 202_1, . . . **202_*n* convert the communication service data from the communication service processing unit 23 into optical modulation signals. As further illustrated in a drawing of an example of a detailed block configuration in FIG. 3, when a plurality of links are present, the optical space communication device 2 may include optical communication units 201 and the optical units 21 corresponding to the respective links. For example, when the number of the links is n, the n optical communication units 202_1, . . . , 202_*n* and the n optical units 21_1, . . . , 21_*n* may be provided. In contrast, for example, when the number of the links is one, the one optical communication unit 202_1 and the one optical unit 21_1** are provided.

The optical communication units 202_1, . . . , **202_*n* amplify optical powers of optical modulation signals in a transmitting side and optical modulation signals in a receiving side via the optical units 21_1, . . . , 21_*n*. The optical communication units 202_1, . . . , 202_*n* set a modulation scheme, the number of wavelengths, an optical output power of a high-output optical amplifier 92 described below, a type of an error correction code, a code rate, and the like. The optical communication unit 202 may be configured of a digital coherent optical transceiver, an optical phase modulation optical transceiver, an optical intensity modulation optical transceiver, or the like, which is configured to adaptively switch the link parameter. With the optical communication unit 202, the light amplification and the adaptive switching and setting of the link parameter can be performed for each link. Also in the optical unit 21, the adaptive switching and setting of the link parameter specific to the optical unit 21**, for example, a beam divergence angle, may be performed for each link.

Figure 3:
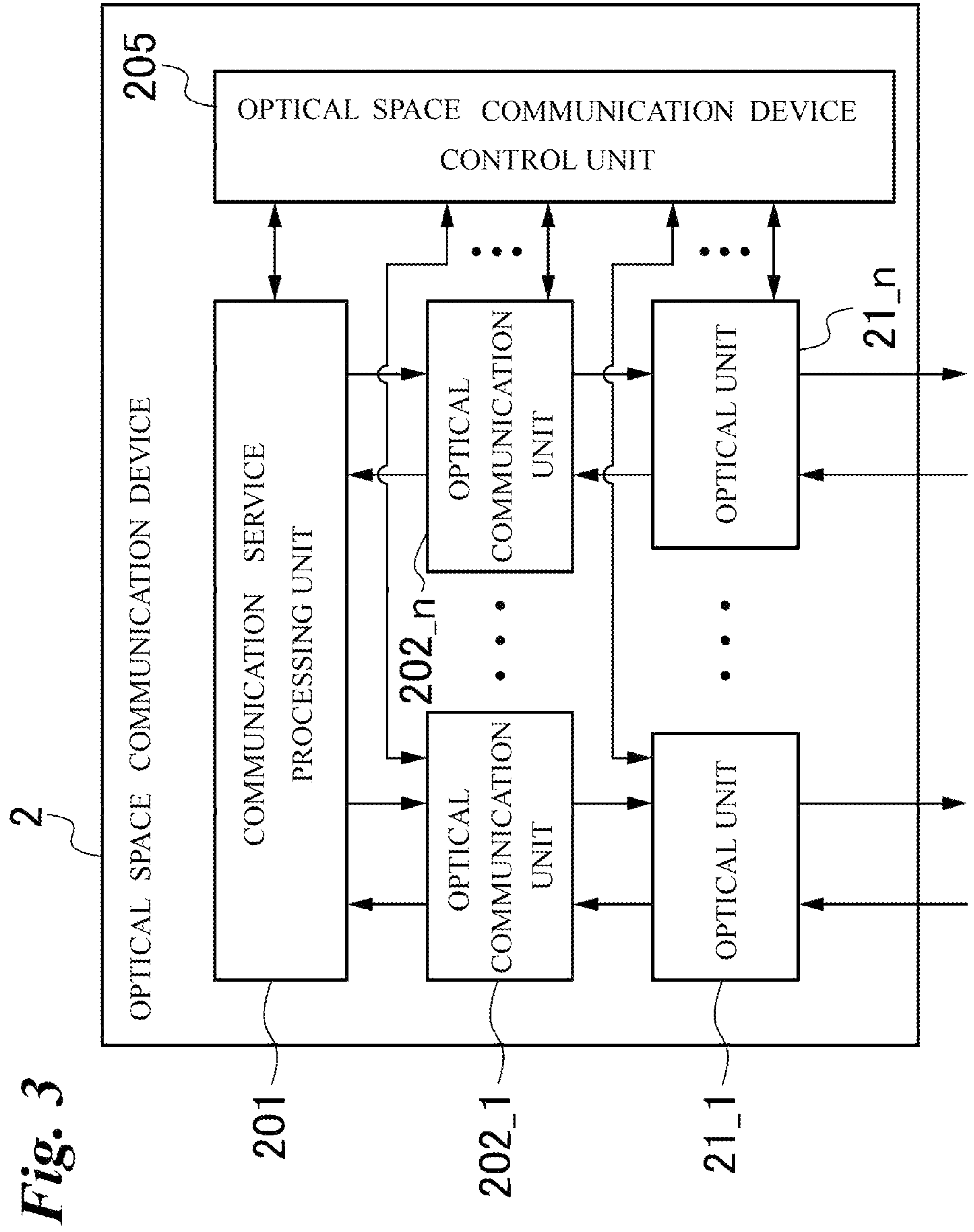
FIG. 3 is a drawing illustrating an example of a detailed block configuration of an optical space communication device.

The optical space communication device 2 in the configuration of FIG. 3 further includes a communication service processing unit 201, and further an optical space communication device control unit 205.

The communication service processing unit 201 is connected to the optical communication units 202_1, . . . , **202_*n* allocated to the respective links, and performs setting of the routing, allocation of communication bands, setting of whether to perform encryption or not, and the like. While the one communication service processing unit 201 is provided because it is capable of processing a plurality of links, for example, when the n links are provided, the n communication service processing units 201_1, . . . , 201_*n*** (not illustrated) may be provided.

The communication service processing unit 201 may be configured of an SDN (SDN: Software Defined Network) switch or the like that allows reconfiguration of the hardware. The communication service processing unit 201 may be provided with a communication protocol, such as IP (Internet Protocol), TCP (Transmission Control Protocol), and UDP (User Datagram Protocol), and a routing control technique, such as RIP (Routing Information Protocol), OSPF (Open Shortest Path First), MPLS (Multi-Protocol Label Switching), GMPLS (Generalized Multi-Protocol Label Switching), and DTN (Delay Tolerant Networking). The communication service processing unit 201 may be configured to handle data of a communication standard referred to as Ethernet, for example, 1 GbE (1G Ethernet), 10 GbE (10G Ethernet), 100 GbE (100G Ethernet), and 400 GbE (400G Ethernet), data of optical transmission standard, such as OTN (Optical Transport Network), and data of a mobile network, such as 5G (5th Generation).

When the optical space communication devices 2 are included in the geostationary orbit satellite 5, the low earth orbit satellite 6, and the flying object 7 of the non-terrestrial node group, the communication service processing unit 201 may transmit the service request and the link monitoring information to the optical ground station 3 or the geostationary orbit satellite 5, the low earth orbit satellite 6, and the flying object 7 of the non-terrestrial node group, and receive the link path information and the link parameter from the optical ground station 3 while including these pieces of information in a packet, a pilot signal, or the like together with the communication service data. Between the communication service processing unit 201 and the optical space communication device control unit 205, the service request, the link monitoring information, the link path information, and the link parameter are transmitted and received.

When the optical space communication device 2 is included in the optical ground station 3, the communication service processing unit 201 may transmit the link path information and the link parameter to the geostationary orbit satellite 5, the low earth orbit satellite 6, and the flying object 7 of the non-terrestrial node group, and receive the service request and the link monitoring information from the geostationary orbit satellite 5, the low earth orbit satellite 6, and the flying object 7 of the non-terrestrial node group while including these pieces of information in a packet signal or the like together with the communication service data. Between the communication service processing unit 201 and the optical space communication device control unit 205, the service request, the link monitoring information, the link path information, and the link parameter are transmitted and received.

The optical space communication device control unit 205 performs various controls of collecting the link monitoring information from the optical unit 21, the optical communication unit 202, and the like, controlling the link parameter, setting the link path information, and the like.

As illustrated in a drawing of an example of a detailed block configuration in FIG. 4, the optical space communication management device 1 may be configured to receive the link monitoring information and the service request from one or a plurality of links relating to the geostationary orbit satellite 5, the low earth orbit satellite 6, and the flying object 7 of the non-terrestrial node group and the optical ground station 3, and transmit the link path information and the link parameter to the one or a plurality of links relating to the geostationary orbit satellite 5, the low earth orbit satellite 6, and the flying object 7 of the non-terrestrial node group and the optical ground station 3.

In this case, as illustrated in FIG. 4, the optical space communication management device 1 is configured by connecting each of the link path information database DB1, the link monitoring information database DB2, the service request information database DB3, the link parameter information database DB4, and the position information database DB5 to the link parameter calculation unit 10, and connecting the link control unit 12 to the link path information database DB1 and the link parameter information database DB4. The link information communication unit 14 is connected to the link control unit 12, and the link monitoring unit 11 is connected to the link monitoring information database DB2. The position calculation unit 13 is connected to the position information database DB5.

In this case, the link monitoring unit 11 can receive the link monitoring information of a plurality of respective links of the geostationary orbit satellite 5, the low earth orbit satellite 6, and the flying object 7, and perform the measurement. For the service request, similarly, the service request information database DB3 can acquire the service requests of the plurality of respective links of the geostationary orbit satellite 5, the low earth orbit satellite 6, and the flying object 7. Further, the link control unit 12 and the link information communication unit 14 can each transmit the link path information and the link parameters to the plurality of respective links relating to the optical ground station 3, the geostationary orbit satellite 5, the low earth orbit satellite 6, and the flying object 7.

In this case, as illustrated in FIG. 4, the optical space communication management device 1 is configured by connecting each of the link path information database DB1, the link monitoring information database DB2, the service request information database DB3, the link parameter information database DB4, the position information database DB5, and the environmental information database DB6 and the weather information database DB7 of the environmental/weather information collection device 8 to the link parameter calculation unit 10, and connecting the link control unit 12 to the link path information database DB1 and the link parameter information database DB4. The link information communication unit 14 is connected to the link control unit 12, and the link monitoring unit 11 is connected to the link monitoring information database DB2. The position calculation unit 13 is connected to the position information database DB5.

Next, with reference to FIG. 5, a case where the optical communication unit 202 converts one piece of communication service data from the communication service processing unit 23 into an optical modulation signal of one wavelength, and outputs the optical modulation signal to the optical unit 21 will be described. Additionally, in FIG. 5, a case where the optical communication unit 202 converts an optical modulation signal of one wavelength input from the optical unit 21 into one piece of communication service data, and transmits the communication service data to the communication service processing unit will be described.

Figure 5:
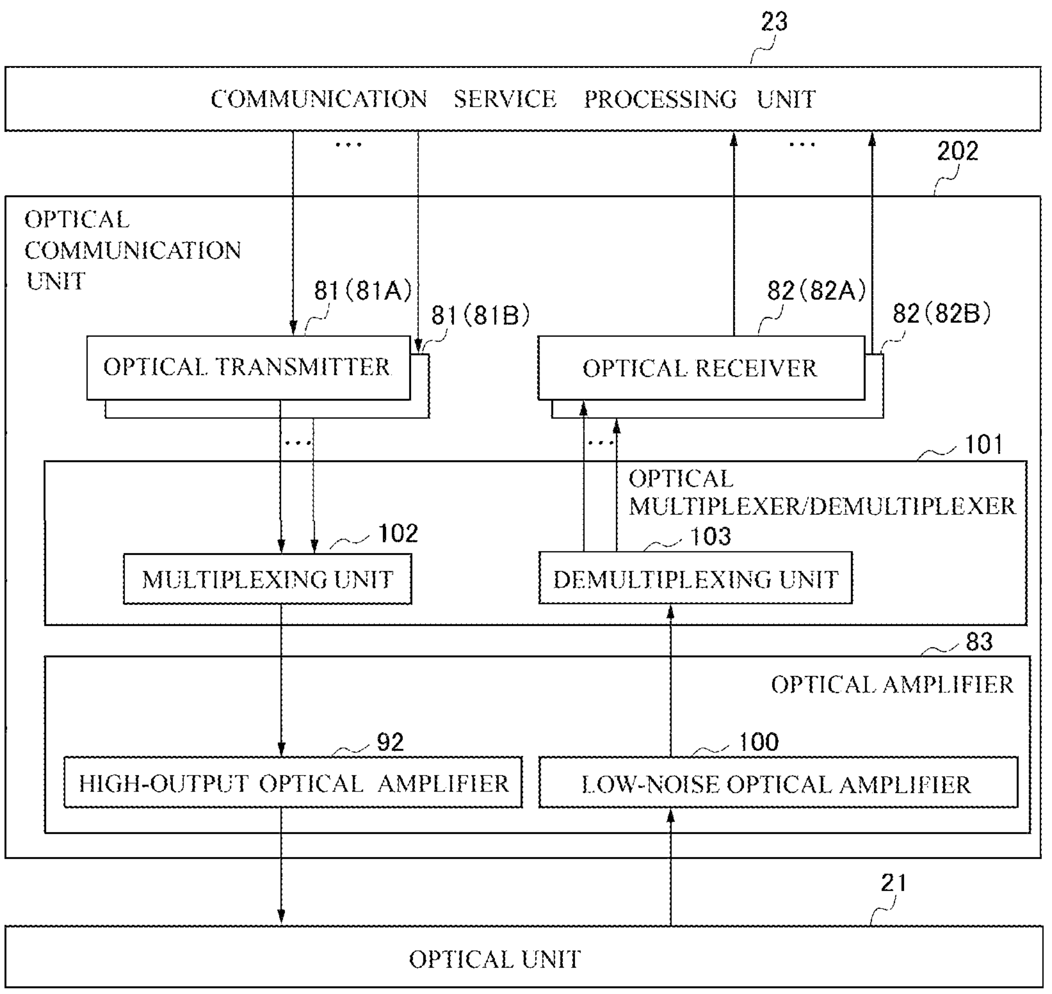
FIG. 5 is a block diagram illustrating an exemplary configuration of an optical communication unit of the embodiment.

FIG. 5 is a block diagram illustrating an exemplary configuration of an optical communication unit of the embodiment. The optical communication unit 202 includes an optical transmitter 81, an optical receiver 82, and an optical amplifier 83. The optical transmitter 81 converts the communication service data into an optical modulation signal and transmits the optical modulation signal. The optical receiver 82 converts an optical modulation signal into communication service data and receives the communication service data. The optical amplifier 83 is a device that amplifies the optical modulation signal received from the optical unit 21 and the optical modulation signal to be transmitted to the optical unit 21.

First, a case without an optical transmitter 81B and an optical receiver 82B will be described. While details will be described below, when the optical communication unit 202 includes an optical multiplexer/demultiplexer 101, the optical transmitter 81B, and the optical receiver 82B, the optical communication unit 202 can handle a Wavelength Division Multiplexing (WDM) optical modulation signal in which an optical modulation signals with a plurality of wavelengths are multiplexed.

The optical transmitter 81 generates an optical modulation signal of one wavelength from one piece of communication service data from the communication service processing unit 23. For example, the high-output optical amplifier 92 included in the optical amplifier 83 amplifies the optical modulation signal to a high output power.

For example, a low-noise optical amplifier 100 included in the optical amplifier 83 amplifies the optical modulation signal of one wavelength with low noise. The optical modulation signal of one wavelength amplified with low noise is converted into one piece of communication service data by the optical receiver 82. The high-output optical amplifier 92 and the low-noise optical amplifier 100 may be one device.

The optical amplifier 83 may be omitted, and may be configured of at least one of the high-output optical amplifier 92 and the low-noise optical amplifier 100 included in the optical amplifier 83. A configuration of directly switching from the optical unit 21 to the optical multiplexer/demultiplexer 101 may be employed, and a configuration of directly switching from the optical unit 21 to the optical transmitter 81 and the optical receiver 82 may be employed.

A configuration in which the optical transmitter 81, the optical receiver 82, and the communication service processing unit 23 are omitted may be employed, and a configuration of switching them may be employed. At this time, in the configuration, a demultiplexing unit 103 of the optical multiplexer/demultiplexer 101 included in the optical communication unit 202_1 is connected to a multiplexing unit 102 of the optical multiplexer/demultiplexer 101 included in the optical communication unit 202_2.

Figure 6:
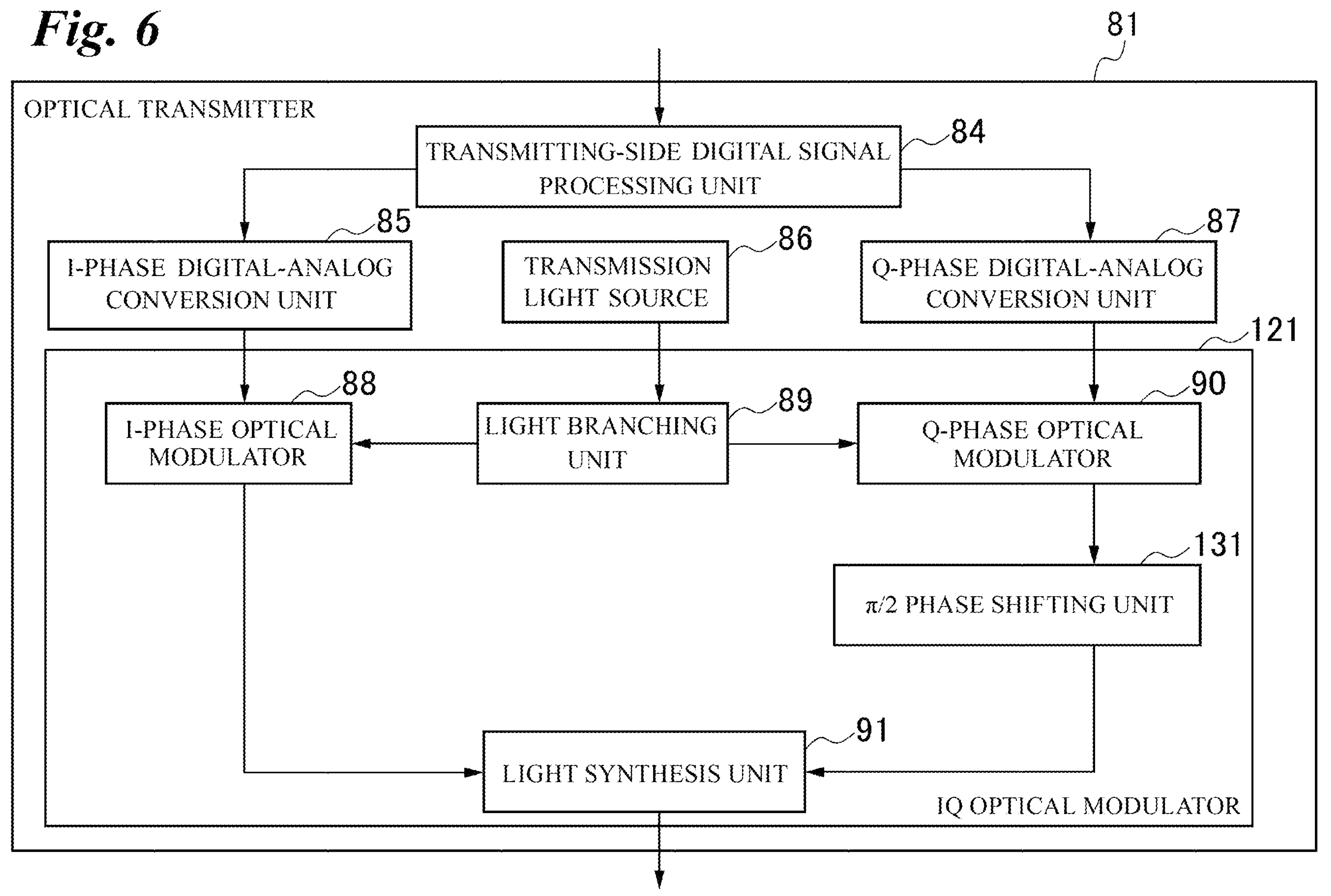
FIG. 6 is a drawing illustrating an example of a detailed block configuration of an optical transmitter that employs a digital coherent optical communication system.

Next, the optical transmitter 81 and the optical receiver 82 will be described in detail. FIG. 6 is a drawing illustrating an example of detailed block configuration of the optical transmitter 81 when, for example, a digital coherent optical communication system is employed. As illustrated in FIG. 6, when the digital coherent optical communication system is employed, the optical transmitter 81 includes a transmitting-side digital signal processing unit 84, an I-phase digital-analog conversion unit 85, a Q-phase digital-analog conversion unit 87, a transmission light source 86, and an IQ optical modulator 121. The IQ optical modulator 121 includes an I-phase optical modulator 88, a light branching unit 89, a Q-phase optical modulator 90, a π/2 phase shifting unit 131, and a light synthesis unit 91.

The transmitting-side digital signal processing unit 84 generates a modulation signal based on one piece of communication service data. The modulation signal includes an I-phase digital signal and a Q-phase digital signal that are separately input to the IQ optical modulator 121. For one piece of the communication service data, error correction coding may be performed, and a digital process, such as digital filtering, signal impairment compensation, modulator non-linker compensation, and linker equalization, may be performed.

The transmitting-side digital signal processing unit 84 can convert the modulation signal generated based on the one piece of communication service data into one subcarrier signal by a digital multiplexing scheme, for example, Orthogonal Frequency Division Multiplexing (OFDM) scheme and Nyquist-Frequency Division Multiplexing (N-FDM) scheme, multiplex a plurality of subcarrier signals, subsequently, separate the multiplexed subcarrier signals into an I-phase digital signal and a Q-phase digital signal, and input each of the I-phase digital signal and the Q-phase digital signal to the IQ optical modulator 121. Accordingly, the optical transmitter 81 can generate an optical modulation signal of one wavelength including a plurality of pieces of the communication service data. For one piece of the communication service data, error correction coding may be performed, and a digital process, such as digital filtering, signal impairment compensation, modulator non-linker compensation, and linker equalization, may be performed.

I-phase communication service data is converted from an I-phase digital signal into an I-phase electric signal by the I-phase digital-analog conversion unit 85, and the I-phase electric signal is converted into an I-phase optical modulation signal by the I-phase optical modulator 88 of the IQ optical modulator 121.

Q-phase communication service data is converted from a Q-phase digital signal into a Q-phase electric signal by the Q-phase digital-analog conversion unit 87, and the Q-phase electric signal is converted into a Q-phase optical modulation signal by the Q-phase optical modulator 90 and the π/2 phase shifting unit 131, which shifts the phase of the light to π/2, of the IQ optical modulator 121.

The light synthesis unit 91 synthesizes the I-phase optical modulation signal input from the I-phase optical modulator 88 and the Q-phase optical modulation signal input from the Q-phase modulator 90, thereby generating an optical modulation signal of one wavelength.

In the modulation by the I-phase optical modulator 88 of the IQ optical modulator 121 and the Q-phase optical modulator 90 of the IQ optical modulator 121, two unmodulated lights obtained by branching an unmodulated light output from the transmission light source 86 by the light branching unit 89 are used.

Figure 7:
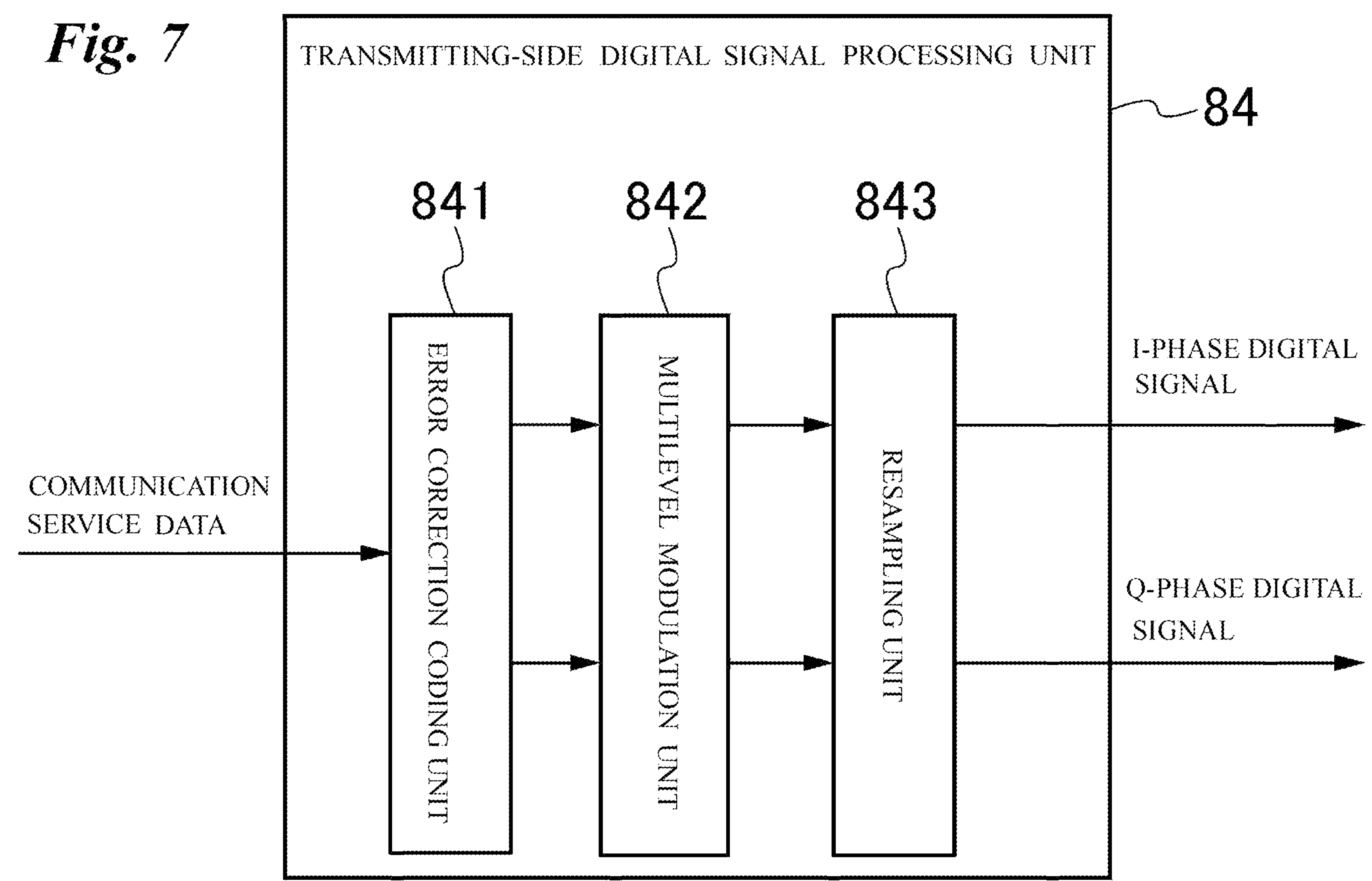
FIG. 7 is a drawing illustrating an exemplary configuration of a transmitting-side digital signal processing unit when the optical communication unit employs a wavelength division multiplexing scheme and the digital coherent optical communication system.

Next, the detailed configuration of the above-described transmitting-side digital signal processing unit 84 will be described. FIG. 7 is a drawing illustrating an example of a specific configuration of the transmitting-side digital signal processing unit 84 when the optical communication unit employs a wavelength division multiplexing scheme and the digital coherent optical communication system. The transmitting-side digital signal processing unit 84 includes an error correction coding unit 841, a multilevel modulation unit 842, and a resampling unit 843. The error correction coding unit 841 performs an error correction coding process on the communication service data. The multilevel modulation unit 842 performs what is called a multilevel modulation in which the modulation is performed such that one modulation symbol can take two or more signal points on the communication service data in which the error correction coding process has been performed by the error correction coding unit 841. The multilevel modulation unit 842 may perform a process of differential encoding. The resampling unit 843 outputs an I-phase digital signal and a Q-phase digital signal in which various kinds of resampling processes have been performed on a multilevel modulation signal in which the multilevel modulation has been performed by the multilevel modulation unit 842. After the error correction coding unit 841, an interleaver unit (not illustrated) that performs a process of changing the order of bit data included in the communication service data may be provided.

Figure 8:
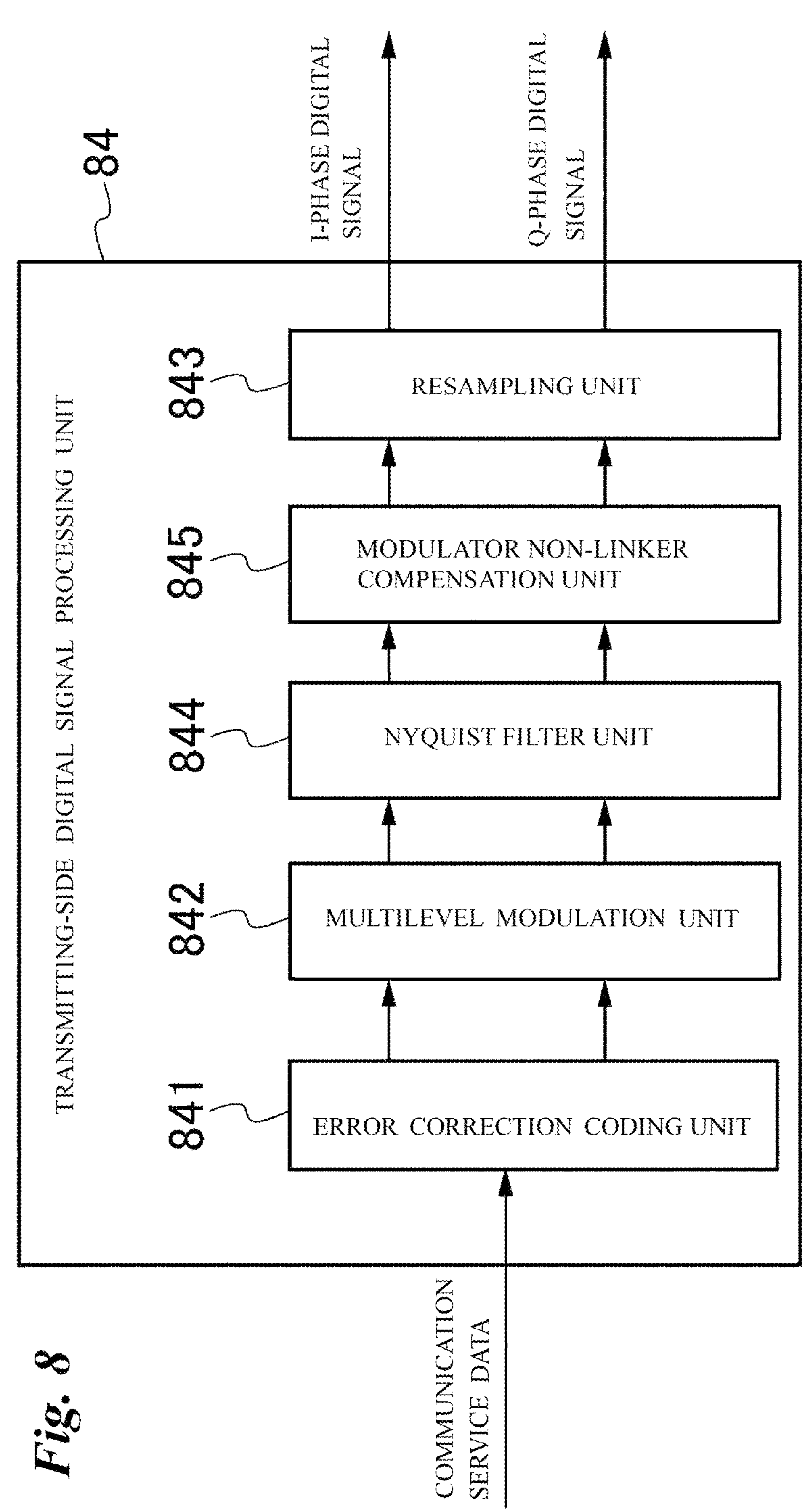
FIG. 8 is a drawing illustrating an exemplary configuration of the transmitting-side digital signal processing unit when a Nyquist wavelength division multiplexing scheme and the digital coherent optical communication system are employed.

The transmitting-side digital signal processing unit 84 may be embodied in a configuration illustrated in FIG. 8. FIG. 8 is a drawing illustrating an exemplary configuration of the transmitting-side digital signal processing unit 84 when the optical communication unit employs a Nyquist wavelength division multiplexing scheme and the digital coherent optical communication system.

The transmitting-side digital signal processing unit 84 illustrated in FIG. 8 includes the error correction coding unit 841, the multilevel modulation unit 842, a Nyquist filter unit 844, a modulator non-linker compensation unit 845, and the resampling unit 843.

Since the configurations of the error correction coding unit 841, the multilevel modulation unit 842, and the resampling unit 843 are similar to those of FIG. 8, the same reference numerals are attached, thereby omitting the explanation below.

The Nyquist filter unit 844 is a filter that performs waveform shaping for the Nyquist wavelength division multiplexing on the multilevel modulation signal on which the multilevel modulation has been performed by the multilevel modulation unit 842. The modulator non-linker compensation unit 845 compensates non-linearity of the modulators of the I-phase optical modulator 88 of the IQ optical modulator 121 and the Q-phase optical modulator 90 of the IQ optical modulator 121. After the error correction coding unit 841, an interleaver unit (not illustrated) that performs a process of changing the order of bit data included in the communication service data may be provided.

The transmitting-side digital signal processing unit 84 may be embodied in a configuration illustrated in FIG. 9. FIG. 9 is a drawing illustrating an exemplary configuration of the transmitting-side digital signal processing unit 84 that employs a Nyquist frequency division multiplexing scheme. In the configuration illustrated in FIG. 9, by employing the Nyquist FDM (frequency division multiplexing) scheme, the communication service data is multiplexed, separated into the I-phase digital signal and the Q-phase digital signal, and output.

The transmitting-side digital signal processing unit 84 is supplied with one to up to n pieces of the communication service data. For each piece of the supplied communication service data, the error correction coding unit 841, the multilevel modulation unit 842, a frequency conversion unit 847, and the Nyquist filter unit 844 are allocated. For example, when communication service data SD_1 is supplied, various kinds of processes are performed by an error correction coding unit 841_1, a multilevel modulation unit 842_1, a frequency conversion unit 847_1, and a Nyquist filter unit 844_1. When communication service data SD_2 is supplied, various kinds of processes are performed by an error correction coding unit 841_2, a multilevel modulation unit 842_2, a frequency conversion unit 847_2, and a Nyquist filter unit 844_2. Similarly, when communication service data SD_*n* is supplied, various kinds of processes are performed by an error correction coding unit 841_*n*, a multilevel modulation unit 842_*n*, a frequency conversion unit 847_*n*, and a Nyquist filter unit 844_*n*. After the error correction coding unit 841, an interleaver unit (not illustrated) that performs a process of changing the order of bit data included in the communication service data may be provided.

The frequency conversion units 847_1, 847_2, . . . 847_*n* perform frequency conversion on subcarrier multilevel modulation signals output from the multilevel modulation unit, and output them to the Nyquist filter unit 844.

The transmitting-side digital signal processing unit 84 that employs the Nyquist FDM scheme further includes a power allocation unit 848, a subcarrier multiplexing unit 849, an inverse frequency conversion unit 850, and the resampling unit 843.

The power allocation unit 848 allocates the power for each of the subcarrier multilevel modulation signals along a ratio of the power of the subcarrier multilevel modulation signal to the power of the whole of a plurality of subcarrier multilevel modulation signals for the subcarrier multilevel modulation signals output from the Nyquist filter unit 844.

The subcarrier multiplexing unit 849 performs subcarrier multiplexing on the subcarrier multilevel modulation signal supplied from the power allocation unit 848.

The inverse frequency conversion unit 850 performs the inverse frequency conversion inversely to the frequency conversion unit 847 on the signal in which the subcarrier multiplexing has been performed. The signal on which the inverse frequency conversion has been thus performed is subjected to various kinds of resampling processes in the resampling unit 843, and output as the I-phase digital signal and the Q-phase digital signal.

The transmitting-side digital signal processing unit 84 may be embodied in a configuration illustrated in FIG. 10. FIG. 10 is a drawing illustrating an example of a configuration of the transmitting-side digital signal processing unit 84 that employs an orthogonal frequency division multiplexing scheme and the digital coherent optical communication system. In the configuration illustrated in FIG. 10, by employing the OFDM scheme, the communication service data is multiplexed, separated into the I-phase digital signal and the Q-phase digital signal, and output.

The transmitting-side digital signal processing unit 84 that employs the OFDM scheme is supplied with one to up to n pieces of the communication service data. For each piece of the supplied communication service data, the error correction coding unit 841, the multilevel modulation unit 842, and the frequency conversion unit 847 are allocated. The transmitting-side digital signal processing unit 84 that employs the OFDM scheme includes the subcarrier multiplexing unit 849, a CP adding unit 851, and the resampling unit 843. After the error correction coding unit 841, an interleaver unit (not illustrated) that performs a process of changing the order of bit data included in the communication service data may be provided.

In the configuration illustrated in FIG. 10, the same reference numerals are attached to components and members the same as those in the above-described Nyquist FDM scheme illustrated in FIG. 9, and the explanation will be omitted below.

The CP adding unit 851 adds a cyclic prefix (CP) to the subcarrier in which the inverse frequency conversion has been performed on the multilevel modulation signal output from the multilevel modulation unit 842 by the inverse frequency conversion unit 850. This allows providing a resistance against a delayed wave. The signal to which the CP has been thus added is subjected to various kinds of resampling processes in the resampling unit 843, and output as the I-phase digital signal and the Q-phase digital signal.

For the optical transmitter 81 illustrated in FIG. 6 and the transmitting-side digital signal processing units 84 illustrated in FIG. 7 to FIG. 10, while the case of the optical modulation signal with only a single polarized wave is described, a configuration of a case of the optical modulation signal with a multiplexed polarized wave may be employed. In this case, in the configuration, the optical modulation signal from the optical transmitter 81 for an X-polarized wave and the optical modulation signal from the optical transmitter 81 for a Y-polarized wave are polarization-synthesized by a polarization synthesizer, and the optical modulation signal with the multiplexed polarized wave is output. Additionally, also in a transmitting-side digital signal processing unit 93, in the configuration, the I-phase digital signal and the Q-phase digital signal of the X-polarized wave and the I-phase digital signal and the Q-phase digital signal of the Y-polarized wave are generated.

Figure 11:
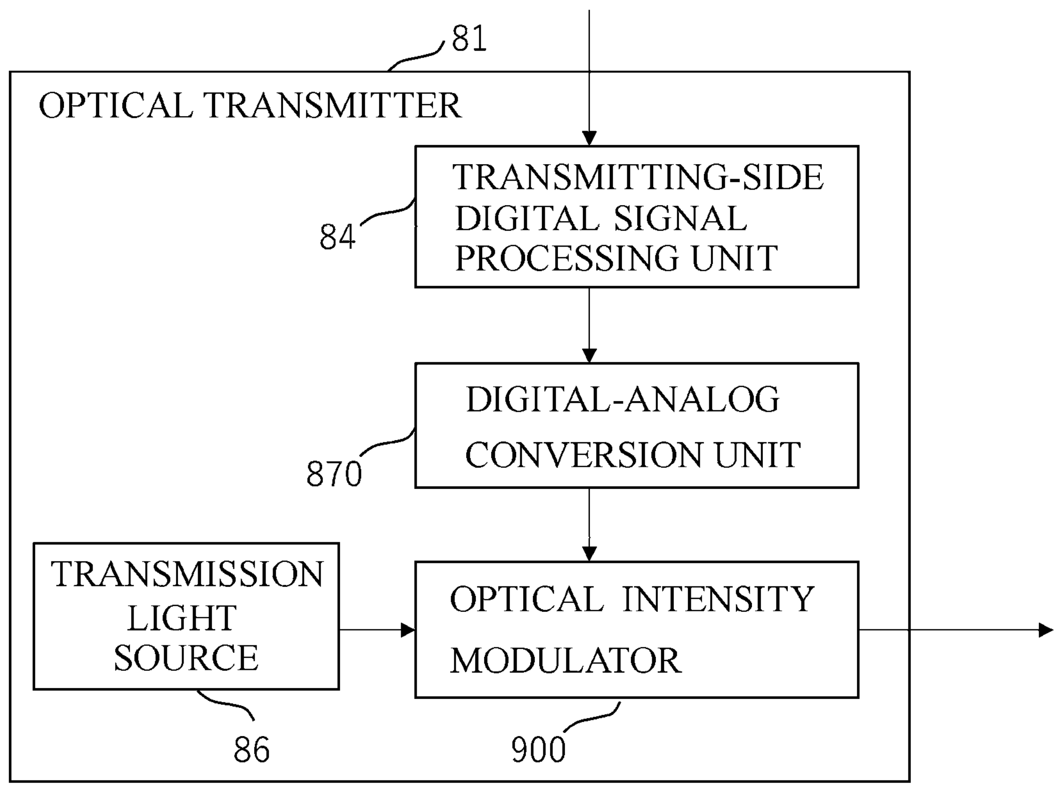
FIG. 11 is a drawing illustrating an exemplary configuration of an optical transmitter that employs an optical intensity modulation scheme.

FIG. 11 is a drawing illustrating an example of a detailed block configuration of the optical transmitter 81 when an optical intensity modulation scheme is employed. As illustrated in FIG. 11, when the optical intensity modulation scheme is employed, the optical transmitter 81 includes the transmitting-side digital signal processing unit 84, a digital-analog conversion unit 870, the transmission light source 86, and an optical intensity modulator 900.

When the optical intensity modulation scheme is employed, the digital-analog conversion unit 870 converts a digital signal of the communication service data output from the transmitting-side digital signal processing unit 84 into an electric signal. The optical intensity modulator 900 modulates the intensity of the communication service data converted into the electric signal by the digital-analog conversion unit 87, and converts it into an optical modulation signal.

Figure 12:
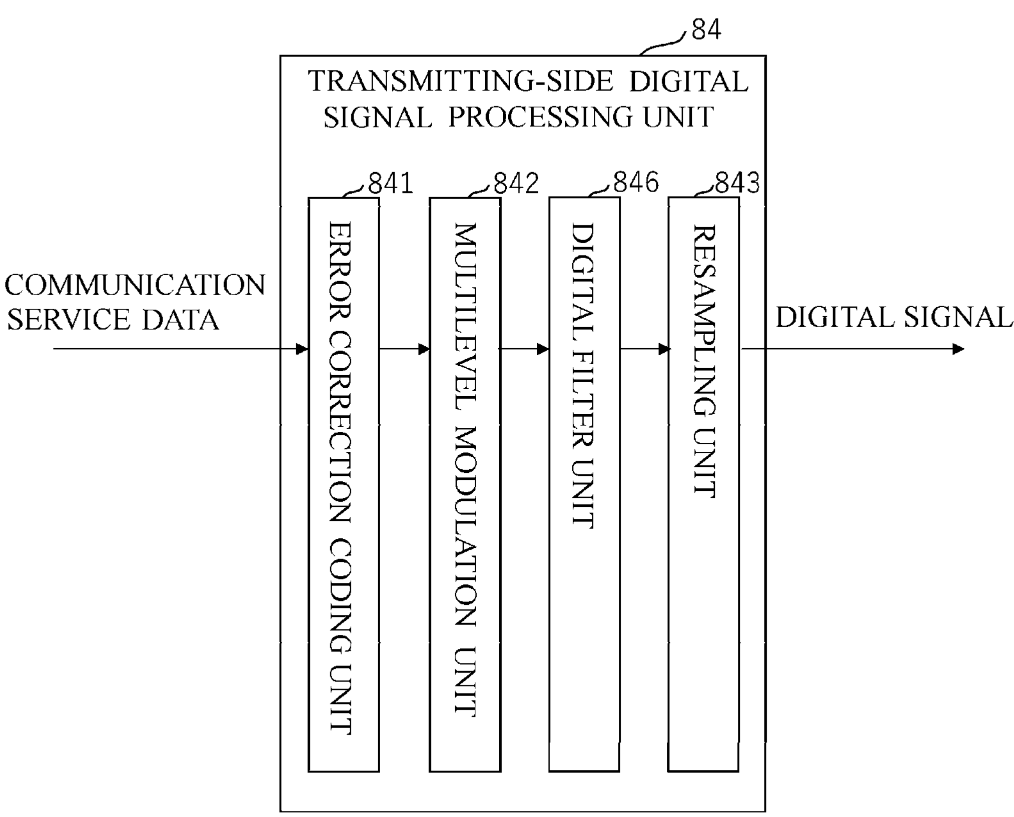
FIG. 12 is a drawing illustrating an exemplary configuration of a transmitting-side digital signal processing unit that employs the optical intensity modulation scheme.

FIG. 12 is a drawing illustrating an exemplary configuration of the transmitting-side digital signal processing unit 84 that employs the optical intensity modulation scheme. For example, when the optical intensity modulation scheme is employed, as illustrated in FIG. 12, the transmitting-side digital signal processing unit 84 includes the error correction coding unit 841, the multilevel modulation unit 842, a digital filter unit 846, and the resampling unit 843. For example, when the optical intensity modulation scheme is employed, the transmitting-side digital signal processing unit 84 generates a modulation signal based on one piece of the communication service data. The modulation signal includes a digital signal, and input to an optical intensity modulator. For one piece of the communication service data, error correction coding may be performed, and a digital process, such as digital filtering, signal impairment compensation, modulator non-linker compensation, and linker equalization, may be performed. After the error correction coding unit 841, an interleaver unit (not illustrated) that performs a process of changing the order of bit data included in the communication service data may be provided.

Figure 13:
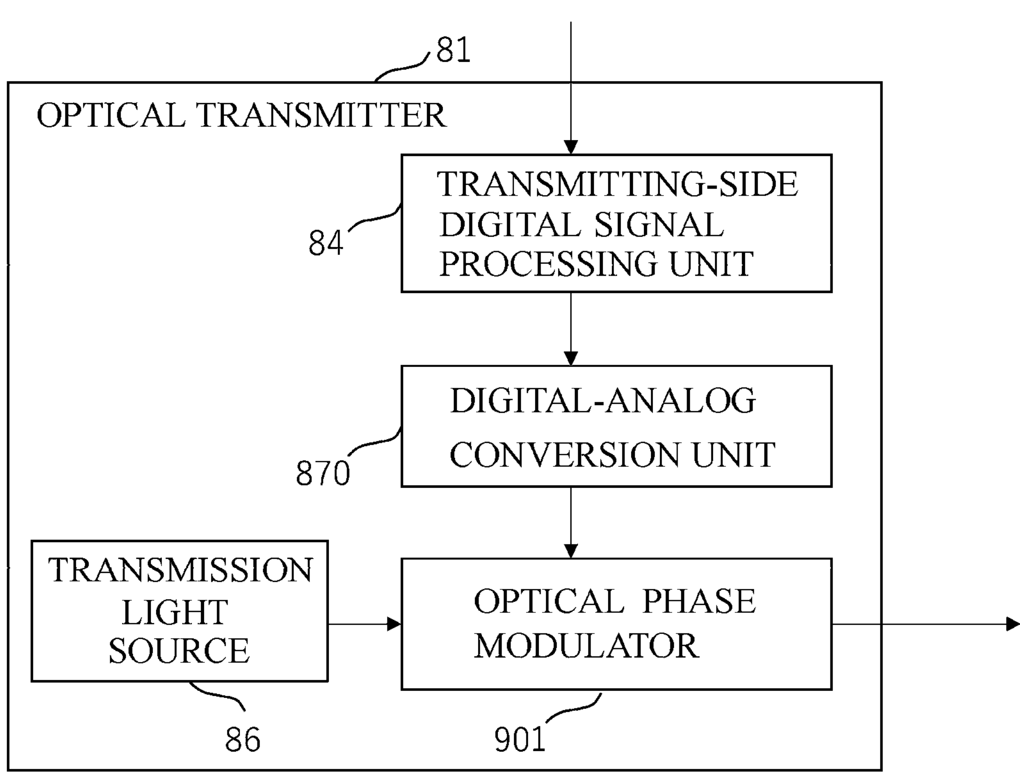
FIG. 13 is a drawing illustrating an example of a detailed block configuration of an optical transmitter that employs an optical phase modulation scheme.

FIG. 13 is a drawing illustrating an example of a detailed block configuration of the optical transmitter 81 when, for example, an optical phase modulation scheme is employed. As illustrated in FIG. 13, when the optical phase modulation scheme is employed, the optical transmitter 81 includes the transmitting-side digital signal processing unit 84, the digital-analog conversion unit 870, the transmission light source 86, and an optical phase modulator 901. The optical phase modulator 901 modulates the phase of the communication service data converted into the electric signal by the digital-analog conversion unit 87, and converts it into an optical modulation signal.

Figure 14:
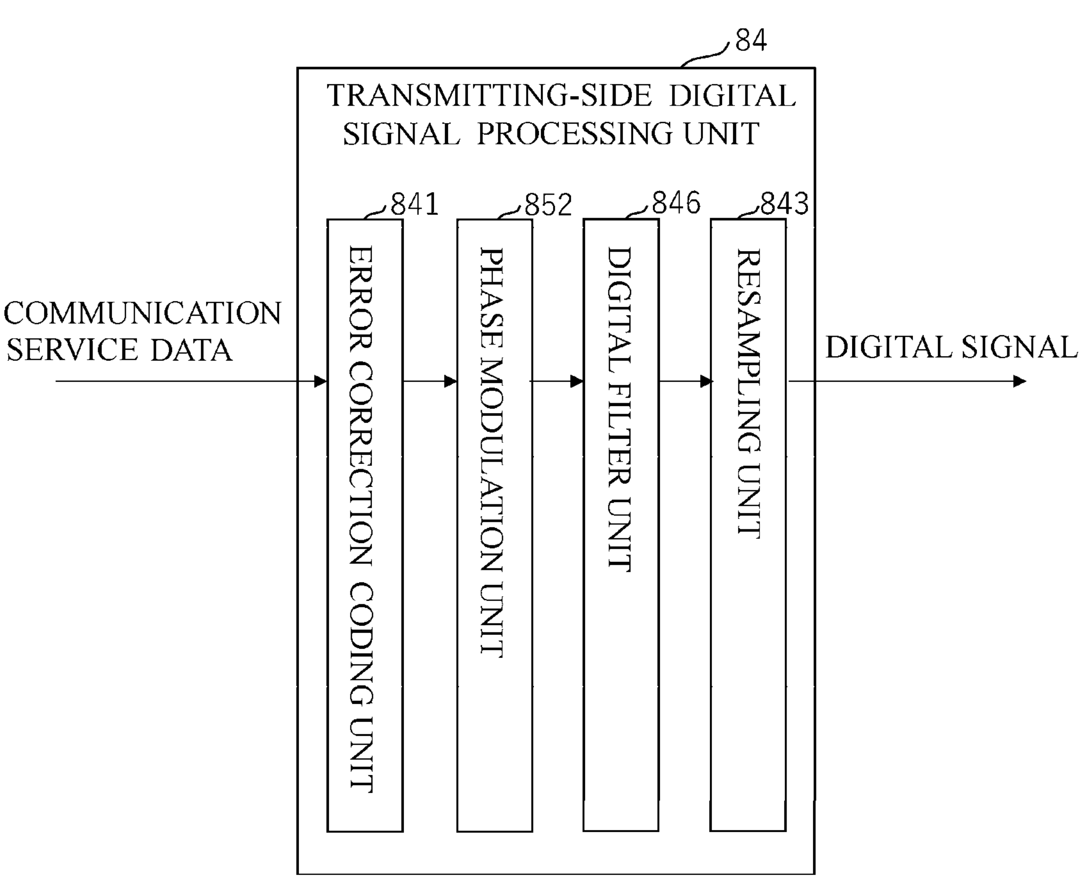
FIG. 14 is a drawing illustrating an exemplary configuration of a transmitting-side digital signal processing unit that employs the optical phase modulation scheme.

FIG. 14 is a drawing illustrating an exemplary configuration of the transmitting-side digital signal processing unit 84 that employs the optical phase modulation scheme. For example, when the optical phase modulation scheme is employed, as illustrated in FIG. 14, the transmitting-side digital signal processing unit 84 includes the error correction coding unit 841, a phase modulation unit 852, the digital filter unit 846, and the resampling unit 843. The phase modulation unit 852 performs the phase modulation such that one modulation symbol can take two signal points on the communication service data in which the error correction coding process has been performed by the error correction coding unit 841. The phase modulation unit 852 may perform a process of differential encoding. When the optical phase modulation scheme is employed, the transmitting-side digital signal processing unit 84 generates a modulation signal based on one piece of the communication service data. The modulation signal includes a digital signal, and input to an optical intensity modulator. For one piece of the communication service data, error correction coding may be performed, and a digital process, such as digital filtering, signal impairment compensation, modulator non-linker compensation, and linker equalization, may be performed. After the error correction coding unit 841, an interleaver unit (not illustrated) that performs a process of changing the order of bit data included in the communication service data may be provided.

Figure 15:
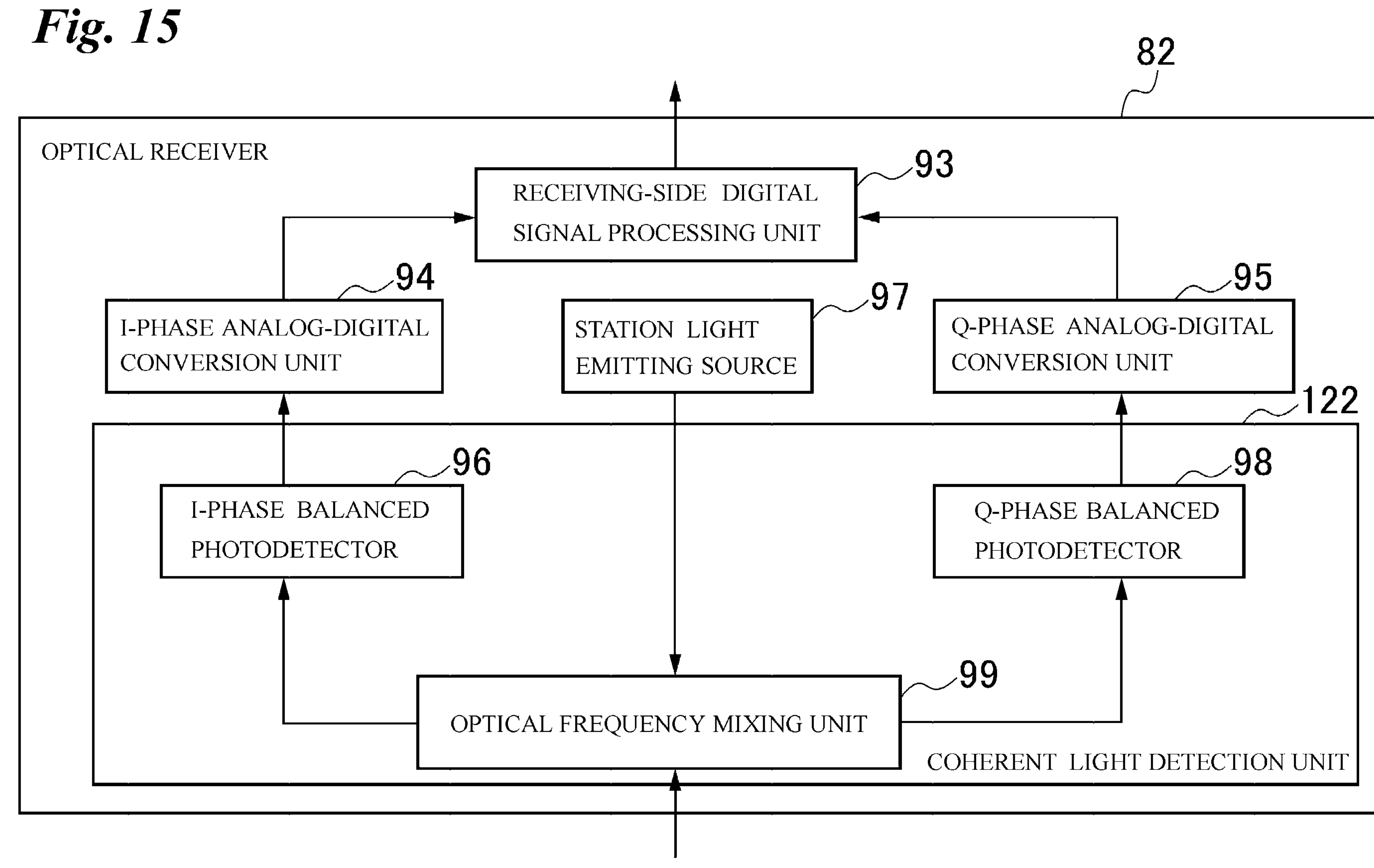
FIG. 15 is a drawing illustrating an example of a detailed block configuration of an optical receiver that employs the digital coherent optical communication system.

Next, the optical receiver 82 will be described. FIG. 15 is a drawing illustrating an example of a detailed block configuration of the optical receiver 82 that employs the digital coherent optical communication system. When the digital coherent optical communication system is employed, as illustrated in FIG. 15, the optical receiver 82 includes a receiving-side digital signal processing unit 93, an I-phase analog-digital conversion unit 94, a Q-phase analog-digital conversion unit 95, a station light emitting source 97, and a coherent light detection unit 122. The coherent light detection unit 122 includes an I-phase balanced photodetector 96, a Q-phase balanced photodetector 98, and an optical frequency mixing unit 99.

The optical frequency mixing unit 99 uses an unmodulated light output from the station light emitting source 97 to cause the unmodulated light to interfere with a low-noise amplified optical modulation signal, thereby separating it into two of an I-phase optical modulation signal and a Q-phase optical modulation signal. The I-phase optical modulation signal is detected by the I-phase balanced photodetector 96, and becomes an I-phase electric signal. The I-phase electric signal is converted into an I-phase digital signal by the I-phase analog-digital conversion unit 94.

The Q-phase optical modulation signal is detected by the Q-phase balanced photodetector 98, and becomes a Q-phase electric signal. The Q-phase electric signal is converted into a Q-phase digital signal by the Q-phase balanced photodetector 98. The receiving-side digital signal processing unit 93 converts a modulation signal synthesized from the I-phase digital signal and the Q-phase digital signal into one piece of communication service data. The I-phase digital signal and the Q-phase digital signal are output from the I-phase balanced photodetector 96 and the Q-phase balanced photodetector 98 of the coherent light detection unit 122. For one piece of the communication service data, error correction decoding may be performed, and a digital process, such as digital filtering and signal impairment compensation including frequency estimation, phase estimation, adaptive equalization, and the like, may be performed.

The receiving-side digital signal processing unit 93 can separate the I-phase digital signal and the Q-phase digital signal digital multiplexed by, for example, an Orthogonal Frequency Division Multiplexing (OFDM) scheme and a Nyquist-Frequency Division Multiplexing (N-FDM) scheme into a plurality of subcarriers, and convert the modulation signal as one subcarrier into one piece of communication service data. The I-phase digital signal and the Q-phase digital signal are output from the I-phase balanced photodetector 96 and the Q-phase balanced photodetector 98 of the coherent light detection unit 122. This allows the optical receiver 82 to convert the optical modulation signal of one wavelength into a plurality of pieces of the communication service data. For one piece of the communication service data, error correction decoding may be performed, and a digital process, such as digital filtering and signal impairment compensation including frequency estimation, phase estimation, adaptive equalization, and the like, may be performed.

Figure 16:
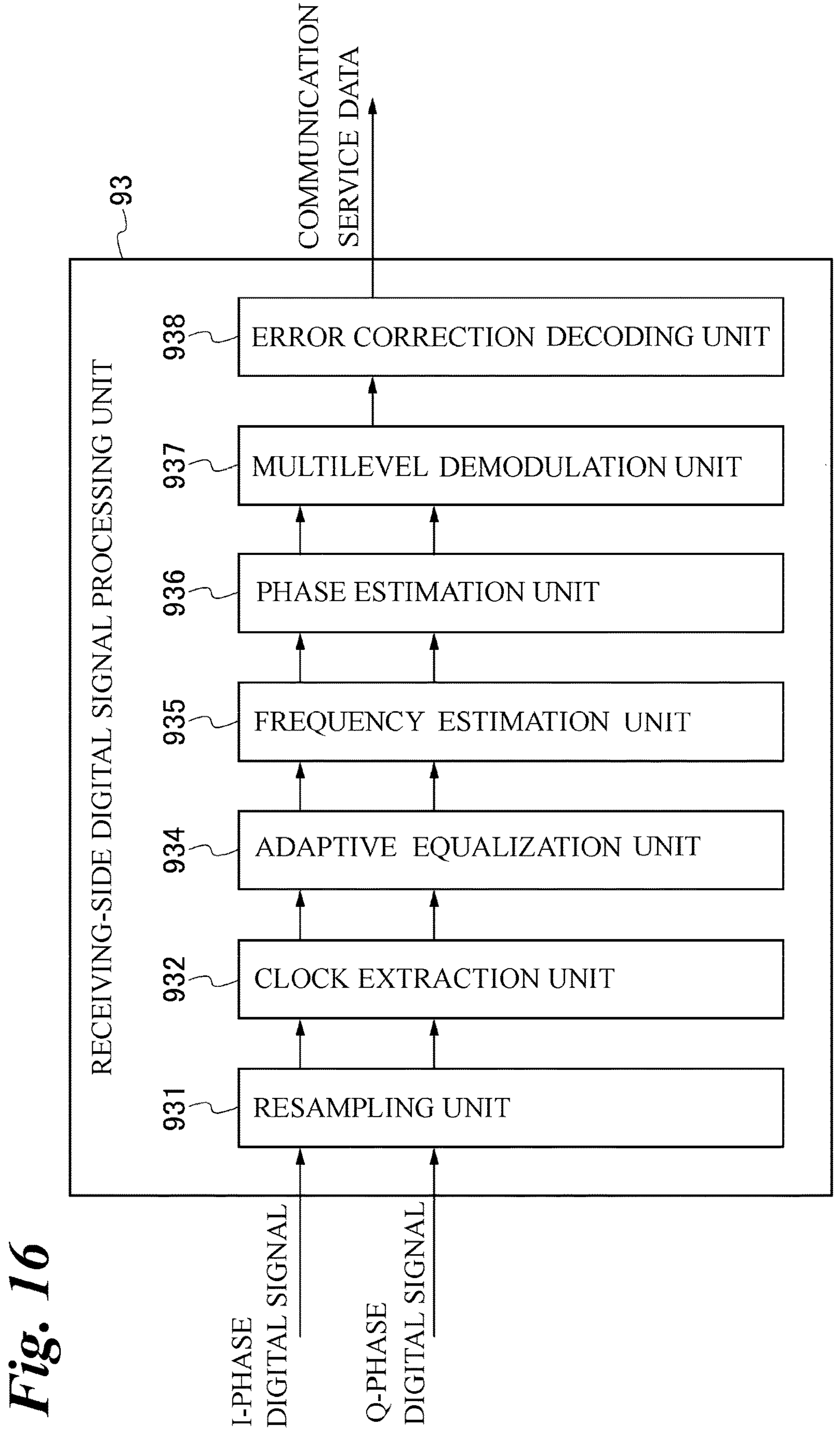
FIG. 16 is a drawing illustrating an example of a specific configuration of a receiving-side digital signal processing unit when the optical communication unit employs the wavelength division multiplexing scheme.

FIG. 16 is a drawing illustrating an example of a specific configuration of the receiving-side digital signal processing unit 93 when the optical communication unit employs the wavelength division multiplexing scheme. The receiving-side digital signal processing unit 93 includes a resampling unit 931, a clock extraction unit 932, an adaptive equalization unit 934, a frequency estimation unit 935, a phase estimation unit 936, a multilevel demodulation unit 937, and an error correction decoding unit 938.

The resampling unit 931 is supplied with the I-phase digital signal and the Q-phase digital signal, and performs various kinds of resampling processes thereon. The clock extraction unit 932 extracts clocks for the I-phase digital signal and the Q-phase digital signal resampled by the resampling unit 931. The adaptive equalization unit 934 performs an equalizing process for each of the input I-phase digital signal and Q-phase digital signal, and detects power variation information to be stored in a power variation information table TB4 described later. The frequency estimation unit 935 performs frequency estimation necessary for demodulation for the input I-phase digital signal and Q-phase digital signal, and detects frequency variation information to be stored in a frequency variation information table TB3 described later. The phase estimation unit 936 performs phase estimation necessary for demodulation for the I-phase digital signal and the Q-phase digital signal, and detects phase variation information to be stored in a phase variation information table TB5 described later. The multilevel demodulation unit 937 demodulates the I-phase digital signal and the Q-phase digital signal that are multilevel modulation signals, thereby making them one piece of communication service data. The multilevel demodulation unit 937 may perform a process of differential decoding. The error correction decoding unit 938 performs an error correction decoding process on the communication service data obtained by the multilevel demodulation unit 937. Before the error correction decoding unit 938, a deinterleaver unit (not illustrated) that performs a process of an operation reverse to reordering the bit data on the communication service data in which the process of changing the order of the bit data has been performed by the interleaver unit (not illustrated) may be provided.

Figure 17:
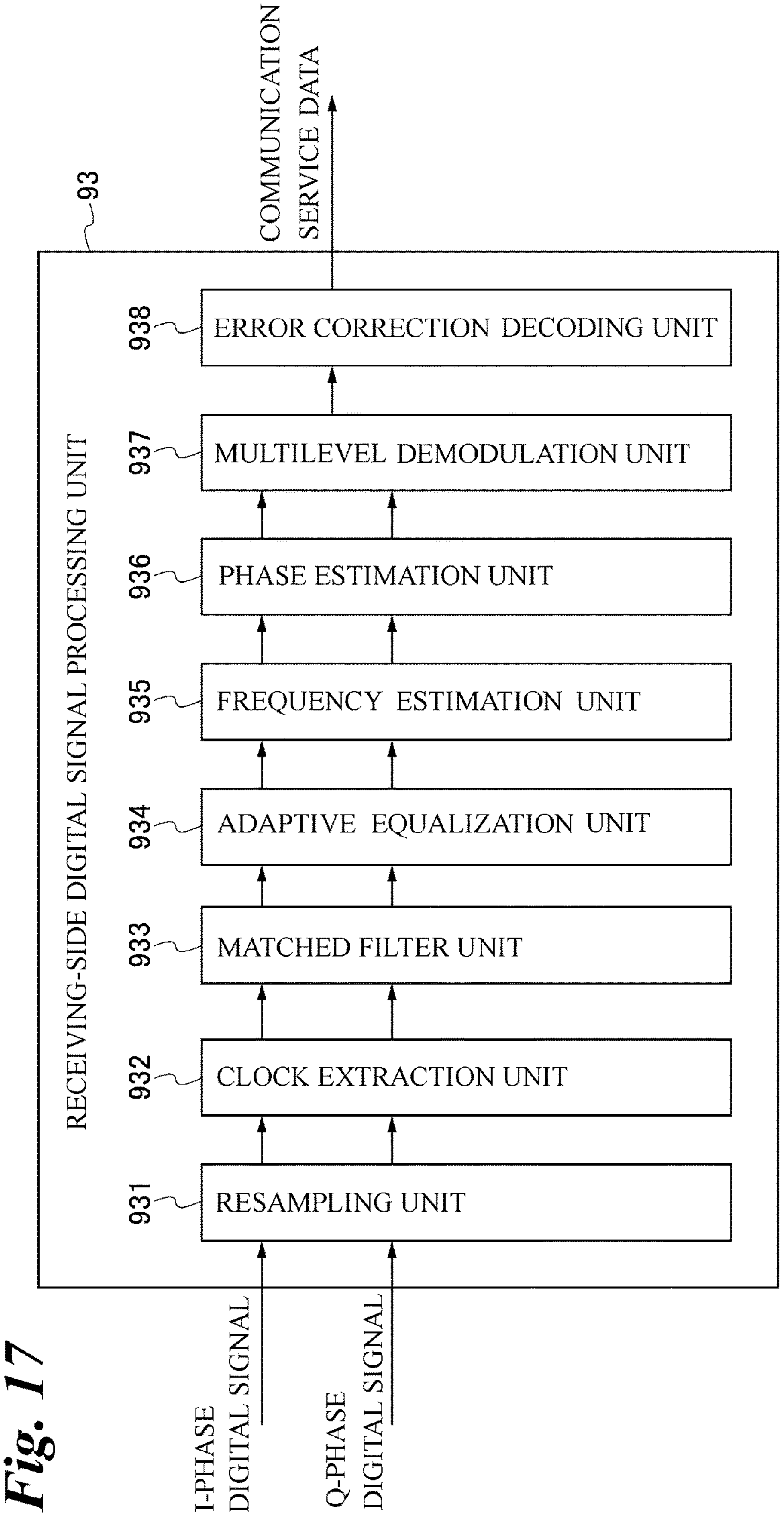
FIG. 17 is a drawing illustrating an exemplary configuration of the receiving-side digital signal processing unit when the optical communication unit employs the Nyquist wavelength division multiplexing scheme.

The receiving-side digital signal processing unit 93 may be embodied in a configuration illustrated in FIG. 17. FIG. 17 is a drawing illustrating an exemplary configuration of the receiving-side digital signal processing unit 93 when the optical communication unit employs the Nyquist wavelength division multiplexing scheme. The receiving-side digital signal processing unit 93 illustrated in FIG. 17 includes the resampling unit 931, the clock extraction unit 932, a matched filter unit 933, the adaptive equalization unit 934, the frequency estimation unit 935, the phase estimation unit 936, the multilevel demodulation unit 937, and the error correction decoding unit 938. The matched filter unit 933 is a filter necessary for performing the demodulation. Since the configurations of the resampling unit 931, the clock extraction unit 932, the adaptive equalization unit 934, the frequency estimation unit 935, the phase estimation unit 936, the multilevel demodulation unit 937, and the error correction decoding unit 938 are similar to those of FIG. 16, the same reference numerals are attached, thereby omitting the explanation below. Before the error correction decoding unit 938, a deinterleaver unit (not illustrated) that performs a process of an operation reverse to reordering the bit data on the communication service data in which the process of changing the order of the bit data has been performed by the interleaver unit (not illustrated) may be provided.

The receiving-side digital signal processing unit 93 may be embodied in a configuration illustrated in FIG. 18. FIG. 18 is a drawing illustrating an exemplary configuration of the receiving-side digital signal processing unit 93 that employs the Nyquist frequency division multiplexing scheme. In the configuration illustrated in FIG. 18, in the transmitting-side digital signal processing unit 84, the communication service data is multiplexed by the Nyquist FDM (frequency division multiplex) scheme, and data is output as the I-phase digital signal and the Q-phase digital signal separately from the original communication service data.

The receiving-side digital signal processing unit 93 can separately output one to up to n pieces of communication service data.

The multiplexed signal input to the receiving-side digital signal processing unit 93 passes through the resampling unit 931 and the frequency estimation unit 935, and reaches a frequency conversion unit 939. The frequency conversion unit 939 performs the frequency conversion, and supplies the I-phase digital signal and the Q-phase digital signal of each piece of the multiplexed communication service data to matched filter units 933_1 to 933_*n*.

For each of the I-phase digital signals and the Q-phase digital signals of the respective pieces of the separately output communication service data, the matched filter unit 933, an inverse frequency conversion unit 941, the clock extraction unit 932, the adaptive equalization unit 934, the phase estimation unit 936, the multilevel demodulation unit 937, and the error correction decoding unit 938 are allocated. For example, when the communication service data SD_1 is output, various kinds of processes are performed by a matched filter unit 933_1, an inverse frequency conversion unit 941_1, a clock extraction unit 932_1, an adaptive equalization unit 934_1, a phase estimation unit 936_1, a multilevel demodulation unit 937_1, and an error correction decoding unit 938_1. When the communication service data SD_2 is output, various kinds of processes are performed by a matched filter unit 933_2, an inverse frequency conversion unit 941_2, a clock extraction unit 932_2, an adaptive equalization unit 934_2, a phase estimation unit 936_2, a multilevel demodulation unit 937_2, and an error correction decoding unit 938_2. When the communication service data SD_*n* is output, various kinds of processes are performed by a matched filter unit 933_*n*, an inverse frequency conversion unit 941_*n*, a clock extraction unit 932_*n*, an adaptive equalization unit 934_*n*, a phase estimation unit 936_*n*, a multilevel demodulation unit 937_*n*, and an error correction decoding unit 938_*n*. Before the error correction decoding unit 938_*n*, a deinterleaver unit (not illustrated) that performs a process of an operation reverse to reordering the bit data on the communication service data in which the process of changing the order of the bit data has been performed by the interleaver unit (not illustrated) may be provided.

The I-phase digital signal and the Q-phase digital signal that have passed through the matched filter unit 933 are converted into inverse frequencies by the inverse frequency conversion unit 941. The similar process is performed in the clock extraction unit 932, the adaptive equalization unit 934, the phase estimation unit 936, the multilevel demodulation unit 937, and the error correction decoding unit 938, and the communication service data is output.

Figure 19:
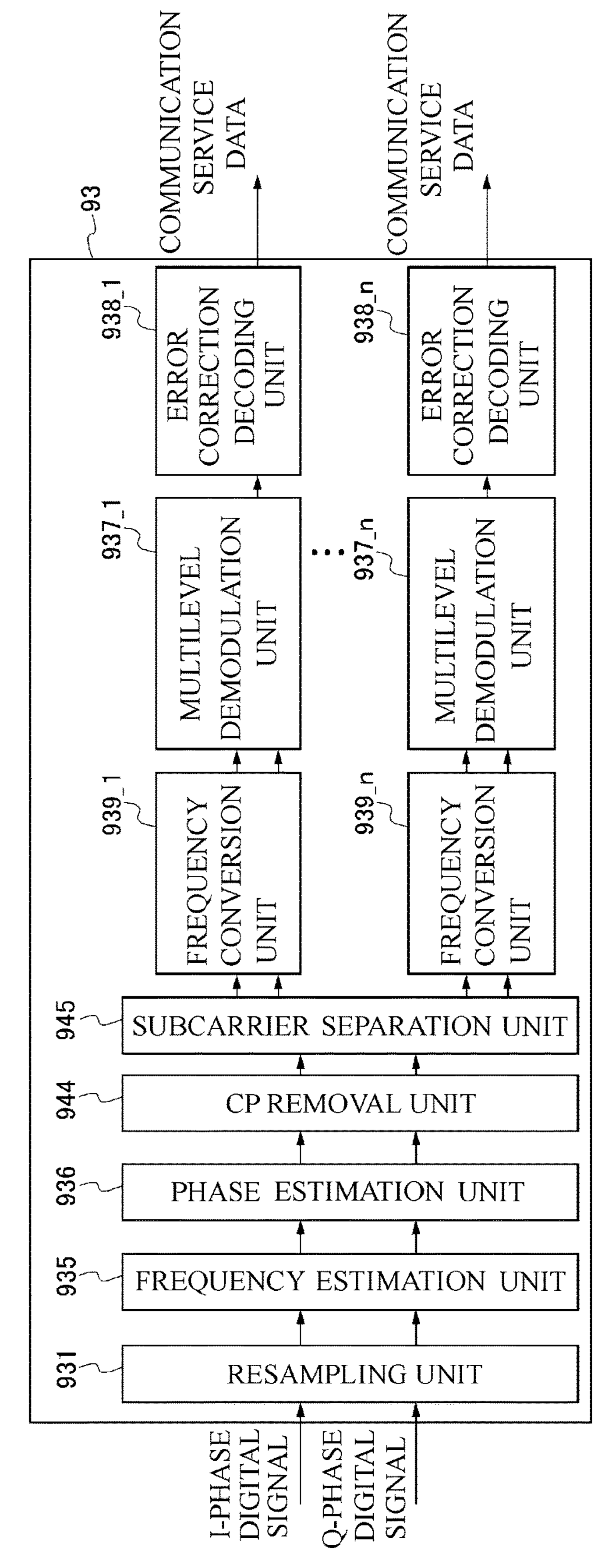
FIG. 19 is a drawing illustrating an exemplary configuration of the receiving-side digital signal processing unit that employs the orthogonal frequency division multiplexing scheme.

The receiving-side digital signal processing unit 93 may be embodied in a configuration illustrated in FIG. 19. FIG. 19 is a drawing illustrating an exemplary configuration of the receiving-side digital signal processing unit 93 that employs the orthogonal frequency division multiplexing scheme. In the configuration illustrated in FIG. 19, the I-phase digital signal and the Q-phase digital signal obtained by multiplexing the communication service data by the OFDM scheme are output separately from the original communication service data. The receiving-side digital signal processing unit 93 can separately output one to up to n pieces of communication service data.

The multiplexed signal input to the receiving-side digital signal processing unit 93 passes through the resampling unit 931, the frequency estimation unit 935, and the phase estimation unit 936, and is transmitted to a CP removal unit 944. The CP removal unit 944 removes the CP added by the CP adding unit 851. The I-phase digital signal and the Q-phase digital signal output from the CP removal unit 944 are transmitted to a subcarrier separation unit 945, and separated into subcarriers in a digital region. For the respective pieces of the separated communication service data, frequency conversion is performed by frequency conversion units 939_1 to 939_*n*, multilevel demodulation is performed by multilevel demodulation units 937_1 to 937_*n*, and an error correction decoding process is further performed by error correction decoding units 938_1 to 938_*n*. Before the error correction decoding unit 938_*n*, a deinterleaver unit (not illustrated) that performs a process of an operation reverse to reordering the bit data on the communication service data in which the process of changing the order of the bit data has been performed by the interleaver unit (not illustrated) may be provided.

When the optical communication unit 202 includes the optical multiplexer/demultiplexer 101, the optical communication unit 202 can handle a plurality of optical modulation signals. For example, when the optical communication unit 202 includes the optical multiplexer/demultiplexer 101, and the optical multiplexer/demultiplexer 101 includes the multiplexing unit 102, the optical communication unit 202 can handle a plurality of optical modulation signals by, for example, performing a multiplexing process of synthesizing optical modulation signals that are output from a plurality of optical transmitters 81A, 81B and multiplexed with a plurality of wavelengths.

Using the Nyquist frequency division multiplexing scheme or the orthogonal frequency division multiplexing scheme described above allows dealing with a case where the optical modulation signal of one wavelength includes a plurality of pieces of the communication service data. For example, when the transmitting-side digital signal processing unit 84 uses the Nyquist frequency division multiplexing scheme or the orthogonal frequency division multiplexing scheme, one optical modulation signal based on a plurality of pieces of the communication service data can be generated. Accordingly, when the optical communication unit 202 includes the optical multiplexer/demultiplexer 101, and the optical multiplexer/demultiplexer 101 includes the multiplexing unit 102, the optical communication unit 202 can handle the optical modulation signal based on a plurality of pieces of the communication service data multiplexed with a plurality of wavelengths by, for example, performing a multiplexing process of synthesizing optical modulation signals that are output from a plurality of optical transmitters 81A, 81B and multiplexed with a plurality of wavelengths.

For example, when the optical communication unit 202 includes the optical multiplexer/demultiplexer 101, and the optical multiplexer/demultiplexer 101 includes the demultiplexing unit 103, the optical communication unit 202 can handle a plurality of optical modulation signals by, for example, performing a demultiplexing process of demultiplexing the optical modulation signal multiplexed with a plurality of wavelengths to each of a plurality of optical receivers 82A, 82B.

Using the Nyquist frequency division multiplexing scheme or the orthogonal frequency division multiplexing scheme described above allows dealing with a case where the optical modulation signal of one wavelength includes a plurality of pieces of the communication service data. Accordingly, when the optical communication unit 202 includes the optical multiplexer/demultiplexer 101, and the optical multiplexer/demultiplexer 101 includes the demultiplexing unit 103, the optical communication unit 202 can handle the optical modulation signal based on a plurality of pieces of the communication service data separated into optical modulation signals with a plurality of wavelengths by, for example, performing a demultiplexing process of demultiplexing the optical modulation signal multiplexed with a plurality of wavelengths to each of a plurality of optical receivers 82A, 82B.

For the optical receiver 82 illustrated in FIG. 15 and the receiving-side digital signal processing units 93 illustrated in FIG. 16 to FIG. 19, while the case of the optical modulation signal with only a single polarized wave is described, a configuration of a case of the optical modulation signal with a multiplexed polarized wave may be employed. In this case, in the configuration, the polarization-multiplexed optical modulation signal is polarization-separated by a polarization separator, the polarization-separated optical modulation signal of X-polarized wave is input to the optical receiver 82 of X-polarized wave, and the polarization-separated optical modulation signal of Y-polarized wave is input to the optical receiver 82 of Y-polarized wave. Additionally, also in the receiving-side digital signal processing unit 93, in the configuration, the I-phase digital signal and the Q-phase digital signal of the X-polarized wave and the I-phase digital signal and the Q-phase digital signal of the Y-polarized wave are processed and received.

FIG. 20 is a drawing illustrating an example of a detailed block configuration of the optical receiver 82 that employs the optical intensity modulation scheme. When the optical intensity modulation scheme is employed, as illustrated in FIG. 20, the optical receiver 82 includes a photoelectric converter 821, an electric filter unit 822, an analog-digital conversion unit 870, and the receiving-side digital signal processing unit 93. The optical receiver 82 does not need to include at least any one of the electric filter unit 822 or the analog-digital conversion unit 870.

The photoelectric converter 821 performs photoelectric conversion based on a low-noise amplified optical modulation signal, and converts it into an electric signal. The converted electric signal passes through the electric filter unit 822, and is converted into an electric signal with a predetermined bandwidth. The electric signal that has passed through the electric filter unit 822 is converted into a digital signal by the analog-digital conversion unit 870. In the electric filter unit 822, digital filter processing may be performed with the function of the electric filter unit 822 taken into the receiving-side digital signal processing unit 93.

Figure 21:
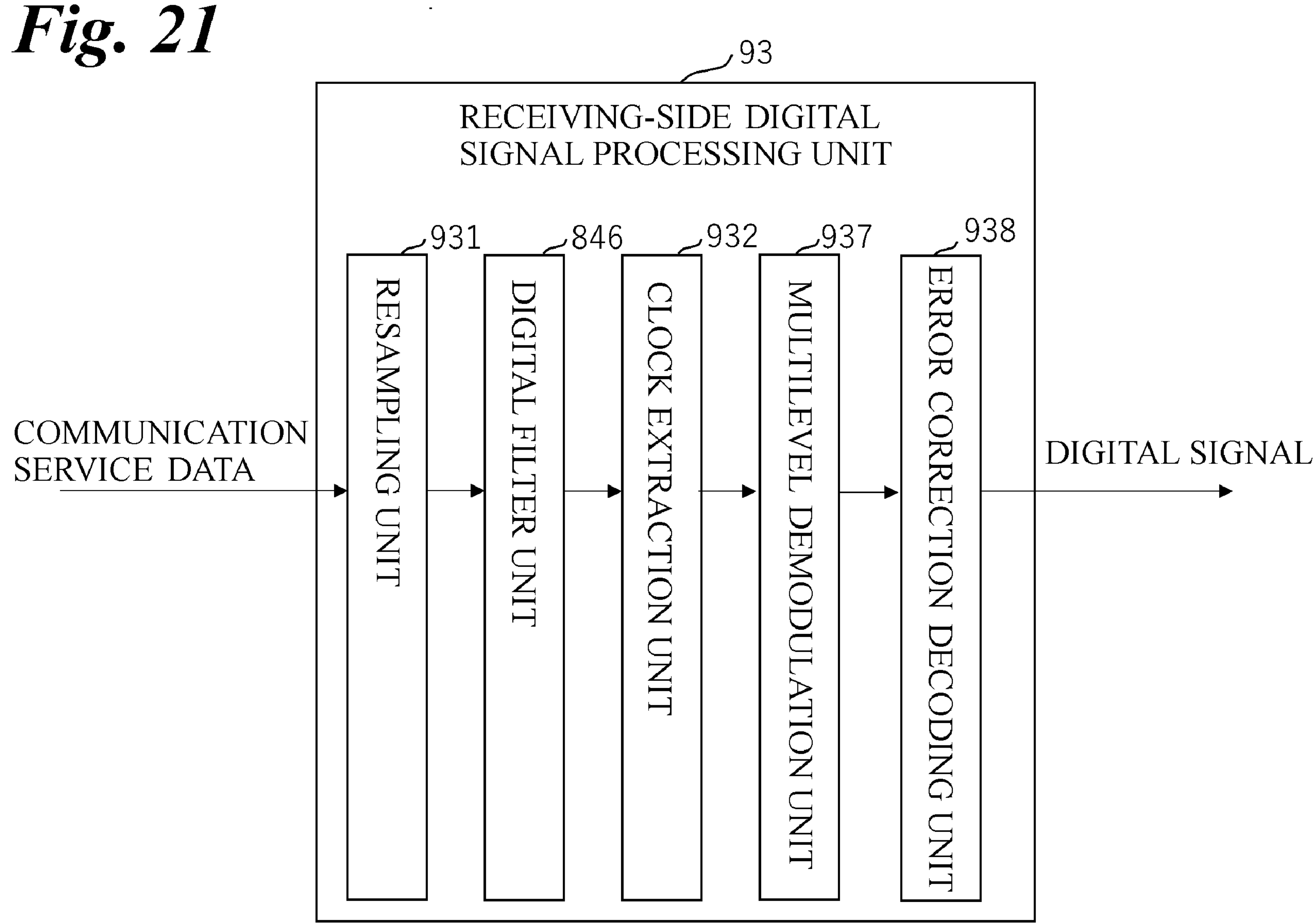
FIG. 21 is a drawing illustrating an exemplary configuration of a receiving-side digital signal processing unit that employs the optical intensity modulation scheme.

FIG. 21 is a drawing illustrating an exemplary configuration of the receiving-side digital signal processing unit 93 that employs the optical intensity modulation scheme. When the optical intensity modulation scheme is employed, as illustrated in FIG. 21, the receiving-side digital signal processing unit 93 includes the resampling unit 931, the digital filter unit 846, the clock extraction unit 932, the multilevel demodulation unit 937, and the error correction decoding unit 938. The receiving-side digital signal processing unit 93 converts a modulation signal including a digital signal into one piece of communication service data. The digital signal is output from the photoelectric converter 821. For one piece of the communication service data, error correction decoding may be performed, and a digital process, such as digital filtering, a linker equalization process, and signal impairment compensation, may be performed. Before the error correction decoding unit 938, a deinterleaver unit (not illustrated) that performs a process of an operation reverse to reordering the bit data on the communication service data in which the process of changing the order of the bit data has been performed by the interleaver unit (not illustrated) may be provided.

FIG. 22 is a drawing illustrating an example of a detailed block configuration of a first configuration of an optical receiver that employs the optical phase modulation scheme. For example, when the optical phase modulation scheme is employed, as illustrated in FIG. 22, the optical receiver 82 of the first configuration includes the station light emitting source 97, the optical frequency mixing unit 99, a balanced photodetector 823, the digital-analog conversion unit 870, and the receiving-side digital signal processing unit 93. The optical receiver 82 does not need to include at least any one of the electric filter unit 822 or the analog-digital conversion unit 870.

The optical frequency mixing unit 99 uses an unmodulated light output from the station light emitting source 97 to cause the unmodulated light to interfere with a low-noise amplified optical modulation signal. The interfered optical modulation signal is detected by the balanced photodetector 823, and becomes an electric signal. The electric signal is converted into a digital signal by the analog-digital conversion unit 870. In the electric filter unit 822, digital filter processing may be performed with the function of the electric filter unit taken into the receiving-side digital signal processing unit 93.

Figure 23:
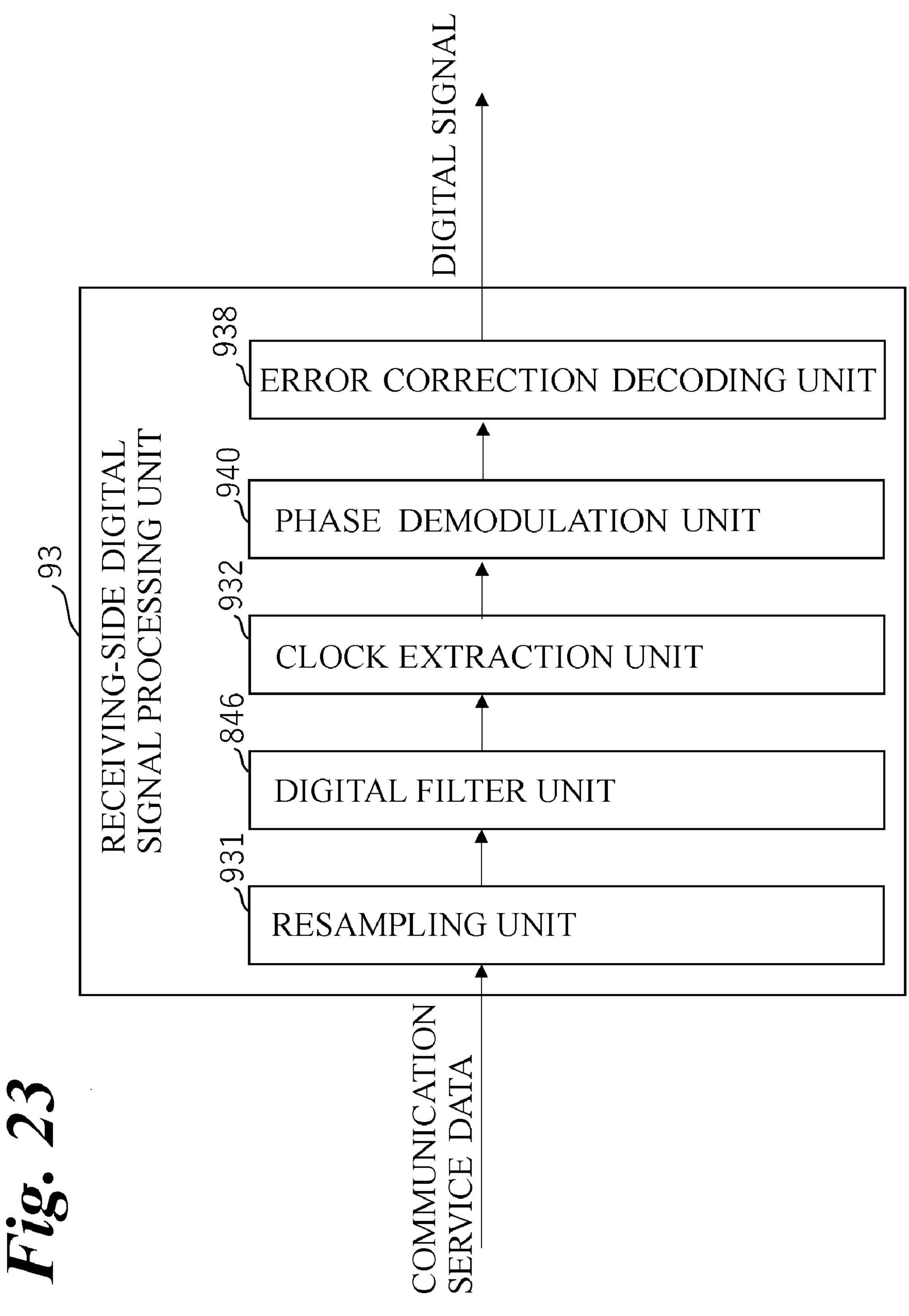
FIG. 23 is a drawing illustrating an exemplary configuration of a receiving-side digital signal processing unit that employs the optical phase modulation scheme.

FIG. 23 is a drawing illustrating an exemplary configuration of the receiving-side digital signal processing unit 93 that employs the optical phase modulation scheme. When the optical phase modulation scheme is employed, as illustrated in FIG. 23, the receiving-side digital signal processing unit 93 includes the resampling unit 931, the digital filter unit 846, the clock extraction unit 932, a phase demodulation unit 940, and the error correction decoding unit 938. The phase demodulation unit 940 converts one modulation symbol into two signal points, and converts it into one piece of communication service data. The phase demodulation unit 940 may perform a process of differential decoding. The receiving-side digital signal processing unit 93 converts a modulation signal including a digital signal into one piece of communication service data. The digital signal is output from the balanced photodetector 823. For one piece of the communication service data, error correction decoding may be performed, and a digital process, such as digital filtering and signal impairment compensation including frequency estimation, phase estimation, adaptive equalization, and the like, may be performed. Before the error correction decoding unit 938, a deinterleaver unit (not illustrated) that performs a process of an operation reverse to reordering the bit data on the communication service data in which the process of changing the order of the bit data has been performed by the interleaver unit (not illustrated) may be provided.

Figure 24:
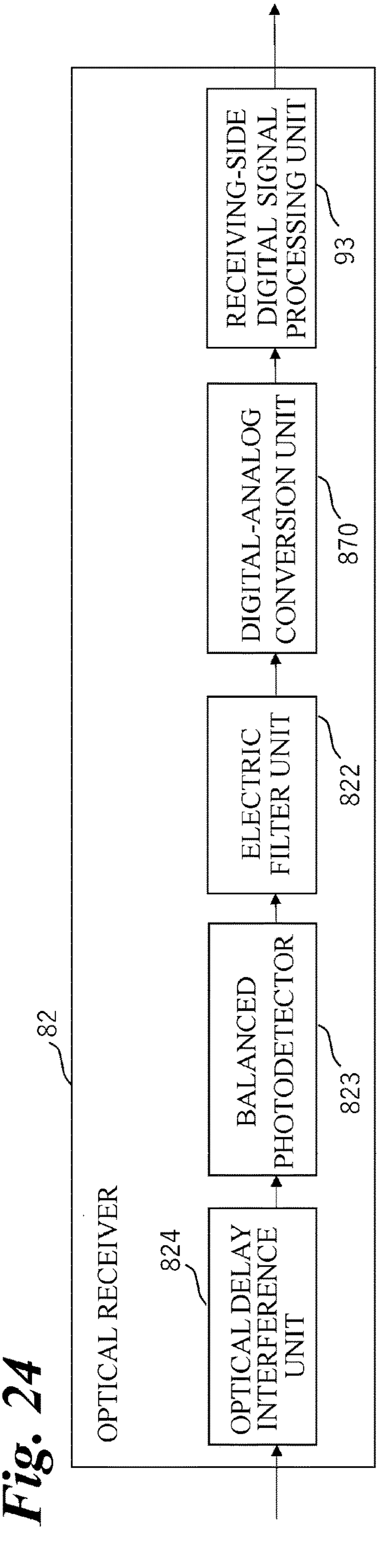
FIG. 24 is a drawing illustrating an example of a detailed block configuration of a second configuration of the optical receiver that employs the optical phase modulation scheme.

FIG. 24 is a drawing illustrating an example of a detailed block configuration of a second configuration of the optical receiver 82 that employs the optical phase modulation scheme. For example, when the optical phase modulation scheme is employed, as illustrated in FIG. 24, the optical receiver 82 of the second configuration includes an optical delay interference unit 824, the balanced photodetector 823, the electric filter unit 822, the digital-analog conversion unit 870, and the receiving-side digital signal processing unit 93. The optical receiver 82 does not need to include at least any one of the electric filter unit 822 or the analog-digital conversion unit 870.

The optical delay interference unit 824 causes interference of a low-noise amplified optical modulation signal. The interfered optical modulation signal is detected by the balanced photodetector 823, and becomes an electric signal. The electric signal is converted into a digital signal by the analog-digital conversion unit 870. In the electric filter unit 822, digital filter processing may be performed with the function of the electric filter unit 822 taken into the receiving-side digital signal processing unit 93. Before the error correction decoding unit 938, a deinterleaver unit (not illustrated) that performs a process of an operation reverse to reordering the bit data on the communication service data in which the process of changing the order of the bit data has been performed by the interleaver unit (not illustrated) may be provided.

Next, with reference to FIG. 25, information regarding the control link for transmitting and receiving between the optical space communication management device 1, the wireless ground station 4, the optical ground station 3, and the non-terrestrial node group will be described. FIG. 25 is a drawing illustrating an exemplary sequence for describing an optical space communication management function of the embodiment. In the drawing, a dotted link indicates a communication by a wireless control link, such as a radio wave, and a solid link indicates a communication by a control link, such as a wired or wireless LAN.

As illustrated in FIG. 25, the wireless ground station 4 receives a service request via a wireless control link, such as a radio wave, based on communication service data from the non-terrestrial node group (S1-1), and transmits the received service request to the optical space communication management device 1 via a control link, such as a wired or wireless LAN (S2).

When the service request from the non-terrestrial node group is transmitted together with the communication service data, they are received by the optical ground station 3 via an optical link (S1-2). The communication service processing unit 23 of the optical space communication device 2 of the optical ground station 3 transmits the service request of the optical ground station 3 to the optical space communication management device 1 via a control link, such as a wired or wireless LAN based on the communication service data from a terrestrial network including a mobile communication network, an optical backbone communication network, and the like provided by business companies connected to cloud or the like. When the optical ground station 3 has received a service request from the non-terrestrial node group, the communication service processing unit 23 of the optical space communication device 2 of the optical ground station 3 also transmits the service request from the non-terrestrial node group (S3).

The non-terrestrial node group transmits link monitoring information to the wireless ground station 4 via a wireless control link, such as a radio wave (S4-1), and the wireless ground station 4 transmits the link monitoring information to the optical space communication management device 1 via a control link, such as a wired or wireless LAN (S5).

When the service request from the non-terrestrial node group is transmitted together with the communication service data, they are received by the optical ground station 3 via an optical link (S4-2). The optical ground station 3 transmits the link monitoring information of the optical ground station 3 to the optical space communication management device 1 via a control link, such as a prior or wireless LAN, and when the optical ground station 3 has received link monitoring information from the non-terrestrial node group, the optical ground station 3 also transmits the link monitoring information from the non-terrestrial node group (S6). When the optical space communication management device 1 is connected to the environmental/weather information collection device 8, environmental and weather information is transmitted from the environmental/weather information collection device 8 (S10) together with the transmission of the link monitoring information (S5, S6).

Next, the optical space communication management device 1 transmits link path information and a link parameter of the optical ground station 3 for transmitting and receiving the communication service data based on the service request, the link monitoring information, and the environmental and weather information to the optical ground station 3 via a control link, such as a wired or wireless LAN. When link path information and a link parameter from the non-terrestrial node group are transmitted together with the communication service data, the link path information and the link parameter from the non-terrestrial node group are transmitted to the optical ground station 3 (S7). When the link path information and the link parameter from the non-terrestrial node group are transmitted together with the communication service data, the link path information and the link parameter from the non-terrestrial node group are transmitted to the non-terrestrial node group from the optical ground station 3 via an optical link (S9-1).

The optical space communication management device 1 transmits the link path information and the link parameter for transmitting and receiving the communication service data based on the service request and the link monitoring information to the wireless ground station 4 via a control link, such as a wired or wireless LAN (S8). The wireless ground station 4 transmits the link path information and the link parameter to the non-terrestrial node group via a wireless control link, such as a radio wave (S9-2).

Next, the link information will be described in detail with reference to FIG. 26. FIG. 26 is a drawing illustrating examples of the link path information database DB1, the link monitoring information database DB2, the service request information database DB3, and the link parameter information database DB4. The link path information database DB1 includes, for example, a link path information table TB1 and an optical signal path information table TB2. The link monitoring information database DB2 includes, for example, a frequency variation information table TB3, a power variation information table TB4, and a phase variation information table TB5. The service request information database DB3 includes a service request table TB6. The link parameter information database DB4 includes an optical signal parameter table TB7-1 and a high-output optical amplifier parameter table TB8-1. When the Nyquist frequency division multiplexing scheme or the orthogonal frequency division multiplexing scheme described above is used, the link parameter information database DB4 includes an optical signal/subcarrier signal parameter table TB7-2 and a high-output optical amplifier parameter table TB8-2.

The link path information table TB1 stores information on the paths of the respective links. The link path information table TB1 stores a link ID as a number for each link, a transmitting-side optical space communication device ID, a transmitting-side optical space communication device type, a receiving-side optical space communication device ID, a receiving-side optical space communication device type, a propagation delay, and an optical signal ID, which are mutually associated. The information on the link path stored in the link path information table TB2 is not limited thereto.

The transmitting-side optical space communication device ID is a number of the optical space communication device 2 that transmits the optical modulation signal handled by the link, and the transmitting-side optical space communication device type is a type of the optical space communication device 2 that transmits the optical modulation signal handled by the link. The receiving-side optical space communication device ID is a number of the optical space communication device 2 that receives the optical modulation signal handled by the link, and the receiving-side optical space communication device type is a type of the optical space communication device 2 that receives the optical modulation signal handled by the link. The propagation delay indicates how many seconds the propagation in the link delays, and the optical signal ID is a number of the optical modulation signal transmitted and received via the link. The propagation delay may be a time delay of end-to-end on the network.

The optical signal path information table TB2 records information on the paths of the respective optical modulation signals. The optical signal path information table TB2 stores the optical signal ID, the transmitting-side optical space communication device ID, the receiving-side optical space communication device ID, and a relay optical space communication device ID relating to the optical modulation signals, which are mutually associated. The relay optical space communication device ID is a number of the optical space communication device 2 that relays the optical modulation signal when passing through the ground and the satellite. The information on the optical signal path stored in the optical signal path information table TB2 is not limited thereto.

The frequency variation information table TB3 stores information on the frequency variation of the optical modulation signal transmitted by the optical space communication device 2 for each link at each time. The frequency variation information table TB3 stores the link ID as a number for each link, time information as information on the time, a transmitting-side frequency variation rate, a transmitting-side frequency variation start value, and a transmitting-side frequency variation amount, which are mutually associated. The information on the frequency variation stored in the frequency variation information table TB3 is not limited thereto.

The variation rate is an amount of change per second of the frequency of the optical modulation signal. The unit of the variation rate is Hz/second or the like. The start value is a value of the frequency of the optical modulation signal when the optical modulation signal is transmitted. The unit of the start value is Hz or the like. The variation amount is an amount of change of the frequency of the optical modulation signal. The unit of the variation amount is Hz or the like.

The power variation information table TB4 stores information on the output of the optical modulation signal transmitted by the optical space communication device 2 for each link. The power variation information table TB4 stores the link ID as a number for each link, the time information as information on the time, a scintillation index, an optical signal-to-noise ratio, and a signal-to-noise ratio, which are mutually associated. The information on the power variation stored in the power variation information table TB4 is not limited thereto.

The scintillation index indicates a normalized variance of the received light power in the link, and indicates a degree of atmospheric fluctuation in the optical communication between the ground and the satellite. The optical signal-to-noise ratio (OSNR: Optical Signal-to-Noise Ratio) is a ratio of an optical signal to a noise of an optical modulation signal in a link, and the signal-to-noise ratio (SNR: Signal-to-Noise Ratio) is a ratio of a signal to a noise of an electric signal in a link. The units of the optical signal-to-noise ratio and the signal-to-noise ratio are dB.

The phase variation information table TB5 stores information on the phase variance of the optical modulation signal transmitted by the optical space communication device 2 for each link at each time. The phase variation information table TB5 stores the link ID as a number for each link, the time information as information on the time, and a phase variance of the optical modulation signal, which are mutually associated. The information on the phase variation stored in the phase variation information table TB5 is not limited thereto.

The service request table TB6 stores a service request for each service. The service request table TB6 stores a service ID as a number for each service, a service type as a type of the service, the transmitting-side optical space communication device ID, the receiving-side optical space communication device ID, a desired communication rate, an acceptable delay time, an acceptable bit error rate (BER: Bit Error Rate), and encryption request or not, which are mutually associated. An acceptable packet error rate (PER: Packet Error Rate), an acceptable system margin, an acceptable throughput, and the like may be added to the service request table TB6. The information on the service request stored in the service request table TB6 is not limited thereto.

The transmitting-side optical space communication device ID is a number of the optical space communication device 2 in the service transmission side. The receiving-side optical space communication device ID is a number of the optical space communication device 2 in the receiving side as a destination of the service. The desired communication rate is a communication rate required to the service, and the unit is Gbit/second.

The acceptable delay time is a delay period acceptable for the service, and the unit is second. The bit error rate is a bit error rate acceptable for the service. The packet error rate is a packet error rate acceptable for the service. The acceptable system margin is a system margin acceptable for the service, and the acceptable throughput is a throughput acceptable for the service. The encryption request or not indicates whether the encryption of the service is necessary or not.

The optical signal parameter table TB7-1 stores parameters for each optical modulation signal. The optical signal parameter table TB7-1 stores the optical signal ID, the service ID, a transmission wavelength, a communication rate, a symbol rate, a modulation scheme, a multiple-value count, an error correction code type, a code rate, a repetition count of error correction code, encryption or not, and polarization-multiplexing or not, which are mutually associated. The information on the optical signal parameters stored in the optical signal parameter table TB7-1 is not limited thereto.

The optical signal ID is an optical signal ID as a number for each optical modulation signal. The transmission wavelength is a wavelength of the optical modulation signal to be transmitted, and the unit is nm. The communication rate is a communication rate of the optical modulation signal, and the unit is Gbit/second.

The symbol rate is a modulation rate per unit time of the optical modulation signal, and the unit is Gbit/second. The modulation scheme is a digital signal processing scheme of the digital information included in the optical modulation signal, and is, for example, M-PSK (Multilevel-Phase Shift Keying), M-QAM (Multilevel-Quadrature Amplitude Modulation), OOK (On-Off Keying), M-PAM (Multilevel-Pulse Amplitude Modulation), M-PPM (Multilevel-Pulse Position Modulation), M-PAPM (Multilevel-Pulse Amplitude Position Modulation), or the like. The multiple-value count is a multiple-value count in the multilevel modulation of the digital information included in the optical modulation signal.

The error correction code type indicates a type of the error correction code of the communication service data included in the optical modulation signal. The code rate is a code rate of the error correction code of the communication service data included in the optical modulation signal. The repetition count is a repetition count of the error correction code. The encryption or not indicates whether the communication service data included in the optical modulation signal has been encrypted or not. The polarization-multiplexing or not indicates whether the optical modulation signal has been polarization-multiplexed or not.

An optical transmission system parameter table TB8-1 stores parameters for each of the high-output optical amplifiers 92. The high-output optical amplifier parameter table TB8-1 stores a transmission optical space communication device ID, a transmission optical output, a transmission wavelength, an optical signal ID, an optical signal power ratio, and a beam divergence angle, which are mutually associated, for each of the high-output optical amplifiers 92. The transmission optical output is an output of the high-output optical amplifier 92, and the unit is watt. The optical signal power ratio is an optical output power ratio of the optical modulation signal to an optical power of the whole of a wavelength-multiplexed optical modulation signal multiplexed with a plurality of wavelengths after the high-output optical amplifier 92. The beam divergence angle is a beam divergence angle in the transmitting side of the optical unit 21.

When the Nyquist frequency division multiplexing scheme or the orthogonal frequency division multiplexing scheme described above is used, the optical signal/subcarrier signal parameter table TB7-2 stores parameters for each optical modulation signal. The optical signal/subcarrier signal parameter table TB7-2 stores the optical signal ID, a subcarrier signal ID, the service ID, the transmission wavelength, frequency allocation information of the subcarrier signal, the communication rate, the symbol rate, the modulation scheme, the multiple-value count, the error correction code type, the code rate, the repetition count of the error correction code, the encryption or not, a subcarrier signal power ratio, and polarization-multiplexing or not, which are mutually associated.

The optical signal ID is an optical signal ID as a number for each optical modulation signal. The subcarrier signal ID is a number of the subcarrier modulation signal in a digital frequency domain included in the optical modulation signal. The service ID is a number for each service. The transmission wavelength is a wavelength of the optical modulation signal to be transmitted, and the unit is nm. The frequency allocation information of the subcarrier signal is frequency allocation information of the subcarrier modulation signal in the digital frequency domain. The communication rate is a communication rate of a subcarrier modulation signal, and the unit is Gbit/second.

The symbol rate is a modulation rate per unit time of the subcarrier modulation signal, and the unit is Gbit/second. The modulation scheme is a digital modulation scheme of the digital information included in the subcarrier modulation signal, and is, for example, M-PSK (Multilevel-Phase Shift Keying), M-QAM (Multilevel-Quadrature Amplitude Modulation), OOK (On-Off Keying), M-PAM (Multilevel-Pulse Amplitude Modulation), M-PPM (Multilevel-Pulse Position Modulation), M-PAPM (Multilevel-Pulse Amplitude Position Modulation), or the like. The multiple-value count is a multiple-value count in the multilevel modulation of the digital information included in the subcarrier modulation signal.

The error correction code type indicates a type of the error correction code of the communication service data included in the subcarrier modulation signal. The code rate is a code rate of the error correction code of the communication service data included in the subcarrier modulation signal. The repetition count is a repetition count of the error correction code. The encryption or not indicates whether the communication service data included in the subcarrier modulation signal has been encrypted or not. The subcarrier signal power ratio is a power ratio of the subcarrier modulation signal to the power of the whole of a plurality of subcarrier modulation signals included in the optical modulation signal. The polarization-multiplexing or not indicates whether the subcarrier modulation signal has been polarization-multiplexed or not.

An optical transmission system parameter table TB8-2 stores parameters for each of the high-output optical amplifiers 92. The high-output optical amplifier parameter table TB8-2 stores a transmission optical space communication device ID, a transmission optical output, a transmission wavelength, an optical signal ID, an optical signal power ratio, a subcarrier signal ID, and a beam divergence angle, which are mutually associated, for each of the high-output optical amplifiers 92. The transmission optical output is an output of the high-output optical amplifier 92, and the unit is watt. The beam divergence angle is a beam divergence angle in the transmitting side of the optical unit 21.

Next, the position information will be described in detail with reference to FIG. 27. FIG. 27 is a drawing illustrating an example of the position information database DB5 of the embodiment. The position information database DB5 includes, for example, a satellite orbit parameter table TB9, a flying object move parameter table TB10, a satellite/flying object position information table TB11, and an optical space communication device information table TB12.

Parameters relating to the non-terrestrial node group are stored in the satellite orbit parameter table TB9 and the flying object move parameter table TB10. The position calculation unit 13 of the optical space communication management device illustrated in FIG. 2 calculates the position information from the satellite orbit parameter table TB9 and the flying object move parameter table TB10. The calculated position information may be stored in a position information database as the satellite/flying object position information table TB11.

The satellite orbit parameter table TB9 stores parameters of the satellite orbit for each of the geostationary orbit satellites 5 and the low earth orbit satellites 6. The satellite orbit parameter table TB9 stores a satellite ID as a number of the geostationary orbit satellite 5 or the low earth orbit satellite 6, an orbit inclination angle (°), a right ascension of ascending node (°), an eccentricity, a mean argument of periapsis (°), a mean anomaly (°), a mean motion (rotation count/day), a count of orbiting (lap) in an epoch, which are mutually associated. These parameters of the satellite orbit are based on, for example, two link orbit elements format (TLE: Two-Line Elements) as a format of a text format of Kepler orbit elements in a geocentric coordinate system of an artificial satellite, GPS data obtained by a GPS receiver (not illustrated) installed in a satellite, or the like. The information on the satellite orbit parameter stored in the satellite orbit parameter table TB9 is not limited thereto.

The flying object move parameter table TB10 stores parameters in the move for each flying object 7. The flying object move parameter table TB10 stores a flying object ID as a number of the flying object 7, a longitude (°), a latitude (°), a horizontal speed (m/s), an ascending speed (m/s), an altitude (m), a moving direction vector, and an orbit form. These parameters of the flying object move are based on, for example, GPS data obtained by a GPS receiver (not illustrated) installed in a flying object, or the like. The information on the flying object move parameters stored in the flying object move parameter table TB10 is not limited thereto.

The satellite/flying object position information table TB11 stores the position information at each time for each of the geostationary orbit satellites 5, the low earth orbit satellites 6, and the flying objects 7. The satellite/flying object position information table TB11 stores a satellite/flying object ID as a number of the geostationary orbit satellite 5, the low earth orbit satellite 6, or the flying object 7, a type of the satellite/flying object, a time, an X-coordinate position, a Y-coordinate position, a Z-coordinate position, a moving speed (m/s), and a moving direction vector, which are mutually associated. The type is a type of a medium, such as a low earth orbit satellite, a geostationary orbit satellite, and a flying object. The information on the position of the satellite/flying object stored in the satellite/flying object position information table TB11 is not limited thereto.

The optical space communication device information table TB12 stores the optical space communication device ID and the optical space communication device type as information held by the optical space communication device for each satellite/flying object ID. The optical space communication device ID is a number of the optical space communication device 2 that transmits the optical modulation signal handled by the link. The optical space communication device type is a type of the optical space communication device 2 that transmits the optical modulation signal handled by the link. The information on the optical space communication device stored in the optical space communication device information table TB12 is not limited thereto.

Figure 28:
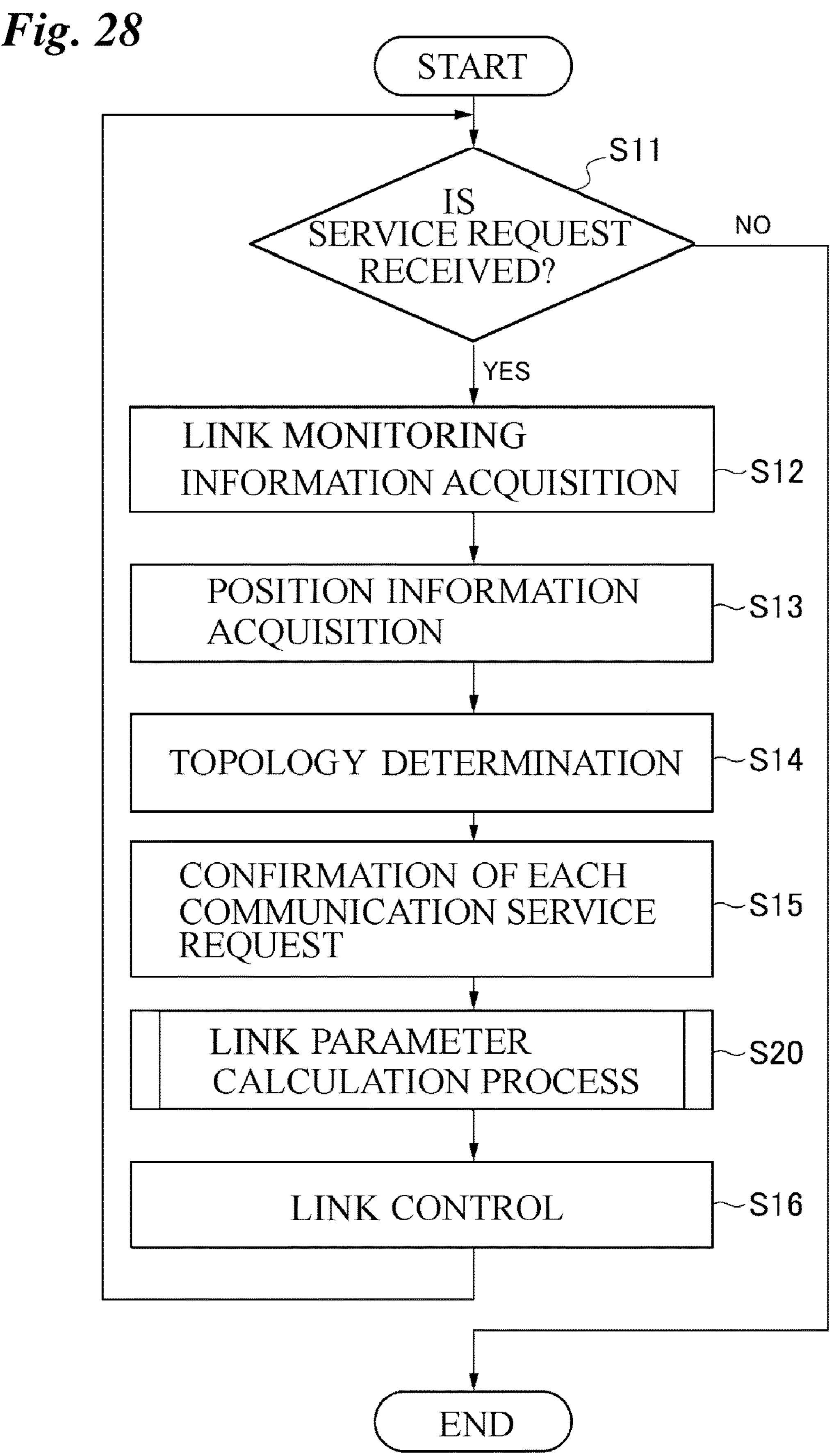
FIG. 28 is an example of a flowchart illustrating a processing procedure of the optical space communication management function of the embodiment.

Next, the processing procedure of the optical space communication management function performed by the optical space communication management device 1 will be described with reference to FIG. 28. FIG. 28 is an example of a flowchart illustrating the processing procedure of the optical space communication management function of the embodiment. The link parameter calculation unit 10 determines whether the link parameter calculation unit 10 has received the service request or not (S11).

The link information communication unit 14 stores the received service request in the service request table TB6. When it is determined that the link parameter calculation unit 10 has not referred to a new service request from the service request table TB6 (S11: NO), the link parameter calculation unit 10 ends the process once, and then starts the process again, thereby performing Step S11.

When it is determined that the link parameter calculation unit 10 has referred to a new service request from the service request table TB6 (S11: YES), the link monitoring unit 11 acquires the link monitoring information from the wireless ground station 4 via the link information communication unit (S12). The link monitoring unit 11 stores the acquired link monitoring information in the frequency variation information table TB3, the power variation information table TB4, and the phase variation information table TB5.

Next, the link parameter calculation unit 10 acquires, for example, the position information calculated from the information stored in the satellite orbit parameter table TB9, the flying object move parameter table TB10, the satellite/flying object position information table TB11, and the optical space communication device information table TB12 by the position calculation unit 13 for each of the geostationary orbit satellite 5, the low earth orbit satellite 6, and the flying object 7 (S13). The link parameter calculation unit 10 may acquire the environmental information and the weather information stored in the environmental information database DB6 and the weather information database DB7, respectively.

Next, the link parameter calculation unit 10 determines the positions of the respective nodes, such as the geostationary orbit satellite 5, the low earth orbit satellite 6, and the flying object 7 of the non-terrestrial node group and the optical ground station 3, and topologies indicating the connection points of the respective nodes (S14). The geostationary orbit satellite 5, the low earth orbit satellites 6A to 6C, the flying objects 7A to 7D, and the optical ground stations 3A to 3D that include the optical space communication devices 2 may be referred to as nodes 3A to 3D, 5, 6A to 6C, and 7A to 7D.

Next, the link parameter calculation unit 10 confirms each of the communication service requests to be transmitted (S15). Next, the link parameter calculation unit 10 calculates the link path information and the link parameter by a link parameter calculation process S20 described below. The link parameter calculation unit 10 transmits the calculated link path information and link parameter to the link control unit 12, and the link control unit 12 performs the link control based on the calculated link parameter (S16). The link parameter calculation unit 10 stores the link path information in the link path information table TB1 and the optical signal path information table TB2, and stores the link parameter in the optical signal parameter table TB7-1 and the high-output optical amplifier parameter table TB8-1. When the Nyquist frequency division multiplexing scheme or the orthogonal frequency division multiplexing scheme described above is used, the link parameter calculation unit 10 stores the link path information in the link path information table TB1 and the optical signal path information table TB2, and stores the link parameter in the optical signal/subcarrier signal parameter table TB7-2 and the high-output optical amplifier parameter table TB8-2.

Figure 29:
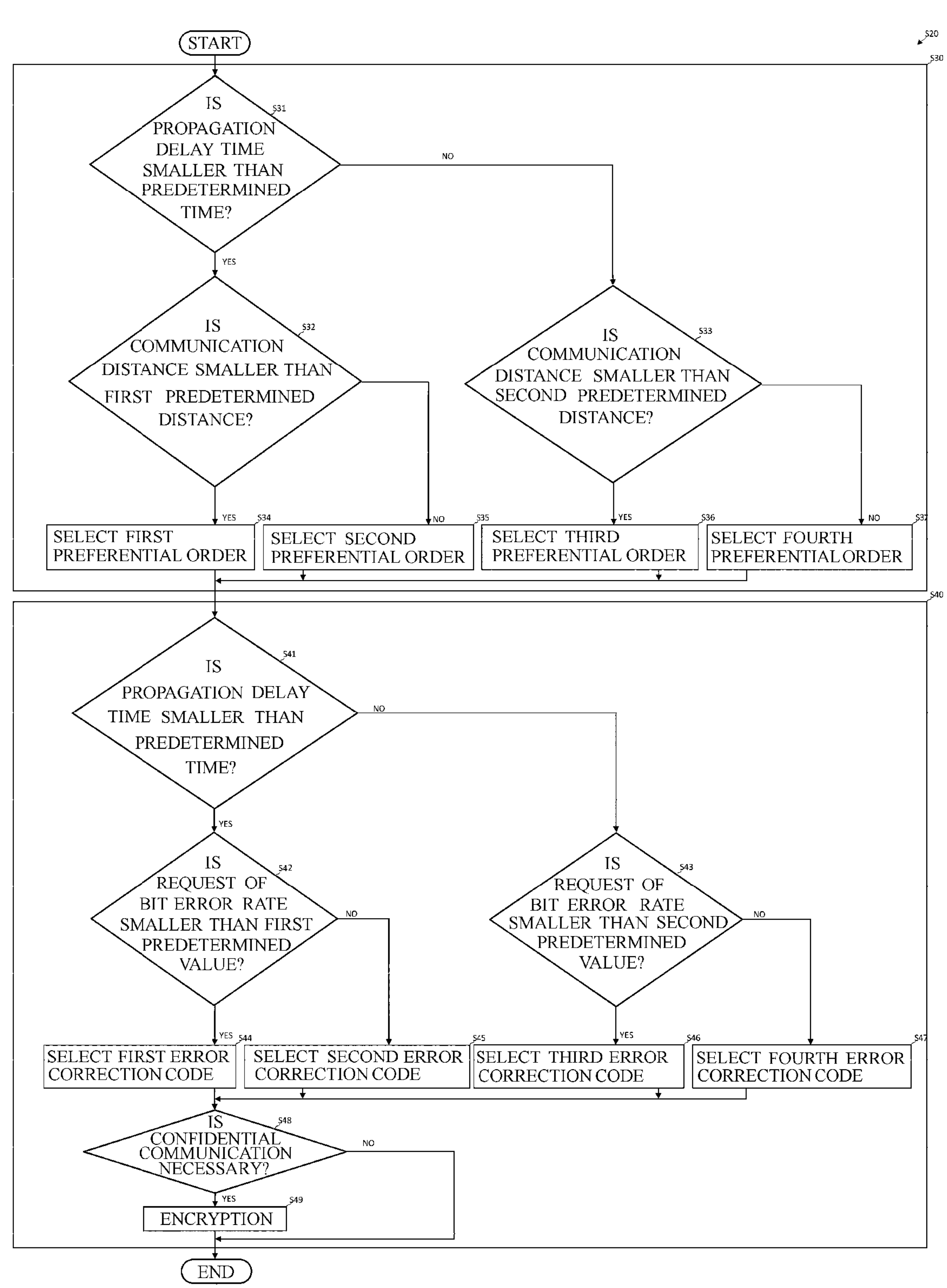
FIG. 29 is an example of a flowchart illustrating a processing procedure of a link parameter calculation process of the embodiment.

Next, the link parameter will be described in detail with reference to FIG. 29. FIG. 29 is an example of a flowchart illustrating a processing procedure of the link parameter calculation process S20 of the embodiment. The link path information and the link parameter are calculated by the link parameter calculation unit 10 based on the position information calculated by the position calculation unit 13 and the link monitoring information stored in the service request table TB6, the link path information table TB1, the frequency variation information table TB3, and the power variation information table TB4. The link path information and the link parameter may be calculated by the link parameter calculation unit 10 based on the position information calculated by the position calculation unit 13, the link monitoring information stored in the service request table TB6, the link path information table TB1, the frequency variation information table TB3, and the power variation information table TB4, and the environmental information and the weather information stored in the environmental information database DB6 and the weather information database DB7, respectively. In updating the link path information and the link parameter, the link path information stored in the link path information database DB1 and the link parameter stored in the link parameter information database DB4 before the update may be used.

The link parameter calculation unit 10 stores the calculated link path information and link parameter in, for example, the optical signal parameter table TB7-1, the high-output optical amplifier parameter table TB8-1, the link path information table TB1, and the optical signal path information table TB2. When the Nyquist frequency division multiplexing scheme or the orthogonal frequency division multiplexing scheme described above is used, the link parameter calculation unit 10 stores the calculated link path information and link parameter in, for example, the optical signal/subcarrier signal parameter table TB7-2, the high-output optical amplifier parameter table TB8-2, the link path information table TB1, and the optical signal path information table TB2.

The link parameter calculation process S20 includes a preferential order selection process S30 and an error correction code selection process S40. The preferential order selection process S30 is a process for selecting a preferential order of the path for each of the optical modulation signals based on the propagation delay time. The error correction code selection process S40 is a process for selecting the error correction code for each of the optical modulation signals, and selecting whether to perform the encryption or not for each of the optical modulation signals. The preferential order selection process S30 and the error correction code selection process S40 may be performed in the inverse order.

First, the preferential order selection process S30 will be described. The link parameter calculation unit 10 determines whether the propagation delay time is smaller than a predetermined time or not for a service as a target (S31). Here, the predetermined time means, for example, a value corresponding to the acceptable delay time of the service request table TB6 in the service request. As the propagation delay time, for example, the propagation delay of the link path information table TB1 is referred to.

When the propagation delay time is determined to be smaller than the predetermined time (S31: YES), the link between the geostationary orbit satellite 5, the low earth orbit satellite 6, and the likes is selected. In this case, the link parameter calculation unit 10 determines whether a communication distance is smaller than a first predetermined distance or not (S32). Here, the communication distance is calculated by referring to the position information, and the first predetermined distance is calculated by referring to the service request.

When the communication distance is determined to be smaller than the first predetermined distance (S32: YES), the link parameter calculation unit 10 selects a first preferential order (S34). For example, the first preferential order is an order of the link including the geostationary orbit satellite 5, the link that includes the low earth orbit satellite 6 and has the number of relays smaller than a predetermined number of times, the link that includes the geostationary orbit satellite 5 providing a service different from the service as a target, and the link that includes the low earth orbit satellite 6 providing a service different from the service as a target and has the number of relays smaller than the predetermined number of times.

When the communication distance is determined to be equal to or more than the first predetermined distance (S32: NO), the link parameter calculation unit 10 selects a second preferential order (S35). For example, the second preferential order is an order of the link that includes the low earth orbit satellite 6 and has the number of relays smaller than a predetermined number of times, the link including the geostationary orbit satellite 5, the link that includes the low earth orbit satellite 6 providing a service different from the service as a target and has the number of relays smaller than the predetermined number of times, and the link that includes the geostationary orbit satellite 5 providing a service different from the service as a target.

When the propagation delay time is determined to be equal to or more than the predetermined time (S31: NO), the link between the low earth orbit satellite 6, the flying object 7, the optical ground station 3, and the likes is selected. In this case, the link parameter calculation unit 10 determines whether the communication distance is smaller than a second predetermined distance or not (S33). The second predetermined distance is calculated by referring to the service request.

When the communication distance is determined to be smaller than the second predetermined distance (S33: YES), the link parameter calculation unit 10 selects a third preferential order (S36). For example, the third preferential order is an order of the link that includes the low earth orbit satellite 6 and has the number of relays equal to or more than a predetermined number of times, the link that includes the low earth orbit satellite 6 providing a service different from the service as a target and has the number of relays equal to or more than the predetermined number of times, the link including the flying object 7, and the link that includes the flying object 7 providing a service different from the service as a target.

When the communication distance is determined to be equal to or more than the second predetermined distance (S33: NO), the link parameter calculation unit 10 selects a fourth preferential order (S37). For example, the fourth preferential order is an order of the link including the flying object 7, the link that includes the flying object 7 providing a service different from the service as a target, the link that includes the low earth orbit satellite 6 and has the number of relays equal to or more than the predetermined number of times, and the link that includes the low earth orbit satellite 6 providing a service different from the service as a target. By determining the preferential order, the link parameter calculation unit 10 determines the link parameter corresponding to the value stored in the optical signal path information table TB2.

Next, the error correction code selection process S40 will be described. The link parameter calculation unit 10 determines whether the propagation delay time is smaller than a predetermined time or not for a service as a target (S41). Here, the predetermined time means, for example, a value corresponding to the acceptable delay time of the service request table TB6 in the service request. As the propagation delay time, for example, the propagation delay of the link path information table TB1 is referred to.

When the propagation delay time is determined to be smaller than the predetermined time (S41: YES), the link between the geostationary orbit satellite 5, the low earth orbit satellite 6, and the likes is selected. In this case, the link parameter calculation unit 10 determines whether a request of the acceptable bit error rate is smaller than a first predetermined distance or not (S42). The first predetermined value means, for example, a value corresponding to the acceptable bit error rate of the service request table TB6 in the service request. The request of the acceptable bit error rate is, for example, associated one-to-one with a service, and determined at the point when the service type is determined.

When the request of the acceptable bit error rate is determined to be smaller than the first predetermined value (S42: YES), the link parameter calculation unit 10 selects a first error correction code (S44). For example, the first error correction code is an error correction code that is highly reliable and has a high code rate, and is, for example, a Low Density Parity-check Code that is high in repetition count and has a high code rate.

When the request of the acceptable bit error rate is determined to be equal to or more than the first predetermined value (S42: NO), the link parameter calculation unit 10 selects a second error correction code (S45). For example, the second error correction code is an error correction code that is highly reliable and has a low code rate, and is, for example, a Low Density Parity-check Code (LDPC) that is low in repetition count and has a low code rate.

When the propagation delay time is determined to be equal to or more than the predetermined time (S41: NO), the link between the low earth orbit satellite 6, the flying object 7, the optical ground station 3, and the likes is selected. In this case, the link parameter calculation unit 10 determines whether the request of the acceptable bit error rate is smaller than a second predetermined value or not (S43). The second predetermined value means, for example, a value corresponding to the acceptable bit error rate of the service request table TB6 in the service request.

When the request of the acceptable bit error rate is determined to be smaller than the second predetermined value (S43: YES), the link parameter calculation unit 10 selects a third error correction code (S46). For example, the third error correction code is an error correction code with a low process delay and a high code rate, and is, for example, a Polar Code that is low in process delay and has a high error correction capability.

When the request of the acceptable bit error rate is determined to be equal to or more than the second predetermined value (S43: NO), the link parameter calculation unit 10 selects a fourth error correction code (S47). For example, the fourth error correction code is an error correction code with a low process delay and a low code rate, and is, for example, a Reed-Solomon Code (RS) with a low process delay and a slightly low error correction capability. By selecting the error correction code, the link parameter calculation unit 10 determines the link parameter corresponding to the value stored for each of the error correction code types in the optical signal parameter table TB7-1. Although not illustrated in the flowchart of FIG. 29, a process for selecting no error correction code may be included. While the acceptable bit error rate is used as an example, an acceptable packet error rate (PER: Packet Error Rate), an acceptable system margin, an acceptable throughput, and the like may be used for the determination.

Next, the link parameter calculation unit 10 determines whether a confidential communication is necessary or not for the service as a target (S48). When the confidential communication is determined to be necessary (S48: YES), the link parameter calculation unit 10 performs the encryption on the service (S49), and the link parameter calculation process S20 ends.

When the confidential communication is determined not to be necessary (S48: NO), the link parameter calculation process S20 ends. By determining whether to perform the encryption or not, the link parameter calculation unit 10 determines the link parameter corresponding to the value stored in the encryption or not of the optical signal parameter table TB7-1.

The flowchart illustrating the processing procedure of the optical space communication management function according to the embodiment described with reference to FIG. 28, and the flowchart illustrating the processing procedure of the link parameter calculation process S20 according to the embodiment described with reference to FIG. 29 are examples, and the processing procedures are not limited thereto.

Figure 30:
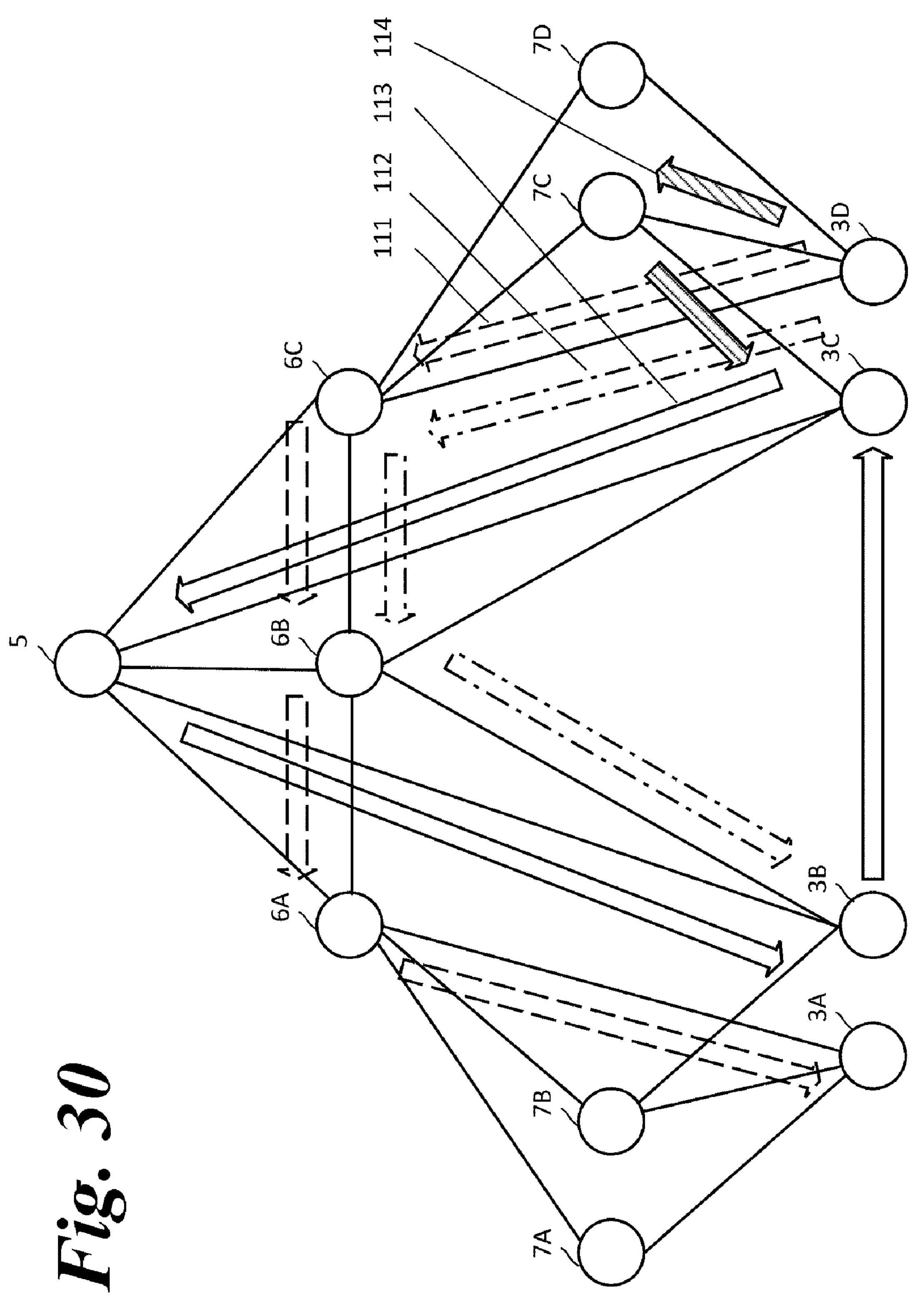
FIG. 30 is an example of a drawing for describing an effect of the embodiment.

Next, effects of the embodiment will be described with reference to FIG. 30. FIG. 30 is an example of a drawing for describing the effects of the embodiment. For example, a path 111 indicated by dotted arrows is a path used for transmitting information with a low capacity in low latency, and is used for a service in which an optical modulation signal is transmitted and received in a long distance in low latency by a link including a low earth orbit satellite at a low communication rate.

A path 112 indicated by dash-dotted arrows is a path used for transmitting information with a large capacity, such as a video content and an image acquired by a satellite, and is used for a service in which multilevel processing is performed and an optical modulation signal is transmitted and received in a short distance by a link including a low earth orbit satellite at a high communication rate.

A path 113 indicated by solid arrows is a path used for transmitting information low in low latency request, such as IoT (Internet of Things), and is used for a service in which wavelength division multiplexing scheme is employed and an optical modulation signal is transmitted and received by a link including the geostationary orbit satellite 5.

A path 114 indicated by diagonal link arrows is a path used for transmitting large-capacity information in which the low latency is required, and is used for a service in which an optical modulation signal is transmitted and received in a short distance by a link including the flying object 7 of ultra-low latency at a high communication rate.

Thus, according to the embodiment, the link corresponding to the service is selected based on the link parameter. Since the two optical modulation signals of the optical modulation signal of the path 111 and the optical modulation signal of the path 112 are transmitted as one integrated optical modulation signal from the node 3D to the node 6C, multiplexing is performed in the optical region. One optical modulation signal transmitted from the node 3C to the node 5 includes two pieces of digital information, and multiplexing is performed in a digital region.

As described above, the optical space communication management device 1 according to the embodiment can perform the control across the layers without dividing for each layer, and can transmit the information via the appropriate communication network. In the embodiment, also in a case where the node is one, the timing of transmitting the optical modulation signal can be controlled.

The optical space communication management device 1 according to the embodiment can calculate the link parameter and the link path information based on the environmental information and the weather information together with the link monitoring information and the service request. Accordingly, like a site diversity in which the link with the optical ground station is selected depending on the environment and the weather, the optical space communication management device enabling the appropriate routing for the satellite optical communication network and the transmission of the optical modulation signal can be achieved.

While the nodes of the optical space communication on the ground, the flying object in the sky, the low earth orbit, and the geostationary orbit are described above as examples, the embodiment is not limited thereto, and the embodiment may be applied to an optical space communication in the cosmic space including the sky, the cosmic space, and the like, such as a medium earth orbit, a transfer orbit, the proximity of month, and deep space.

While the nodes of the optical space communication with various link configuration of the ground, the flying object in the sky, the low earth orbit, and the geostationary orbit are described above as examples, the embodiment is not limited thereto, and the embodiment may be applied to the satellite optical communication networks with various link configuration in the sky, the cosmic space, and the like, such as the ground, a flying object in the sky, a low earth orbit, a geostationary orbit, a medium earth orbit, a transfer orbit, the proximity of month, and deep space, operated by a plurality of satellite communication providers.

While the nodes in the optical communication between the satellites and between the ground and the satellite are described above as examples, the embodiment is not limited thereto, and the embodiment may be applied to an optical communication on a moving body, such as an automobile and a train, and an optical communication station on the ground, may be applied to an optical communication station and a moving body indoors, and may be applied to an optical communication of a moving body on water, such as a ship, a moving body in water, a moving body on the bottom of the sea, and the like.

While the case where the link parameter calculation unit 10, the link monitoring unit 11, the link control unit 12, the position calculation unit 13, the service request collection unit 17, a wireless communication unit 20, the optical space communication device control unit 22, the communication service processing unit 23, the wireless ground station wireless communication unit 41, the wireless ground station communication unit 42, the wireless ground station control unit 43, the geostationary orbit satellite control unit 51, the low earth orbit satellite control unit 61 and the flying object control unit 71, the communication service processing unit 201, and the like are electronic circuits configured of electronic devices or the like installable as on-board devices, such as an FPGA (Field Programmable Gated Array) or a CPU (Central Processing Unit), is described, the embodiment is not limited thereto.

For example, the link parameter calculation unit 10, the link monitoring unit 11, the link control unit 12, the position calculation unit 13, the service request collection unit 17, the wireless communication unit 20, the optical space communication device control unit 22, the communication service processing unit 23, the wireless ground station wireless communication unit 41, the wireless ground station communication unit 42, the wireless ground station control unit 43, the geostationary orbit satellite control unit 51, the low earth orbit satellite control unit 61 and the flying object control unit 71, the communication service processing unit 201, and the like may be configured of programs, protocols, or the like called by a CPU (Central Processing Unit) and stored in a RAM (Random Access Memory).

DESCRIPTION OF REFERENCE SIGNS

1: Optical space communication management device
2: Optical space communication device
3: Optical ground station
4: Wireless ground station
5: Geostationary Earth orbit satellite
6: Low earth orbit satellite
7: Flying object
8: Environment/weather information collection device
10: Link parameter calculation unit
11: Link monitoring unit
12: Link control unit
13: Position calculation unit
14: Link information communication unit
17: Service request collection unit
20: Wireless communication unit
21: Optical unit
22: Optical space communication device control unit
23: Communication service processing unit
31: Optical ground station control unit
32: Optical ground station communication unit
41: Wireless ground station wireless communication unit
42: Wireless ground station communication unit
43: Wireless ground station control unit
51: Geostationary Earth orbit satellite control unit
52: Geostationary Earth orbit satellite communication unit
61: Low earth orbit satellite control unit
62: Low earth orbit satellite communication unit
71: Flying object control unit
72: Flying object communication unit
81: Optical transmitter
82: Optical receiver
83: Optical amplifier
84: Transmitting-side digital signal processing unit
85: I-phase digital-analog conversion unit
86: Transmission light source
87: Q-phase digital-analog conversion unit
88: I-phase optical modulator
89: Light branching unit
90: Q-phase optical modulator
91: Light synthesis unit
92: High-output optical amplifier
93: Receiving-side digital signal processing unit
94: I-phase analog-digital conversion unit
95: Q-phase analog-digital conversion unit
96: I-phase balanced photodetector
97: Station light emitting source
98: Q-phase balanced photodetector
99: Optical frequency mixing unit
100: Low-noise optical amplifier
101: Optical multiplexer/demultiplexer
102: Multiplexing unit
103: Demultiplexing unit
111 to 114: Path
121: Optical modulator
122: Coherent light detection unit
131: Phase shifting unit
201: Communication service processing unit
202: Optical communication unit
205: Terminal control unit
206: Terminal communication device
801: Environment information collection unit
802: Weather information collection unit
821: Photoelectric converter
822: Electric filter unit
823: Balanced photodetector
824: Optical delay interference unit
841: Error correction coding unit
842: Multilevel modulation unit
843: Resampling unit
844: Nyquist filter unit
845: Modulator non-linker compensation unit
846: Digital filter unit
847: Frequency conversion unit
848: Power allocation unit
849: Subcarrier multiplexing unit
850: Inverse frequency conversion unit
851: CP adding unit
852: Phase modulation unit
870: Digital-analog conversion unit
900: Optical intensity modulator
901: Optical phase modulator
931: Resampling unit
932: Clock extraction unit
933: Matched filter unit
934: Adaptive equalization unit
935: Frequency estimation unit
936: Phase estimation unit
937: Multilevel demodulation unit
938: Error correction decoding unit
939: Frequency conversion unit
940: Phase demodulation unit
941: Inverse frequency conversion unit
944: CP removal unit
945: Subcarrier separation unit
DB1: Link path information database
DB2: Link monitoring information database
DB3: Service request information database
DB4: Link parameter information database
DB5: Position information database
DB6: Environment information database
DB7: Weather information database
TB1: Link path information table
TB2: Optical signal path information table
TB3: Frequency variation information table
TB4: Power variation information table
TB5: Phase variation information table
TB6: Service request table
TB7-1: Optical signal parameter table
TB7-2: Optical signal/subcarrier signal parameter table
TB8-1: High-output optical amplifier parameter table
TB8-2: High-output optical amplifier parameter table
TB9: Satellite orbit parameter table
TB10: Flying object move parameter table
TB11: Flying object position information table
TB12: Optical space communication device information table

The invention claimed is:

1. An optical space communication management device that performs a link control to optical space communication devices based on link path information and a link parameter, the optical space communication devices being installed in at least one of a satellite and a flying object of a non-terrestrial node group, and an optical ground station, the optical space communication devices performing an optical space communication using one or a plurality of links, the link path information and the link parameter being for transmitting and receiving communication service data based on service requests of the plurality of links and link monitoring information of the plurality of links, the service requests and the link monitoring information being received from at least one of the satellite and the flying object of the non-terrestrial node group, and the optical ground station, the optical space communication management device comprising:

a link monitoring unit that measures propagation delay time of the plurality of links between the optical space communication devices between which the communication service data is transmitted and received;

a service request collection unit that collects a predetermined value of the service requests;

a position calculation unit that calculates position information of at least one of the satellite and the flying object;

a link parameter calculation unit that calculates a number of relays of the link path information and the link parameter based on the position information calculated by the position calculation unit and the propagation delay time measured by the link monitoring unit and the predetermined value collected by the service request collection unit, and parameters for each optical modulation signal of the link parameter based on the predetermined value collected by the service request collection unit;

a link control unit that performs the link control to the optical space communication devices based on the link path information and the link parameter calculated by the link parameter calculation unit; and a link information communication unit that communicates the service request, the link monitoring information, the link path information, and the link parameter with at least one of the satellite and the flying object of the non-terrestrial node group, and the optical ground station.

2. The optical space communication management device according to claim 1, wherein the link monitoring unit measures the propagation delay time as a time delay of end-to-end communications on a network of the optical space communication devices.

3. The optical space communication management device according to claim 1, wherein when the link parameter calculation unit calculates the number of relays of the link path information and the link parameter based on the propagation delay time measured by the link monitoring unit, the link parameter calculation unit analyzes the propagation delay time relative to a predetermined time.

4. The optical space communication management device according to claim 1, wherein the service request collection unit collects, as the predetermined value of each of the service requests, a value corresponding to an acceptable bit error rate of a service request table in the service request.

5. The optical space communication management device according to claim 4, wherein the acceptable bit error rate is associated one-to-one with a service, and determined at a point when a service type is determined.

6. An optical space communication system comprising:

optical space communication devices installed in at least one of a satellite and a flying object of a non-terrestrial node group, and an optical ground station, the optical space communication devices performing an optical space communication using one or a plurality of links; and an optical space communication management device that performs a link control based on link path information and a link parameter, the link path information and the link parameter being for transmitting and receiving communication service data based on service requests of the plurality of links and link monitoring information of the plurality of links, the service requests and the link monitoring information being received from at least one of the satellite and the flying object of the non-terrestrial node group, and the optical ground station, wherein the optical space communication management device includes:

a service request collection unit that collects a predetermined value of the service requests;

a link monitoring unit that measures propagation delay time of the plurality of links between the optical space communication devices between which the communication service data is transmitted and received;

a position calculation unit that calculates position information of at least one of the satellite and the flying object;

a link parameter calculation unit that calculates a number of relays of the link path information and the link parameter based on the position information calculated by the position calculation unit and the propagation delay time measured by the link monitoring unit, and parameters for each optical modulation signal of the link parameter based on the predetermined value collected by the service request collection unit;

a link control unit that performs the link control to the optical space communication devices based on the link path information and the link parameter calculated by the link parameter calculation unit; and a link information communication unit that communicates the service request, the link monitoring information, the link path information, and the link parameter with at least one of the satellite and the flying object of the non-terrestrial node group and the optical ground station, and the optical space communication devices are controlled by the link control based on the link path information and the link parameter from the optical space communication management device, and transmit and receive an optical modulation signal including the communication service data.

7. The optical space communication system according to claim 6, wherein each of the optical space communication devices transmits the optical modulation signal of one wavelength based on one or a plurality of pieces of the communication service data in a frequency multiplexing process in a digital domain in a digital signal process by an optical communication unit of the optical space communication device, or receives one or a plurality of pieces of the communication service data based on the optical modulation signal of one wavelength in a frequency demultiplexing process in the digital domain in the digital signal process by the optical communication unit of the optical space communication device.

8. The optical space communication system according to claim 7, further comprising;

an environmental information collection unit that collects environmental information on an environment in which at least one of the satellite and the flying object is located; and a weather information collection unit that collects weather information on weather at a location of at least one of the satellite and the flying object, wherein the link parameter calculation unit calculates the number of relays of the link path information and the link parameter based on the position information calculated by the position calculation unit, the propagation delay time measured by the link monitoring unit, and parameters for each optical modulation signal of the link parameter based on the predetermined value collected by the service request collection unit, the environmental information collected by the environmental information collection unit, and the weather information collected by the weather information collection unit.

9. The optical space communication system according to claim 6, wherein each of the optical space communication devices transmits one wavelength-multiplexed optical modulation signal obtained by multiplexing the optical modulation signals of a plurality of wavelengths that are each the optical modulation signal of one wavelength based on one piece of the communication service data, or receives one piece of the communication service data based on the optical modulation signal of one wavelength among the optical modulation signals of a plurality of wavelengths demultiplexed from the one wavelength-multiplexed optical modulation signal.

10. The optical space communication system according to claim 9, further comprising;

an environmental information collection unit that collects environmental information on an environment in which at least one of the satellite and the flying object is located; and a weather information collection unit that collects weather information on weather at a location of at least one of the satellite and the flying object, wherein the link parameter calculation unit calculates the number of relays of the link path information and the link parameter based on the position information calculated by the position calculation unit, the propagation delay time measured by the link monitoring unit, and parameters for each optical modulation signal of the link parameter based on the predetermined value collected by the service request collection unit, the environmental information collected by the environmental information collection unit, and the weather information collected by the weather information collection unit.

11. The optical space communication system according to claim 6, wherein each of the optical space communication devices transmits one wavelength-multiplexed optical modulation signal obtained by multiplexing the optical modulation signals of a plurality of wavelengths that are each the optical modulation signal of one wavelength based on one or a plurality of pieces of the communication service data in a frequency multiplexing process in a digital domain in a digital signal process by the optical communication unit of the optical space communication device, or receives one or a plurality of pieces of the communication service data based on the optical modulation signal of one wavelength among the optical modulation signals of a plurality of wavelengths demultiplexed from the one wavelength-multiplexed optical modulation signal in a frequency demultiplexing process in the digital domain in the digital signal process by the optical communication unit of the optical space communication device.

12. The optical space communication system according to claim 11, further comprising;

an environmental information collection unit that collects environmental information on an environment in which at least one of the satellite and the flying object is located; and a weather information collection unit that collects weather information on weather at a location of at least one of the satellite and the flying object, wherein the link parameter calculation unit calculates the number of relays of the link path information and the link parameter based on the position information calculated by the position calculation unit, the propagation delay time measured by the link monitoring unit, and parameters for each optical modulation signal of the link parameter based on the predetermined value collected by the service request collection unit, the environmental information collected by the environmental information collection unit, and the weather information collected by the weather information collection unit.

13. The optical space communication system according to claim 6, further comprising;

an environmental information collection unit that collects environmental information on an environment in which at least one of the satellite and the flying object is located; and a weather information collection unit that collects weather information on weather at a location of at least one of the satellite and the flying object, wherein the link parameter calculation unit calculates the number of relays of the link path information and the link parameter based on the position information calculated by the position calculation unit, the propagation delay time measured by the link monitoring unit, and parameters for each optical modulation signal of the link parameter based on the predetermined value collected by the service request collection unit, the environmental information collected by the environmental information collection unit, and the weather information collected by the weather information collection unit.

14. The optical space communication system according to claim 6, wherein the link monitoring unit measures the propagation delay time as a time delay of end-to-end communications on a network of the optical space communication devices.

15. The optical space communication system according to claim 6, wherein when the link parameter calculation unit calculates the number of relays of the link path information and the link parameter based on the propagation delay time measured by the link monitoring unit, the link parameter calculation unit analyzes the propagation delay time relative to a predetermined time.

16. The optical space communication system according to claim 6, wherein the service request collection unit collects, as the predetermined value of each of the service requests, a value corresponding to an acceptable bit error rate of a service request table in the service request.

17. The optical space communication system according to claim 16, wherein the acceptable bit error rate is associated one-to-one with a service, and determined at a point when a service type is determined.

18. An optical space communication management method in an optical space communication management device that performs a link control to optical space communication devices based on link path information and a link parameter, the optical space communication devices being installed in at least one of a satellite and a flying object of a non-terrestrial node group, and an optical ground station, the optical space communication devices performing an optical space communication using one or a plurality of links, the link path information and the link parameter being for transmitting and receiving communication service data based on service requests of the plurality of links and link monitoring information of the plurality of links, the service requests and the link monitoring information being received from at least one of the satellite and the flying object of the non-terrestrial node group, and the optical ground station, the optical space communication management method comprising:

a first step of measuring propagation delay time of the plurality of links between the optical space communication devices between which the communication service data is transmitted and received;

a second step of collecting a predetermined value of the service requests;

a third step of calculating position information of at least one of the satellite and the flying object;

a fourth step of calculating a number of relays of the link path information and the link parameter based on the position information calculated by the third step, the predetermined value of the service requests collected by the second step, the propagation delay time measured by the first step, and parameters for each optical modulation signal of the link parameter based on the predetermined value of the service requests collected by the second step;

a fifth step of performing the link control to the optical space communication devices based on the link path information and the link parameter calculated by the fourth step; and a sixth step of communicating the service request, the link monitoring information, the link path information, and the link parameter link information with at least one of the satellite and the flying object of the non-terrestrial node group, and the optical ground station.

* * * * *